US008505049B2

(12) United States Patent
Ellis et al.

(10) Patent No.: US 8,505,049 B2
(45) Date of Patent: Aug. 6, 2013

(54) INTERACTIVE TELEVISION PROGRAM GUIDE SYSTEM AND METHOD WITH NICHE HUBS

(75) Inventors: Michael D. Ellis, Boulder, CO (US); Edward B. Knudson, Littleton, CO (US)

(73) Assignee: United Video Properties, Inc., Santa Clara, CA (US)

( * ) Notice: Subject to any disclaimer, the term of this patent is extended or adjusted under 35 U.S.C. 154(b) by 526 days.

(21) Appl. No.: 12/212,873

(22) Filed: Sep. 18, 2008

(65) Prior Publication Data

US 2009/0019485 A1 Jan. 15, 2009

Related U.S. Application Data

(63) Continuation of application No. 10/457,102, filed on Jun. 6, 2003, now abandoned, which is a continuation of application No. 09/604,470, filed on Jun. 26, 2000, now abandoned.

(60) Provisional application No. 60/141,501, filed on Jun. 28, 1999.

(51) Int. Cl.
*H04N 7/10* (2006.01)
*H04N 5/445* (2011.01)

(52) U.S. Cl.
USPC ............... 725/40; 725/46; 725/34; 725/48; 725/60

(58) Field of Classification Search
USPC .................. 725/40, 46, 34, 48, 60
See application file for complete search history.

(56) References Cited

U.S. PATENT DOCUMENTS

| 4,081,753 A | 3/1978 | Miller |
|---|---|---|
| 4,170,782 A | 10/1979 | Miller |
| 4,271,532 A | 6/1981 | Wine |

(Continued)

FOREIGN PATENT DOCUMENTS

| EP | 0 721 253 | 7/1996 |
|---|---|---|
| EP | 0 774 866 | 5/1997 |

(Continued)

OTHER PUBLICATIONS

Cliff Charpentier, "1984 Fantasy Football Digest," Fantasy Sports Inc., Jun. 1984.

(Continued)

*Primary Examiner* — Pankaj Kumar
*Assistant Examiner* — Franklin Andramuno
(74) *Attorney, Agent, or Firm* — Ropes & Gray LLP

(57) ABSTRACT

A system for providing interactive television program guide features and other features and information related to a specific user interest or programming category in niche hubs is provided. All of the television programming features provided by user television equipment that relate to a specific user interest or programming category may be accessed from the niche hub. For example, a movie lovers niche hub may provide programming features such as television program listings for movies, video-on-demand listings for movies, pay-per-view listings for movies, web site links related to movies, movie-related merchandise, movie news groups, movie chat groups, movie e-mail clubs, movie contests, movie trivia questions, movie actor interviews, movie reviews, movie channel package ordering, etc. The programming features of the niche hubs may be transmitted from a server, database, or other storage facility via a television distribution facility. User television equipment may be connected via two-way communications paths to transmit messages to each other.

48 Claims, 79 Drawing Sheets

U.S. PATENT DOCUMENTS

| | | | |
|---|---|---|---|
| 4,367,559 A | 1/1983 | Tults | |
| 4,375,651 A | 3/1983 | Templin et al. | |
| 4,381,522 A | 4/1983 | Lambert | |
| 4,390,901 A | 6/1983 | Keiser | |
| 4,425,579 A | 1/1984 | Merrell | |
| 4,429,385 A | 1/1984 | Cichelli et al. | |
| 4,495,654 A | 1/1985 | Deiss | |
| 4,527,194 A | 7/1985 | Sirazi | |
| 4,641,205 A | 2/1987 | Beyers, Jr. | |
| 4,689,022 A | 8/1987 | Peers et al. | |
| 4,754,326 A | 6/1988 | Kram et al. | |
| 4,908,713 A | 3/1990 | Levine | |
| 4,918,603 A | 4/1990 | Hughes et al. | |
| 4,963,994 A | 10/1990 | Levine | |
| 5,018,736 A | 5/1991 | Pearson et al. | |
| 5,038,211 A | 8/1991 | Hallenbeck | |
| 5,047,867 A | 9/1991 | Strubbe et al. | |
| 5,075,771 A | 12/1991 | Hashimoto | |
| 5,210,611 A | 5/1993 | Yee et al. | |
| 5,223,924 A * | 6/1993 | Strubbe | 725/46 |
| 5,263,723 A | 11/1993 | Pearson et al. | |
| 5,317,403 A | 5/1994 | Keenan | |
| 5,323,240 A | 6/1994 | Amano et al. | |
| 5,382,983 A | 1/1995 | Kwoh et al. | |
| 5,410,344 A | 4/1995 | Graves et al. | |
| 5,432,561 A | 7/1995 | Strubbe | |
| 5,444,499 A | 8/1995 | Saitoh | |
| 5,465,113 A | 11/1995 | Gilboy | |
| 5,465,385 A | 11/1995 | Ohga et al. | |
| 5,477,262 A | 12/1995 | Banker et al. | |
| 5,481,296 A | 1/1996 | Cragun et al. | |
| 5,483,278 A | 1/1996 | Strubbe et al. | |
| 5,534,911 A | 7/1996 | Levitan | |
| 5,539,822 A | 7/1996 | Lett | |
| 5,585,866 A | 12/1996 | Miller et al. | |
| 5,589,892 A | 12/1996 | Knee et al. | |
| 5,594,509 A | 1/1997 | Florin et al. | |
| 5,600,364 A | 2/1997 | Hendricks et al. | |
| 5,617,565 A | 4/1997 | Augenbraum et al. | |
| 5,619,425 A | 4/1997 | Funahashi et al. | |
| 5,621,456 A | 4/1997 | Florin et al. | |
| 5,623,613 A | 4/1997 | Rowe et al. | |
| 5,694,176 A | 12/1997 | Bruette et al. | |
| 5,731,844 A | 3/1998 | Rauch et al. | |
| 5,734,720 A * | 3/1998 | Salganicoff | 380/211 |
| 5,752,160 A | 5/1998 | Dunn | |
| 5,768,382 A | 6/1998 | Schneier et al. | |
| 5,774,357 A | 6/1998 | Hoffberg et al. | |
| 5,781,246 A | 7/1998 | Alten et al. | |
| 5,798,785 A | 8/1998 | Hendricks et al. | |
| 5,801,747 A | 9/1998 | Bedard | |
| 5,805,154 A | 9/1998 | Brown | |
| 5,822,123 A | 10/1998 | Davis et al. | |
| 5,830,068 A | 11/1998 | Brenner et al. | |
| 5,835,087 A | 11/1998 | Herz et al. | |
| 5,846,132 A | 12/1998 | Junkin | |
| 5,848,396 A | 12/1998 | Gerace | |
| 5,850,218 A | 12/1998 | LaJoie et al. | |
| 5,860,862 A | 1/1999 | Junkin | |
| 5,867,226 A | 2/1999 | Wehmeyer | |
| 5,875,108 A | 2/1999 | Hoffberg et al. | |
| 5,880,768 A | 3/1999 | Lemmons et al. | |
| 5,886,732 A | 3/1999 | Humpleman | |
| 5,903,545 A | 5/1999 | Sabourin et al. | |
| 5,940,073 A | 8/1999 | Klosterman et al. | |
| 5,973,683 A | 10/1999 | Cragun et al. | |
| 5,977,964 A | 11/1999 | Williams et al. | |
| 6,005,597 A | 12/1999 | Barrett et al. | |
| 6,018,768 A * | 1/2000 | Ullman et al. | 709/218 |
| 6,029,195 A | 2/2000 | Herz | |
| 6,075,526 A | 6/2000 | Rothmuller | |
| 6,075,575 A | 6/2000 | Schein et al. | |
| 6,081,750 A | 6/2000 | Hoffberg et al. | |
| 6,088,722 A | 7/2000 | Herz et al. | |
| 6,133,909 A | 10/2000 | Schein et al. | |
| 6,163,316 A | 12/2000 | Killian | |
| 6,172,674 B1 | 1/2001 | Etheredge | |
| 6,177,931 B1 * | 1/2001 | Alexander et al. | 725/52 |
| 6,181,335 B1 | 1/2001 | Hendricks et al. | |
| 6,210,277 B1 | 4/2001 | Stefan | |
| 6,216,264 B1 | 4/2001 | Maze et al. | |
| 6,388,714 B1 | 5/2002 | Schein et al. | |
| 6,392,664 B1 | 5/2002 | White et al. | |
| 6,437,836 B1 | 8/2002 | Huang et al. | |
| 6,505,348 B1 | 1/2003 | Knowles et al. | |
| 6,510,417 B1 | 1/2003 | Woods et al. | |
| 6,553,178 B2 * | 4/2003 | Abecassis | 386/291 |
| 6,601,103 B1 * | 7/2003 | Goldschmidt Iki et al. | 709/231 |
| 6,611,654 B1 * | 8/2003 | Shteyn | 386/83 |
| 6,735,487 B1 | 5/2004 | Marshall et al. | |
| 7,006,881 B1 * | 2/2006 | Hoffberg et al. | 700/83 |
| 7,028,326 B1 * | 4/2006 | Westlake et al. | 725/39 |
| 7,370,342 B2 * | 5/2008 | Ismail et al. | 725/46 |
| 2002/0073427 A1 * | 6/2002 | Morrison et al. | 725/50 |

FOREIGN PATENT DOCUMENTS

| | | |
|---|---|---|
| EP | 0 854 645 | 7/1998 |
| GB | 1 554 411 | 10/1979 |
| WO | WO 86/01359 | 2/1986 |
| WO | WO 89/03085 | 4/1989 |
| WO | WO 94/13107 | 6/1994 |
| WO | WO 94/14284 | 6/1994 |
| WO | WO 95/28799 | 10/1995 |
| WO | WO 96/17473 | 6/1996 |
| WO | WO 96/41478 | 12/1996 |
| WO | WO 97/48230 | 12/1997 |
| WO | WO 98/17064 | 4/1998 |
| WO | WO 98/26584 | 6/1998 |
| WO | WO 98/43183 | 10/1998 |
| WO | WO 98/48566 | 10/1998 |
| WO | WO 99/01984 | 1/1999 |
| WO | WO 99/04568 | 1/1999 |
| WO | WO 99/14947 | 3/1999 |
| WO | WO 99/45701 | 9/1999 |
| WO | WO 00/04708 | 1/2000 |
| WO | WO 00/05889 | 2/2000 |
| WO | WO 00/28734 | 5/2000 |

OTHER PUBLICATIONS

Jim Donaldson, "The Official Fantasy Football League Manual," Contemporary Books, Inc., 1985.

Cliff Charpentier, "1985 Fantasy Football Digest," Lerner Publications Company, 1985.

"All Pro Yearbook 1987: The Fantasy Football Magazine," All Pro Publishing Company, 1987.

BBC Sport, *Fantasy Football Monthly, The Game* <http://bbcfootball.fantasyleague.co.uk/ et al.> (accessed Sep. 17, 2002).

CNN Sports Illustrated, *Fantasy Football Challenge* <http://football12201.si.cnn.com/ et al.> (accessed Sep. 23, 2002).

CNN Sports Illustrated, *Fantasy Golf Challenge* <http://gold5.si.cnn.com/ et al.> (accessed Sep. 23, 2002).

CNN Sports Illustrated, *Fantasy Nascar Challenge* <http://racing20.si.cnn.com/ et al.> (accessed Sep. 23, 2002).

CBS SportsLine.com, *John B. Sample League* <http://cbs.sportsline.com/> ( accessed Nov. 24, 1999).

CBS SportsLine.com, *Fantasy Baseball* <http://baseball101.fantasy.sportsline.com/ et al.> (accessed Sep. 23-24, 2002).

CBS SportsLine.com, *Fantasy Football* <http://football2145.fantasy.sportsline.com et al.> (accessed Sep. 23-24, 2002).

CBS SportsLine.com, *Fantasy Golf* <http://golf1.fantasy.sportsline.com/ et al.> (accessed Sep. 23, 2002).

CBS SportsLine.com, *Fantasy Hockey* <http://hockey2102.fantasy.sportsline.com/ et al.> (accessed Sep. 23-24, 2002).

CBS SportsLine.com, *Fantasy Racing* <http://racing.fantasy.sportsline.com/ et al.> (accessed Sep. 23, 2002).

ESPN Internet Ventures, *ESPN Fantasy Games* <http://games.espn.go.com/cgi/home/request.dll?FRONTPAGE et al.> (accessed Sep. 16-18, 2002).

"Fantasy-Football," Franchise Football League.

"Strat-O-Matic Pro Football," Strat-O-Matic Game Co. Inc.

* cited by examiner

INTERACTIVE TELEVISION PROGRAM GUIDE SYSTEM AND METHOD WITH NICHE HUBS

CROSS REFERENCE TO RELATED APPLICATIONS

This application is a continuation of U.S. patent application Ser. No. 10/457,102, filed Jun. 6, 2003, which is a continuation of U.S. patent application Ser. No. 09/604,470, filed Jun. 26, 2000, which claims the benefit of U.S. provisional patent application No. 60/141,501, filed Jun. 28, 1999. All these prior applications are hereby incorporated by reference in their entireties.

BACKGROUND OF THE INVENTION

This invention relates to interactive television program guides, and more particularly, to interactive television program guide features organized into niche hubs.

Interactive television program guides allow users to view television program listings on their televisions. Such program guides allow users to view television program listings in different display formats and to perform various other functions. For example, a user may instruct the program guide to display a channel-ordered grid of current program listings.

Many program guides allow a user to view television programs in a specified category. The program guide may display programs in a desired programming category such as sports or movies. If desired, the program guide may be used to order pay-per-view programming.

Some program guides allow users to define profiles of likes and dislikes, and to view program listings screens that meet the desired category combinations. However, there has not previously been provided an interactive electronic television program guide that collects together all program guide features related to specific categories.

It is therefore an object of the present invention to collect together features related to specific programming categories into niche hubs.

It is also an object of the present invention to provide user customizable niche hubs that collect together program guide features of interest to particular users.

It is also an object of the present invention to provide interactive hyperlinks to related items or features of a program guide within a given area of interest.

SUMMARY OF THE INVENTION

These and other objects of the invention are accomplished in accordance with the principles of the present invention by providing an interactive television program guide system that has niche hubs. Each of the niche hubs is an area of the program guide in which features, programming, and information related to a particular programming category or user interest may be found. Personalized niche hubs contain programming-related features and information that are selected by the user. User television equipment, such as a set-top box, may obtain data for the niche hub features from a television distribution facility, a program guide database, a web server, a real-time data source, a message processing facility, etc.

The niche hubs may include, for example, listings of programs related to a specific category. The hubs may provide users with the ability to sort data. Detailed information on programs may be provided. Hubs may provide users with advance notification of unscheduled programs and information on packages of programs and channels. The hubs may provide users with the ability to search for programs and other information, the ability to set reminders, targeted advertising, television messaging features, television chat features, news groups, web site listings, schedules of local events, the ability to record programs and access recorded programs, user help features, the ability to enter favorites, suggested programming, live data, news, magazine type features, links to applications other than program guide applications, links to setup features, parental control features, and the ability to display in-band data. Each niche hub may include its own unique graphic style, icons, backgrounds, etc. Broadcast or on-demand video or audio may be incorporated into hubs, if desired. The program guide may provide a main menu screen for each hub that provides interactive hyperlinks to related items or features of the program guide within the given category of interest of the hub.

DETAILED DESCRIPTION OF THE PREFERRED EMBODIMENT

Figure 1A:
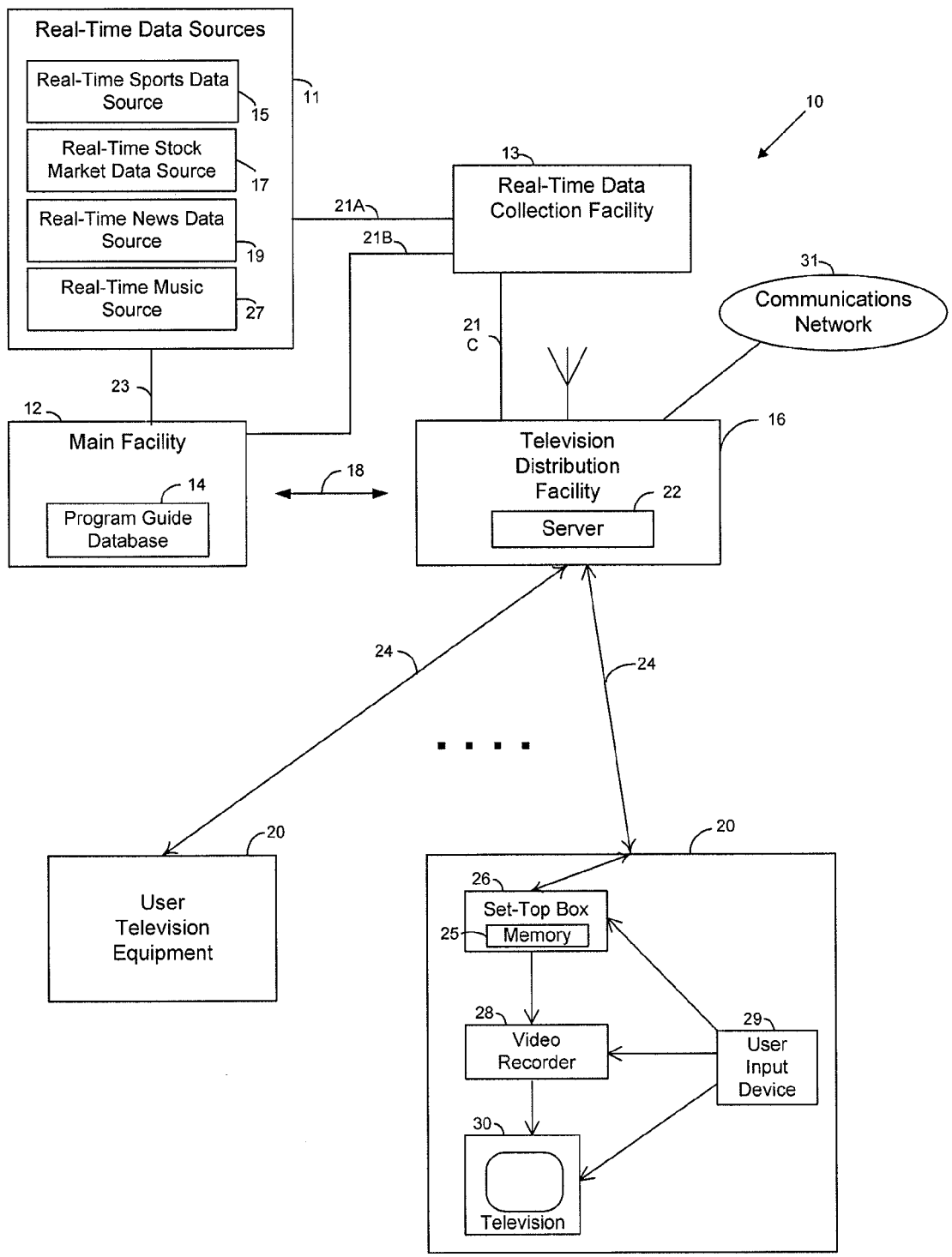
FIG. 1A is a system diagram of an interactive television program guide system with niche hubs in accordance with the present invention.

An illustrative interactive television program guide system with niche hubs 10 in accordance with the present invention is shown in FIG. 1A. Main facility 12 may contain a program guide database 14 for storing program guide information such as television program guide listings data, pay-per-view ordering information, etc. Database 14 allows system 10 to support an interactive television program guide.

Information from database 14 may be transmitted to television distribution facility 16 or to some other distribution facility that does not broadcast the television programming signals (e.g., over paging frequencies) via communications link 18. Link 18 may be a satellite link, a telephone network link, a fiber-optic link, a cable link, a microwave link, a combination of such links, or any other suitable communications path.

Television distribution facility 16 is a facility for distributing television signals to users, such as a cable system headend. Some aspects of the invention may be implemented using a television distribution facility such as a broadcast distribution facility, or a satellite television distribution facility. Only one television distribution facility 16 is shown in FIG. 1A to avoid over-complicating the drawings. In general, however, main facility 12 distributes information to multiple television distribution facilities.

The program guide information transmitted by main facility 12 to television distribution facility 16 includes television program listings data such as program times, channels, titles, descriptions, etc. The information transmitted from main facility 12 may also include information related to features provided by niche hubs (e.g., television program contests, surveys, trivia, targeted advertising, messaging features, chat features, new groups, video-on-demand programs, etc.). Some of the information from main facility 12 may be tagged with appropriate niche hub(s) so that the information may be grouped into niche hub(s). Certain programs and other information may have tags for more than one hub.

If desired, some of the program guide data and other information stored in database 14 may be provided using data sources at facilities other than main facility 12. For example, data relating to niche hub features may be provided by a remote server, or other equipment that is separate from main facility 12 and television distribution facility 16.

Real-time data sources 11 such as real-time sports data source 15, real-time stock market data source 17, real-time news data source 19, and real-time music source 27 are used to gather information such as sports scores, stock quotes, news, music and the like from, e.g., various sporting and news sources or radio stations. Real-time information from real-time data sources 30 may be provided to each of the television distribution facilities 16 by providing this information to main facility 12 via communications path 23 and redistributing the information to television distribution facilities 16 via paths 18. If desired, real-time information from real-time data sources 11 may be provided to one or more real-time data collection facilities 13 via communications path 21A, where the data may be processed for retransmission to television distribution facilities 16 via communications path 21C. If desired, data from real-time data collection facility 13 may be provided to television distribution facility 16 via communications path 21B, main facility 12, and communications path 18. Communications paths 21A, 21B, 21C, and 23 may be any suitable communications paths such as satellite links, coaxial cable, fiber optics, free-space transmissions, telephone links, or a combination of such links or other suitable links. Television distribution facility 16 may also provide data to user television equipment 20 from communications network 31 (e.g., the Internet) as shown in FIG. 1A.

Television distribution facility 16 distributes program guide data and other information to the user television equipment 20 of multiple users via communications paths 24. Communication paths 24 are preferably bidirectional to support two-way communications (e.g., e-mail messages, chat messages, etc.) and preferably have sufficient bandwidth to allow television distribution facility 16 to distribute scheduled television programming, pay programming, video-on-demand, messages, and other video and audio information to user television equipment 20 in addition to non-video program guide information and messages. The messages (e.g., real-time, delayed, etc.) supported by communication paths 24 may be text-based or, if more bandwidth is available, may be audio or video messages. If television distribution facility 16 is a cable system headend, communications paths 24 may be based on coaxial cable or fiber optics or the like. If television distribution facility 16 is a satellite system or broadcast system, unidirectional paths may involve transmitting information in free space. Bidirectional paths may have a free-space downlink to the home and a telephone line or cable or fiber optic return path from the home to the television distribution facility 16.

User television equipment may be based, for example, on a set-top box or other such device. For clarity, many aspects of the invention are described in connection with this illustrative arrangement, although any other suitable hardware arrangement for the user television equipment 20 may be used if desired.

Multiple television and audio channels (analog, digital, or both analog and digital) may be provided to user television equipment devices 20 (including, e.g., set-top boxes 26) via communications paths 24. If each path 24 includes a number of traditional analog television channels, one or more of these channels may be used to support a number of digital channels. The bandwidth of each analog channel that is used to support digital channels may support ten or more of such digital channels. Two-way digital channels may support two-way communications in the form of real-time (e.g., chat) and delayed (e.g., e-mail) messages between set-top boxes 26 and a server (e.g., server 22 at television distribution facility 16). The return path for messages usually requires additional bandwidth. If two-way communications between set-top boxes 26 and television distribution facility 16 involve only text or audio signals, the bandwidth required to support such two-way communications may be substantially less than the bandwidth required to support two-way communications involving video.

Video, audio, graphical, and textual data to be used with the niche hubs (e.g., two-way messages, news stories, web sites, contest information, etc.) may be distributed along communications path 24 using any number of suitable techniques. For example, textual data may be distributed using out-of-band channels on paths 24 using out-of-band modulators. Video or audio data may be more efficiently transmitted using one or more digital channels on path 24. Such digital channels may also be used for distributing text and graphics. Any suitable communications protocols may be used for sending data to be used with the niche hubs. For example, communications may be analog or digital, synchronous or asynchronous, packet-based, Internet protocol transmissions, etc.

Dedicated digital or analog channels, or at least an allocated portion of the available bandwidth in communications paths 24, may be used for the transmission of certain types of data (e.g., video-on-demand programs, chat messages, etc.). Such dedicated channels may be separate from the channels used for transmitting television program broadcast signals to the user television equipment. If desired, television programming may be transmitted to user television equipment 20 along one communications path such as a satellite link from a satellite system, while other data relating to the niche hubs (e.g., program guide data, messages, advertising, survey information, etc.) may be transmitted to and from the user over a second communications path such as a telephone, cable, or wireless link.

Television distribution facility 16 preferably has server 22 or other suitable computing equipment, audio, and/or video equipment for supporting the recording of programs, the transmission of chat and e-mail messages between users, the transmission of video-on-demand programs, the transmission of news information, the storage and transmission of program guide information, the storage of information from users, and the storage and transmission of data related to other niche hub features. The server 22 may be capable of handling text, graphics, video, or audio data. Server 22 in television distribution facility 16 may be configured in a client-server arrangement in which each user television equipment device 20 acts as a client processor.

Each user has a receiver, which is typically a set-top box such as set-top box 26, but which may also be other suitable television equipment into which circuitry similar to set-top box circuitry has been integrated. For example, user television equipment 20 may be based on an advanced television receiver such as a high-definition television (HDTV) receiver or other such television-based platform. A set-top box may include a Data Over Cable Service Interface Specification (DOCSIS) modem for use in two-way communication to and from a server or television distribution facility. Set-top box 26 may also comprise a WebTV Internet Receiver. For clarity, the present invention will be described primarily in the context of user television equipment 20 that is based on set-top boxes 26. As shown in FIG. 1A, each set-top box 26 may have memory 25. Memory 25 may be used, for example, for maintaining a database of program listings data.

Program guide information may be distributed to set-top boxes 26 continuously (in real-time), periodically, on request (using a client-server arrangement), or using a combination of these techniques. Other data relating to the niche hubs may be distributed to set-top boxes 26 in real-time, periodically, or on-demand (e.g., when a user checks to see whether he has received a message and requests the message for viewing). Server 22 may receive niche hub data from set-top boxes 26 in real-time, on-demand, or periodically.

Main facility 12 preferably contains a processor to handle information distribution tasks. Each set-top box 26 preferably contains a processor to handle tasks associated with implementing an interactive television program guide application containing niche hub features. Television distribution facility 16 preferably contains one or more processors (e.g., part of server 22) for tasks associated with providing program guide data and other niche hub data to the program guide on the set-top boxes.

It should be understood that some or all of the functions of the program guide application hereinafter described may be integrated into an operating system on the set-top box, implemented as a stand-alone application on the set-top box, or performed by a server in television distribution facility 16 (sever 22) or separate from the television distribution facility. In client-server architectures, the set-top box may request data from the server. The server can store and process data and send the results of a request back to the user television equipment for further processing, display, or storage. Any of the functionality of the program guide application hereinafter described may be implemented using a client-server architecture, if desired.

Each set-top box 26 is typically connected to an optional video recorder 28, which may be a videocassette recorder, a digital video recorder, a personal video recorder (PVR), or other such recording device, so that selected television programs may be recorded. Each video recorder 28 (or set-top box 26) may be connected to a television 30. The video recorder 28 may be integrated with the set-top box or the television. To record a program, set-top box 26 tunes to a particular channel and sends control signals to video recorder 28 (e.g., using an infrared transmitter) that direct video recorder 28 to start and stop recording at the appropriate times. If desired, programming may be recorded at server 22 in television distribution facility 16. User television equipment may also include speakers, audio receiver, stereo receiver, pro-logic digital AC-3 receiver, or other audio equipment.

During the use of the television program Guide application with niche hub features, the television program guide application may display interactive display screens on television 30. Each set-top box 26, video recorder 28, and television 30 may be controlled by one or more user input devices 29.

Features of this invention are primarily discussed in the context of a remote control, however user input device 29 may be a remote control, mouse, trackball, microphone, digital video camera, dedicated set of buttons, touch screen, etc.

Figure 1B:
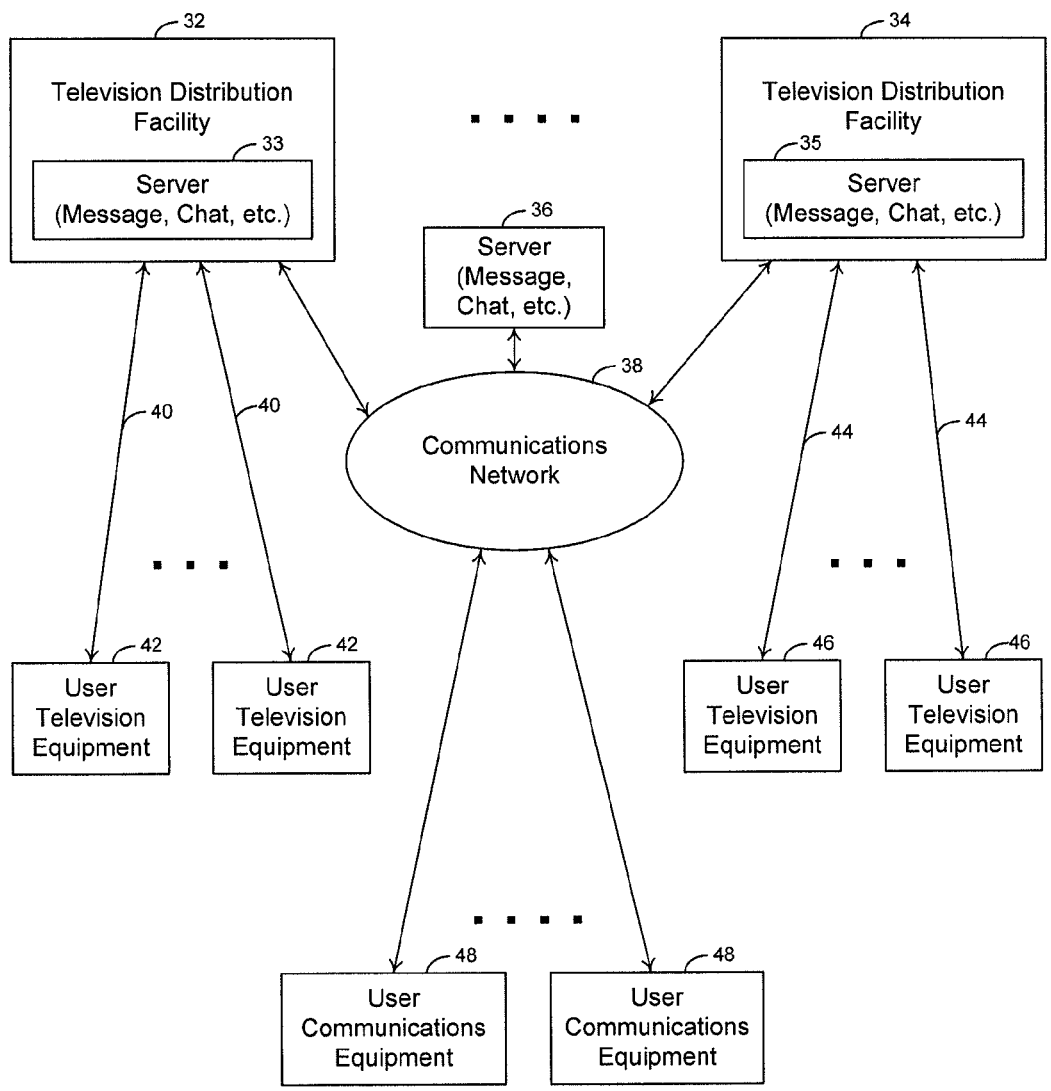
FIG. 1B is a system diagram showing how multiple television distribution facilities may be connected via a communications network in accordance with the present invention.

Some of the niche hub features of the present invention may be handled on a server that is not located at the television distribution facility as shown in FIG. 1B. For example, data used with the niche hubs may be stored on server 36 which is connected to television distribution facilities 32 and 34 through communications network 38. Television distribution facility 32 is connected to user television equipment 42 via communications paths 40. Television distribution facility 34 is connected to user television equipment 46 via communications paths 44. Communications network 110 may be any suitable communications network such as the Internet, a public or private telephone network, a network involving satellite link or wireless links, a cable network, etc.

The television distribution facilities may also have servers that communicate with server 36. For example, television distribution facility 32 has server 33, and television distribution facility 34 has server 35. Servers 33, 35, and 36 may be message servers which handle the distribution of delayed e-mail type messages between user television equipment 42 and 46, real-time chat messages between user television equipment 42 and 46, news groups, web pages, and the transmission of program guide data, programming, and other niche hub data to user television equipment 42 and 46. The configuration of servers 33 and 35 and user television equipment 42 and 46 may be based on a client-server arrangement.

As shown in FIG. 1B, delayed and real-time messages can be distributed along communication paths 40 from one user television equipment device 42 associated with television distribution facility 32 to another user television equipment device 42 associated with that facility using a server 33 located at the facility. The messages sent between two or more user television equipment devices 42 associated with television distribution facility 32 may be stored on server 33 in television distribution facility 32. An advantage to limiting operation of a message system to individual television distribution facilities is that it allows individual cable system operators (for example) to control their systems, and it does not involve coordinating the transmission of messages related to an on-going television program between different geographical areas or different time zones. If desired, messages exchanged by user television equipment 42 can be stored by server 36 that is connected to television distribution facility 32 via communications network 38.

Users at one or more of user television equipment devices 46 may exchange messages or other data with one or more of user television equipment devices 42. Television distribution facilities 32 and 34 may be connected to each other via communications network 38. Messages that are sent between user television equipment 42 and user television equipment 46 may be stored on servers 33, 35, or 36. If desired, any number of television distribution facilities may be connected together via communications network 38 or other such communications networks to allow user television equipment from these television distribution facilities to exchange messages or other data with each other.

In addition, messages and other data may be transmitted between user television equipment 42 or 46 and user communications equipment 48. User communications equipment 48 are connected via communications network 38 to television distribution facilities 32 and 34. User communications equipment devices 48 can be any number of, e.g., personal computers that can send and receive messages.

Figure 1C:
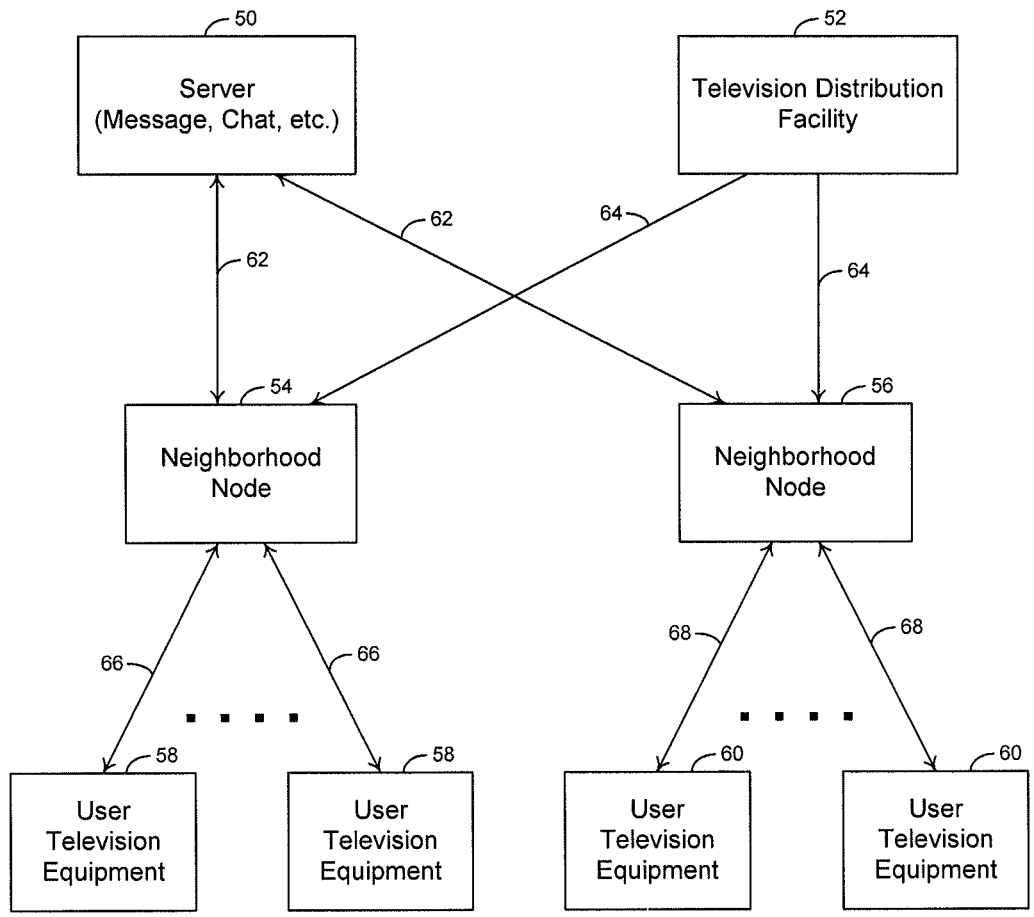
FIG. 1C is a system diagram showing how multiple user television equipment devices may be connected to a television distribution facility and a separate server via neighborhood networks in accordance with the present invention.

The niche hub features of the present invention may be also handled on a server that is connected to the user television equipment through a neighborhood node as shown in FIG. 1C. For example, niche hub data may be stored on server 50 and transmitted between user television equipment devices 58 and 60 via neighborhood nodes 54 and 56. User television equipment 58 are connected to neighborhood node 54 via communications path 66, and user television equipment devices 60 are connected to neighborhood node 56 via communications path 68. Neighborhood nodes 54 and 56 decrease the bandwidth requirements on communications paths 66 and 68. Neighborhood nodes 54 and 56 may route television programming from television distribution facility 52 to user television equipment 58 and 60. Neighborhood nodes 54 and 56 may also route niche hub data between server 50 and user television equipment 58 and 60. Neighborhood nodes 54 and 56 may also route requests to perform many of the niche hub functions described herein from user television equipment 58 and 60 to server 50. Responses from server 50 are routed back to the appropriate user television equipment device via a neighborhood node. Server 50 may route delayed and real-time messages between user television equipment 58 and 60.

Figure 1D:
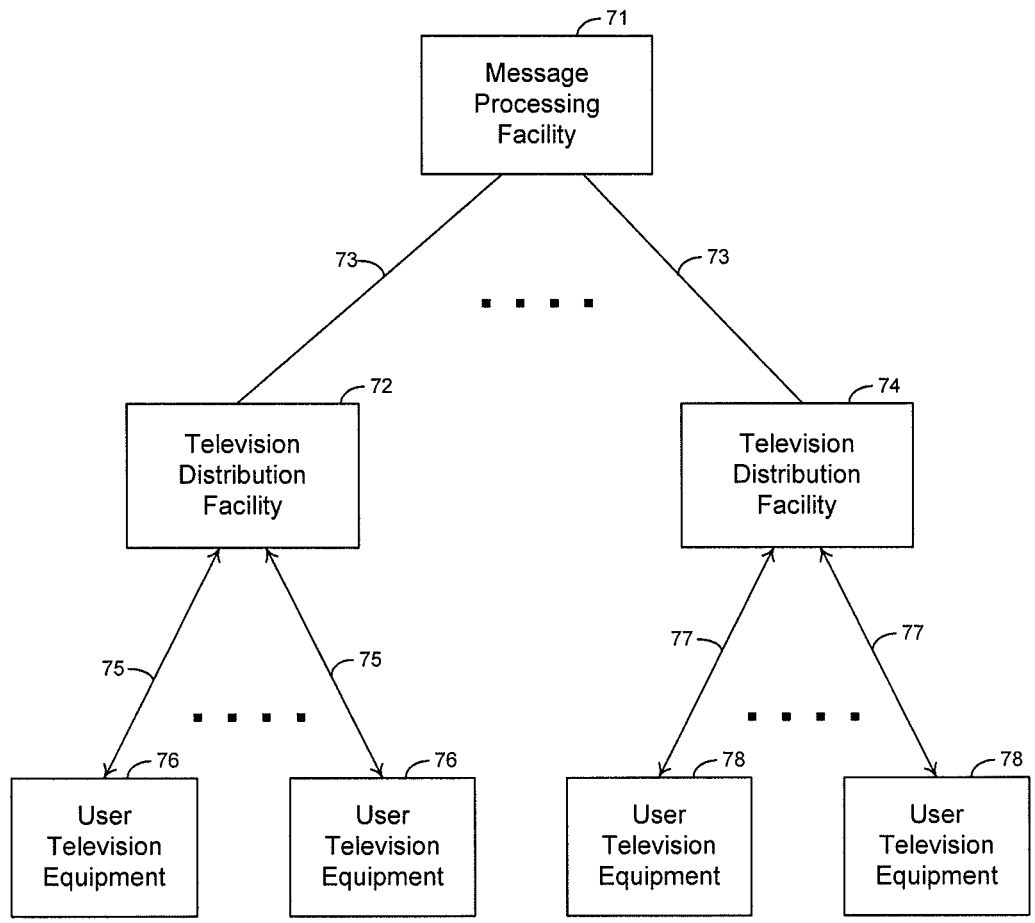
FIG. 1D is a diagram of a system configuration in which user television equipment devices of multiple television distribution facilities are connected via a message processing facility in accordance with the present invention.

The program guide with niche hubs of the present invention may provide users with the opportunity to compose a message and send the message to the television distribution facility or a message process sing facility. For example, referring to FIG. 1D, interactive program guides operating on user television equipment 76 may provide users with the opportunity to compose a message and send the message to television distribution facility 72 through two-way communications paths 75. The message may be a message to purchase merchandise, a pay-per-view program, a premium channel, etc. The message may also be a message to another user at another user television equipment 76. Television distribution facility 72 may forward such a message to another user to that user's user television equipment 76 through one of two-way communications paths 75.

Interactive program guides operating on user television equipment 76 may also provide users with the opportunity to compose a message and send it to message processing facility 71. For example, program guides may provide users with the opportunity to compose a message to a television channel or a television personality and send the message to a television program entity that processes messages for that television channel or television personality. Program guides may also provide users with an opportunity to vote for athletes who are candidates for an all-star team, enter a television program contest, answer trivia questions, participate in sports or horse wagering or other interactive wagering, etc. The program guide may send the user's input (e.g., the user's vote, the user's response to a contest question or trivia question, the user's bet, etc.) to message processing facility 71 which processes user responses (e.g., counts users' votes, evaluates user's answers to contest and trivia questions, places the user's bet, etc.) User television equipment 78 may also send messages to television distribution facility 74 and other user television equipment 78 via two-way communications paths 77. Messages from user television equipment 76 and 78 may be forwarded by television distribution facilities 72 and 74 to message processing facility 71 via communications paths 73 which may be satellite links, cable links, telephone network links, microwave links, etc. Communications paths 73 may be two-way communications paths.

The interactive television program guide of the present invention provides niche hubs, which are areas of the interactive program guide in which features, applications, programming, information, etc. related to a particular user interest or interests may be found. The niche hubs of the present invention provide the user with the opportunity to access a variety of electronic television program guide features using their user television equipment. The niche hubs may link together program guide features such as applications, TV listings, messages, news, web site links, chat groups, merchandise, etc., that are related to specific user interests such as movies. The niche hubs may also be customized by the user to link together program guide applications of interest to that particular user.

Another attribute of this invention is the interlinking of features. The top level of each hub gives access to the most commonly used requests within any specific feature. These are "hyperlinks" to other related features. These features may be common features throughout the guide, but specific to the content of how the user got there. For example, a niche hub may contain listings of programs that exclusively relate to the category or genre of the hub (e.g., movies).

Figure 2:
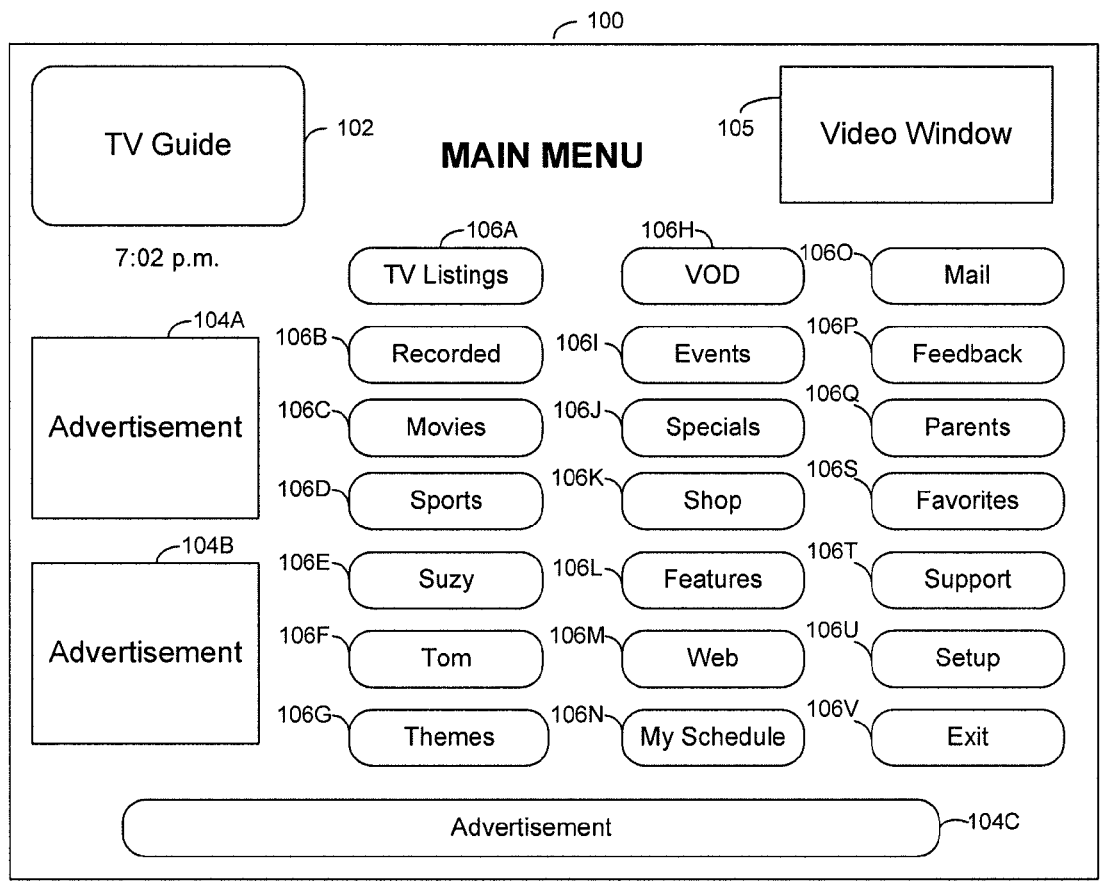
FIG. 2 is an illustrative interactive main menu television display screen in accordance with the present invention.

FIG. 2 is an example of main menu screen 100 for a niche hub program guide. The television listings option 106A provides access to listings of all programs on all channels. Recorded option 106B provides a listing of programs that have been previously recorded by the guide on behalf of the user. This feature is discussed further with respect to FIG. 19. Movies option 106C, Sports 106D, Suzy option 106E, and Tom option 106F are examples of on-screen options that provide direct access to some of the program guide hubs. For example, selecting Movies option 106C may cause the program guide to display the television screen shown in FIG. 5, and selecting Suzy option 106E may cause the guide to display the screen in FIG. 27.

Figure 3:
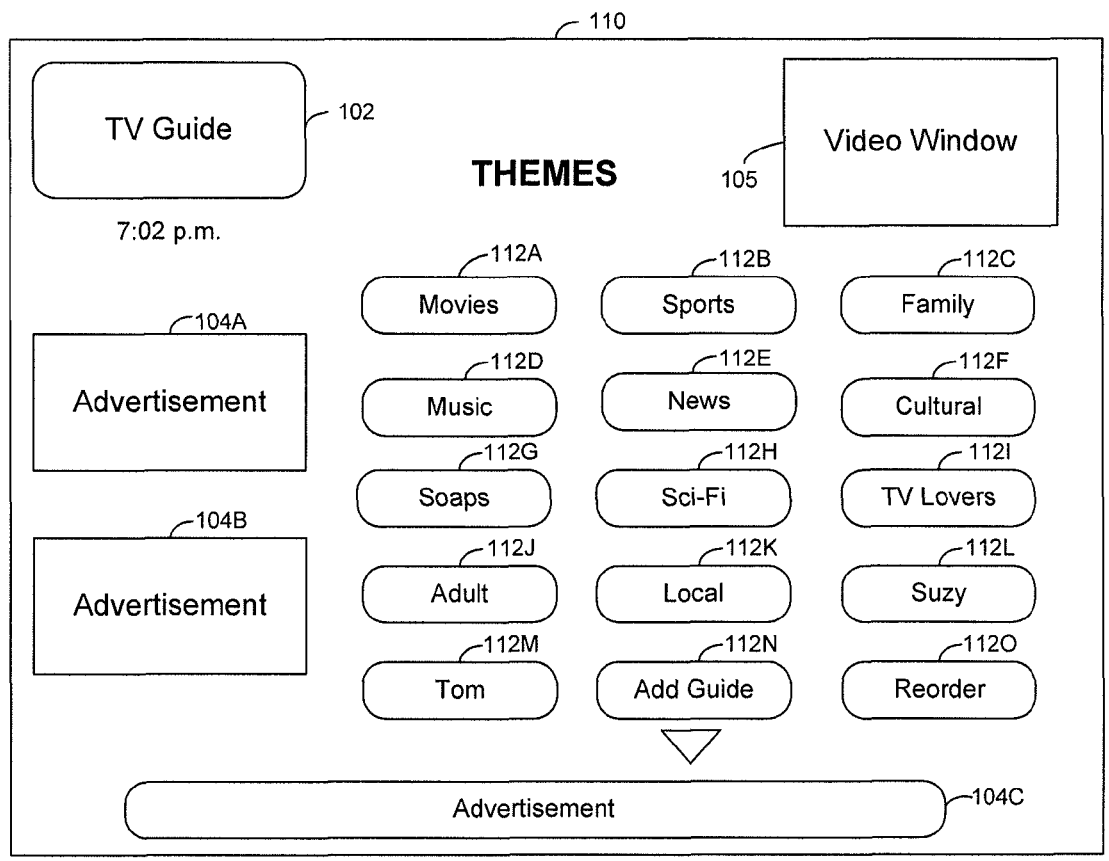
FIG. 3 is an illustrative interactive themes television display screen for entering niche hubs in accordance with the present invention.

Themes option 106G provides access to the complete list of available niche hubs, as well as the ability to create and customize new hubs, as discussed and shown with respect to FIG. 3. VOD option 106H provides access to video on demand programs, as discussed and shown with respect to FIG. 9. Events option 106I provides a listing of special events on television. Specials option 106J provides access to special events, packages, and other offers from the service provider, as discussed and shown with respect to FIG. 14. Shop option 106K provides access to shopping features, such as shown and discussed with respect to FIG. 17. Features option 106L provides access to interviews, reviews, articles, and other magazine "features", such as shown and discussed with respect to FIG. 15. Web option 106M provides access to television-related web sites, such as shown and discussed with respect to FIG. 21.

Figure 20:
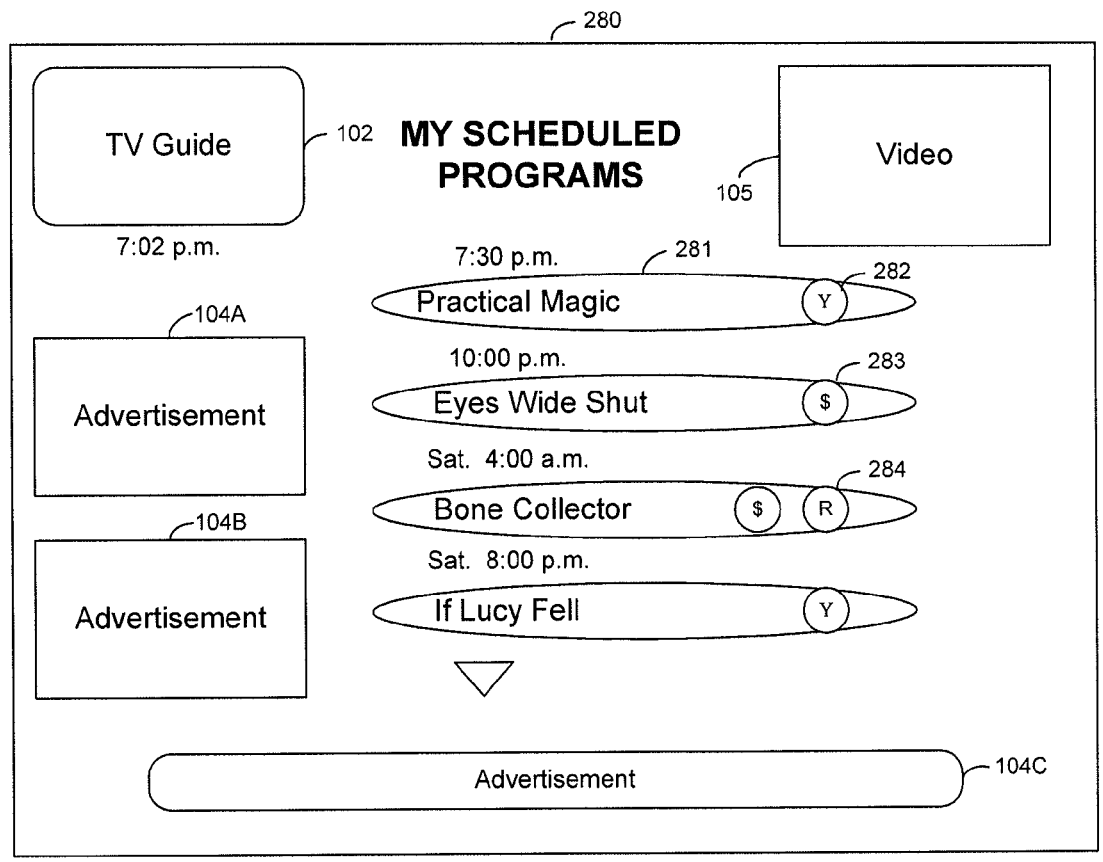
FIG. 20 is an illustrative interactive television display screen listing scheduled programs in accordance with the present invention.

My Schedule option 106N provides access to a schedule of upcoming programs previously selected to be watched, purchased, and/or recorded, as shown and discussed with respect to FIG. 20. Mail option 106O provides access to a messaging or e-mail function. Feedback option 106P provides access to contests, trivia, messaging to television networks, and other similar features, as shown and discussed with respect to FIG. 18. Parents option 106Q provides access to a parental control feature. Favorites option 106S provides access to a feature to set user preferences, as shown and discussed with respect to FIG. 24. Support option 106T provides access to support features, such as user help, answers to common questions, communication with technical support, etc. Setup option 106U provides access to guide setup features. Exit option 106V provides an exit from the program guide.

The program guide application on set-top box 26 may obtain a list of features available for the niche hub (such as shown in main menu screen 100) from program guide database 14, a television distribution facility, or one of the servers shown in FIGS. 1A-1C. The niche hub information may be digitally encoded on a digital channel that is separate from the channel used for the television program signals. If desired, the list of features available for each of the niche hubs may be stored in memory 25.

Other items shown on main menu screen 100 and other screens in the niche hub program guide include: brand identifier of the guide provider in window 102 (such as the TV Guide logo shown); current time; title of the current screen; Video window 105, typically showing the currently tuned channel, but which may show other videos, such as video clips on demand; and three advertisements 104A-C, which may include text, graphics, video, or any other media. Advertisements may be distributed generally, or may be targeted based on information about the user, the screen displayed, or other criteria. Further features of an illustrative program guide system with targeted advertising are described in Knudson et al. U.S. patent application Ser. No. 09/034,939, filed Mar. 4, 1998, which is hereby incorporated by reference herein in its entirety. Advertisements may be interactive; selecting an advertisement may cause the guide to display information about the advertised item, program, channel, or service, such as shown, for example, in FIG. 7.

Upon selecting Themes option 106G in screen 100, the user may, for example, be presented with Themes screen 110, such as shown in FIG. 3. This screen shows a list of themes, any of which may be selected by the user. Each theme is related to a niche hub of the program guide that provides program guide features to the users based upon the theme. When the user selects a theme in screen 110, the program guide enters a niche hub related to that theme. If there are more themes than fit on a single screen, the user may scroll to additional pages. The theme list may include standard (predefined) themes, such as Movies (option 112A), Sports (option 112B), Family (option 112C), Music (option 112D), News (option 112E), Cultural (option 112F), Soaps (option 112G), Science Fiction (option 112H), TV Lovers (option 112I), Adult (option 112J), and Local (option 112K) themes. It may also include themes defined and customized by the user, such as Suzy (option 112L) and Tom (option 112M). Screen 110 may include option 112N to add a new theme guide, as well as option 112O to reorder the themes on the list.

Figure 5:
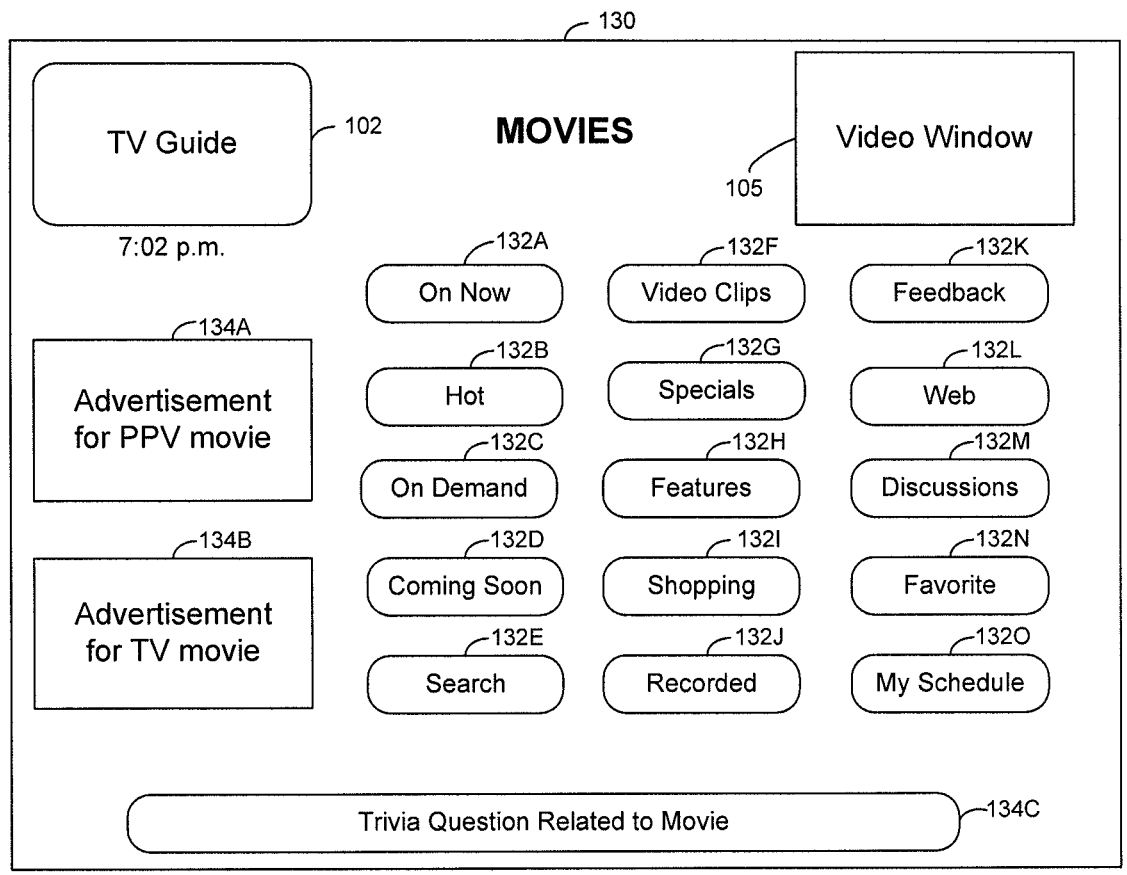
FIG. 5 is an illustrative interactive television display screen for a movies niche hub in accordance with the present invention.

The themes for movies, sports, Tom, and Suzy from the list shown on Themes screen 110 of FIG. 3 are also included as options on Main Menu screen 100 of FIG. 2. This provides the user with quick access to the most popular themes for niche hubs from the Main Menu screen 100. The program guide may also allow the user to select one or more hubs for 1-key access (i.e., accessing the hub by pressing a single button on the remote control). Pressing this key may bring up a miche hub screen such as shown in FIG. 5. In addition, the user may flip through just the channels that are currently broadcasting programs that match the theme of a selected theme (e.g., movies or sporting events) by pressing UP and DOWN arrow keys on the remote control. If desired, the program guide may also restrict the channels that the user can flip through to channels that are currently broadcasting programs that match the user's personal preferences.

Figure 4:
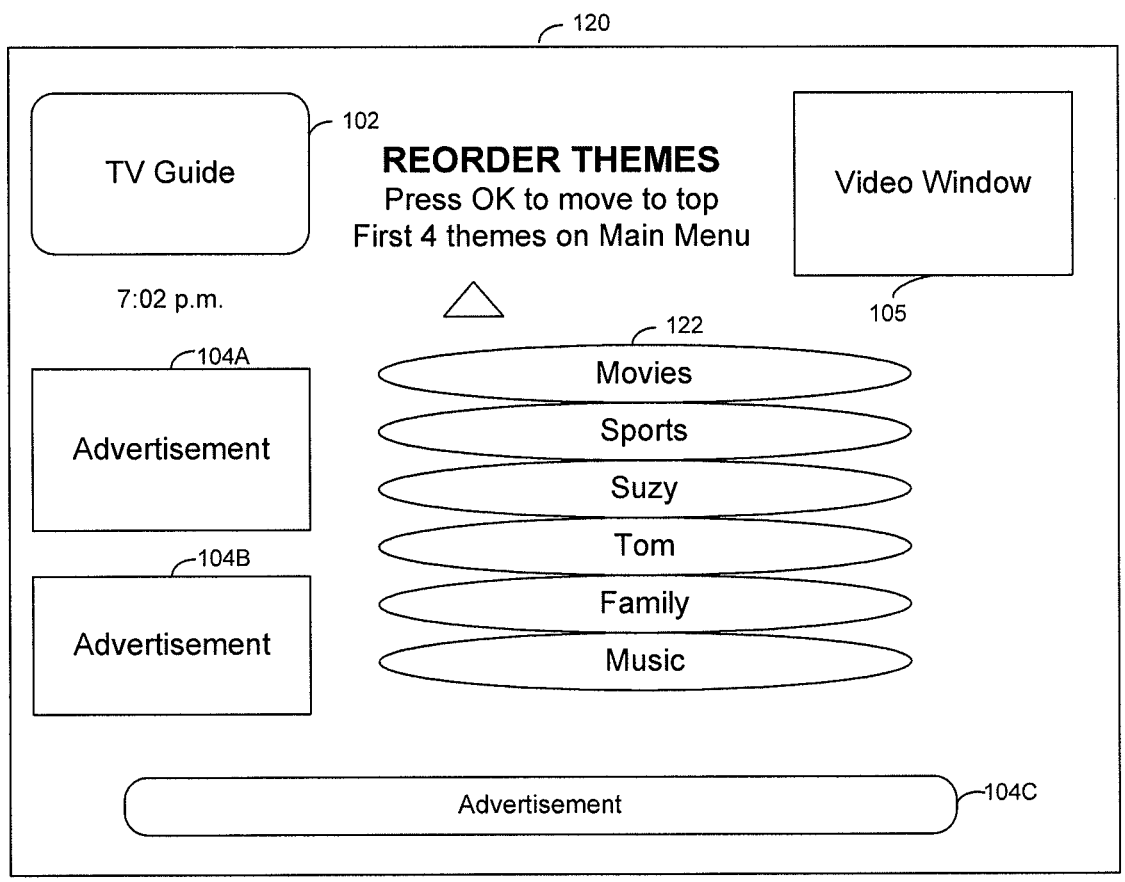
FIG. 4 is an illustrative interactive television display screen for reordering themes in accordance with the present invention.

Each household may reorder the themes on the list by selecting Reorder option 112O from Themes screen 110. Doing so may display a screen such as Reorder Themes screen 120 shown in FIG. 4. When Reorder Themes screen 120 is displayed, the user may highlight any of the themes displayed in list 122 of screen 120 and press the OK key on the remote control. This will cause that theme to be moved to the top of the list in Themes screen 110 of FIG. 3, as well as placing it on the Main Menu screen 100 of FIG. 2. All other themes will move down in the list correspondingly.

FIG. 5 is an example of a program guide niche hub screen that may be displayed when the user selects one of the themes from the Themes screen or Main Menu screen, in this case the Movies theme. In this case, a movies menu is displayed, with options relating to the selected theme. Some options may be specific to a single theme. Other options may be presented on multiple theme menus, as well as the Main Menu, with the action taken on selection of the option depending on the context in which it was displayed.

Figure 7:
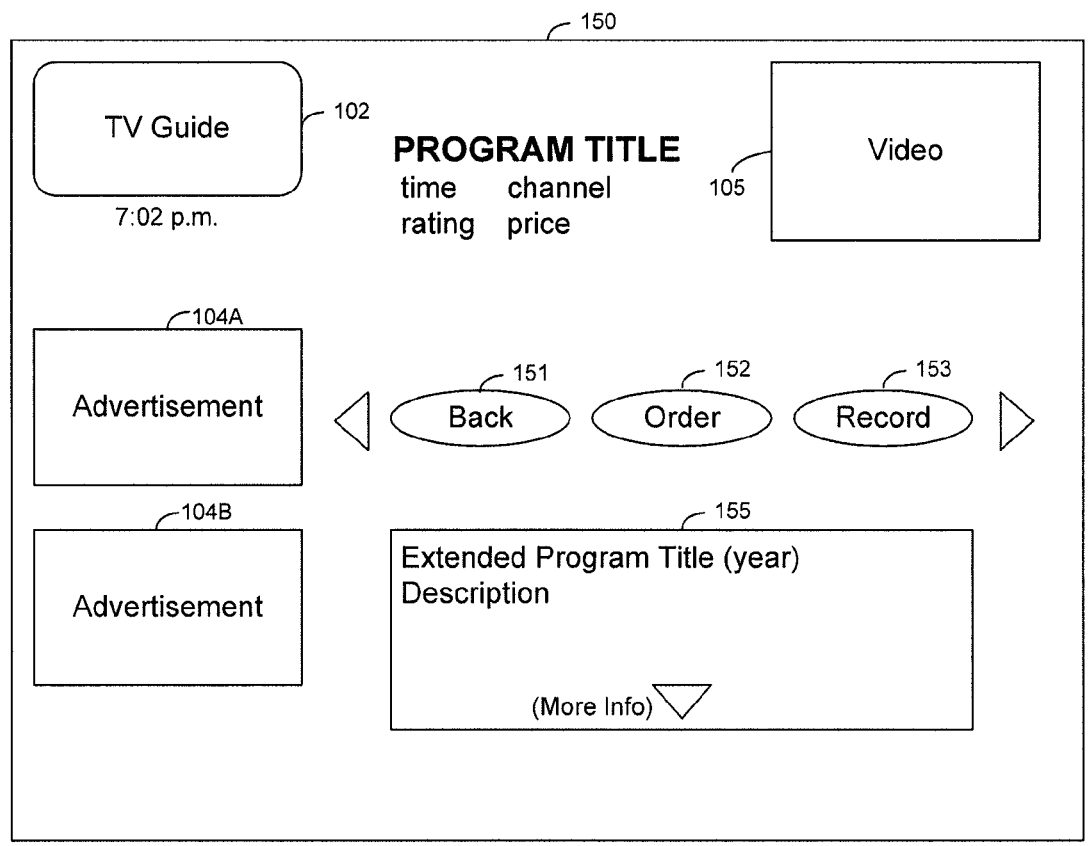
FIG. 7 is an illustrative Program Information display screen in accordance with the present invention.

FIG. 5 shows how the advertisements may be targeted based on the screen, theme, and hub. For example, since this is the Movies screen, the advertisement 134A is for a PPV movie. Selecting ad 134A causes the guide to display the Program Information screen for that PPV movie, such as shown in FIG. 7. The advertisement 134B is for a Television movie, with selection of that ad causing the display of a program information screen for that movie. Region 134C shows a trivia question related to movies. Selecting region 134C may display a screen similar to the Program Information screen, with the answer to the question, and other related information and options. Further features of an illustrative program guide with interactive information display screen are described in Rudnick et al. U.S. patent application Ser. No. 09/356,268, filed Jul. 16, 1999, which is hereby incorporated by reference herein in its entirety.

Figure 6:
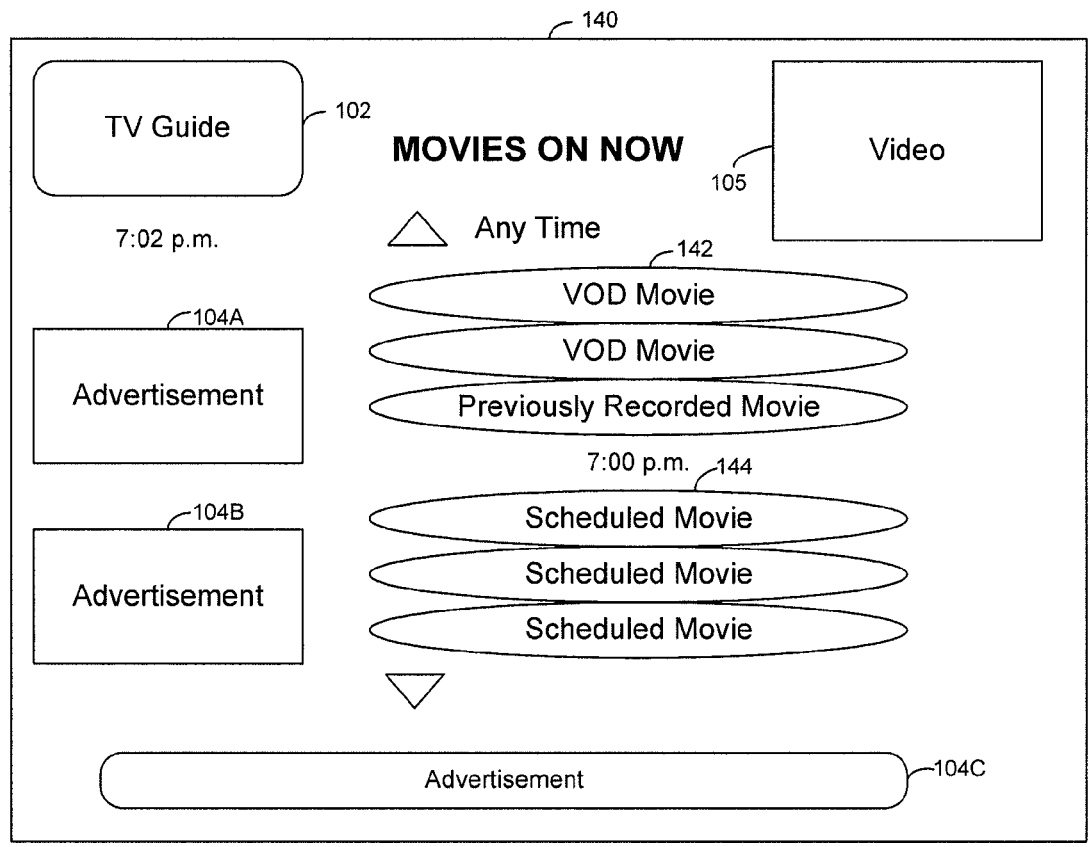
FIG. 6 is an illustrative interactive television display screen for movies on now in accordance with the present invention.

Selecting On Now option 132A from Movies screen 130 brings up a listing screen, such as shown in FIG. 6. Listing screens accessed from various options on various screen look and function similarly. However, they may differ in the content shown in the listing, in the way the listing is sorted, and in other details. In this case, the Movies On Now listing screen 140 shows a list of movies that are available to be viewed now or in the near future.

Any of the options 132A-O as well as the advertisements in movies screen 130 may contain data related to movies, or data relating exclusively to movies. The data displayed on screen when the user selects an option in movies screen 130 (or any other niche hub menu of the present invention relating to a specific theme) may be filtered to match the current selected theme (e.g., movies) by a processor at the television distribution facility, the user television equipment, or a remote server from where the data relating to the selected program guide option was accessed so that only features related to that theme are provided.

For example, the top of screen 140 in FIG. 6 may list one or more movies in list 142 that are available at any time from the Video On Demand (VOD) server. List 142 may also contain movies that the user has asked to be recorded and which may be viewed at any time. The program guide may pick one or two movies from both of those categories (based, for example, on availability/recording date, sponsorships, etc.). Additional on-demand movies and previously recorded movies may be shown when the user presses the UP Arrow key on the remote control.

The program guide may also show movies that are starting in the current time period in list 144 in screen 140. If the user presses the DOWN Arrow key on the remote control, the guide may display additional current movies, as well as movies that are scheduled to start in the near future. If the user presses the UP Arrow key on the remote control, the guide may display movies that started earlier and are currently in progress. Movies may be sorted by start time, and for a particular start time may be sorted by title, by channel, or by other criteria.

If a program is selected, for example from listing screen 140 of FIG. 6 or from an interactive advertisement (e.g., 104A-C), the program guide may display, for example, Program Information screen 150, such as shown in FIG. 7. This screen may include the name of the program (possibly editorially shorted to fit into the screen space available), the rating of the program, the start time and run time of the program, the channel on which the program is being shown, and other details about the program, such as the price and package information. Screen 150 may also display the full title of the program (in the case that the title was editorially shortened), the year the movie was released, and a description of the movie in region 155. The user can use the UP and DOWN Arrow keys on the remote control to scroll through multiple pages of information. Other information related to the program (not shown) may be included on this screen such as language(s), country of origin, color/black and white/colorized, closed captioning availability, audio format, video format, etc. The data displayed in screen 150 relating to the selected program may be obtained from a video-on-demand server, from program guide database 14, or from the television distribution facility.

Program Information screen 150 also includes a set of options (such as options 151, 152, and 153) related to the program. The set of options available will depend on the program itself and how it was selected. The user can scroll through the options using the LEFT and RIGHT Arrow keys on the remote control. If a large number of options are available, the guide may present them in a nested menu. Options that may be available include:

| Option | Displayed When | Action |
| --- | --- | --- |
| Back | Always | Return to the previous screen. |
| Remind | The program has not yet started. | Allows setting or cancelling a reminder for the program. |
| Watch | The program has started or is available on demand. | Tunes to the program immediately. |
| Order | The program is purchasable, either individually or as part of a package. | Allows the user to purchase the program or package, or presents the information for the user to do so. |
| Package | The program is purchasable as part of one or more package. | Presents information about the package(s) containing this program. |
| Air Times | The program is scheduled on multiple times/channels. | Presents a list of times/channels at which the program airs, and allows the user to select any of them. |
| Lock | Always | Allows the user to parentally control this program or any attribute of this program. |
| Favorite | Always | Allows the user to add this program or any attribute of this program to a custom user profile. |
| Shop | Products are available for purchase relating to this product. | Allows the user to see information on related products and to interactively order any of these products. |
| Gift Order | The program is purchasable. | Allows the user to purchase a program and send the authorization to view the program to a user at another location. |
| Mail | Always | Allows the user to send mail relating to this program to another user. |
| Send | The program has not | Allows the user to send an |

| Option | Displayed When | Action |
| --- | --- | --- |
| Reminder | yet started. | automatic program reminder for this program to a user at another location. |
| Notify | The program is not yet available on television. | Provides user notification when this program becomes available on television. |
| Review | A critical review is available. | Provides a review of the program, or a list of reviews that the user may choose from. |
| Preview | A video preview of the program is available. | Displays a video preview of the preview in the video window. |
| Record | Only display if program is not copy protected. | Allows the user to record the selected program. |
| Delete | This program has been previously recorded for the user. | The guide deletes the program from storage. |
| Save | This program has been previously recorded for the user. | The guide marks the program in storage to not be automatically deleted. |
| Find Similar | Always | The guide displays programs that are similar to the selected program, or displays a list of attributes of the selected program and allows the user to choose from among them to find matching programs. Further features of an electronic program guide with related-program search features are described in Herrington et al. U.S. patent application Ser. No. 09/451,612, filed Nov. 30, 1999, which is hereby incorporated by reference herein its entirety. |
| Chat | Always | Allows the user to initiate or join a chat session related to the program. |
| Discussion | There are one or more discussion groups (newsgroups) relating to the program. | Displays a list of discussion groups and allows the user to go to one of them. |
| Gossip | Gossip column is available relating to this program. | Displays the gossip column, possible including text, graphics, video, etc. |
| Fast Forward | The guide is currently playing a video clip in the video window. | Moves quickly through the video clip. |
| Rewind | The guide is currently playing a video clip in the video window. | Moves quickly backwards through the video clip. |
| Stop | The guide is currently playing a video clip in the video window. | Stops playback of the video clip. |
| Pause | The guide is currently playing a video clip in the video window. | Temporarily pauses playback of the video clip. |
| Web | There are one or more web sites relating to the program. | Displays a list of web sites and allows the user to go to one of them. |
| Local Showings | This is information about a movie in theatrical release, or an event that can be viewed live locally. | Displays information about the available local showings, and allows the user to purchase tickets. |
| More Description | More details about the program are available. | Displays more details about the program. |
| Video Clips | One or more video clips relating to the program are available. | Displays a list of available video clips and allows the user to view one of them. |
| Article | Magazine-type article is available relating to this program. | Displays the article, possible including text, graphics, video, etc. |
| Contest | A contest relating to this program is available. | Presents information about the contest and allows the user to enter it. |
| Trivia | One or more trivia questions are available relating to the program. | Presents the questions, and allows the user to view the answers. |
| Respond | User response has been defined for this program. | Allows the user to send a response to an entity relating to the program, such as producers or cast members. |
| Rate | Ratings are being collected for this program. | Allows the user to rate this program, and to send that rating to the ratings collector. |
| Ratings | Ratings information is available. | Displays the ratings information, possibly collected from other guide users. |
| Actor, Producer, Director, etc. | Information is available for anyone associated with the program (may be individual buttons for each, or one button that provides a list). | Presents an Information screen for that person. That Information screen may have an option to present a list of programs with which that person was associated, and to select any program for more information. |
| Wager | Displayed when selected program supports wagering, and if user is in a jurisdiction where the particular type of wagering is legal. | Presents information about the wagering options and allows the user to place a wager. |
| Live Update | Displayed when live program supports transfer of live information. | Presents live information to the user for viewing (e.g., sports scores, live news updates, etc.). |
| News Brief | Displayed when program supports news updates related to the program. | Presents news for viewing (e.g., news may be video, audio, or textual). |

Figure 8:
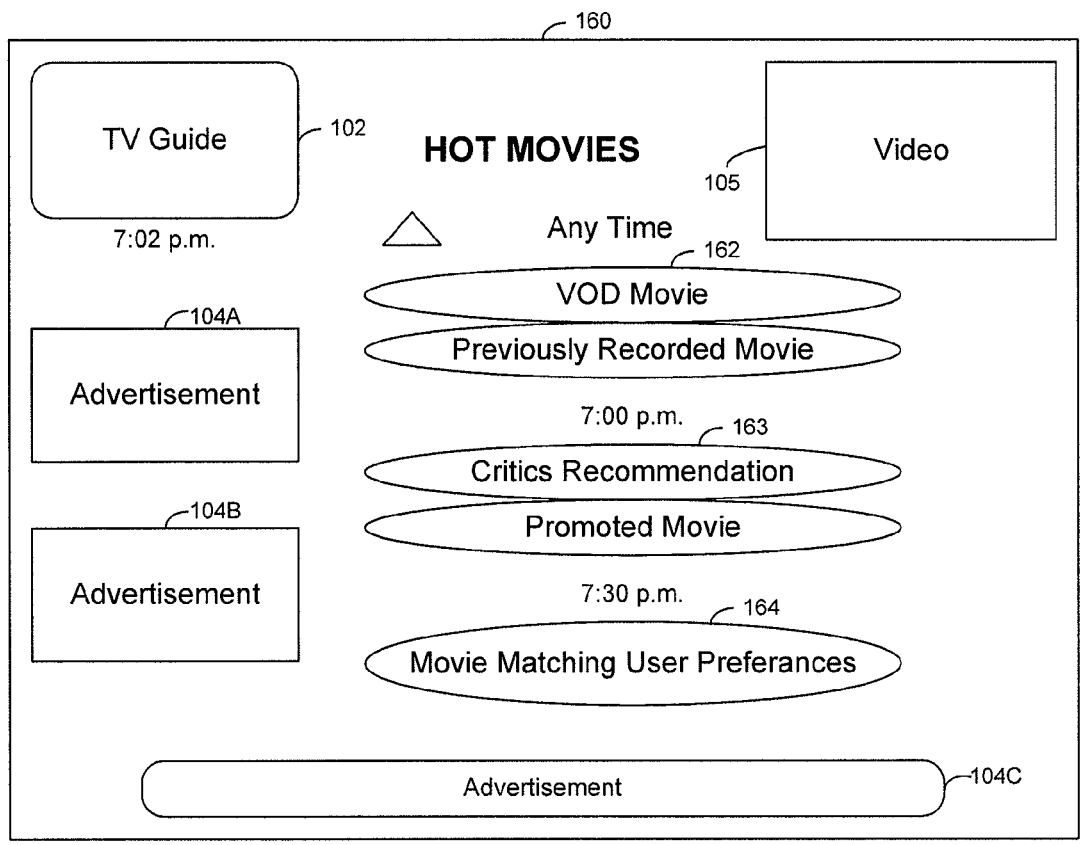
FIG. 8 is an illustrative interactive television display screen for hot movies in accordance with the present invention.

If the user selects Hot option 132B from Movies screen 130, the guide may present a screen such as Hot Movies screen 160 of FIG. 8. Listing screen 160 may include movies available on demand, movies the user has previously recorded, as well as scheduled movies as shown in list 162. Movies may be included on screen 160 based on critic's recommendations, as well as on promotional agreements as shown in list 163. Movies may also be included based on matching user profile preferences as shown in list 164. In addition, movies for which the user requested notification may be included on this listing. Programs may be sorted based on start time, with on-demand and recorded movies listed first. The programs displayed in screen 160 may be sorted and selected by a processor at the television distribution facility, in a server at another location, or in set-top box 26.

The hot movies shown in FIG. 8 may also be selected by the program guide based upon the user's viewing habits. The user's viewing habits may be monitored, for example, by a processor in set-top box 26, a processor at a television distribution facility, or one of the servers shown in FIGS. 1A-1C. The processor or server may then search program guide database 14 for programs that match search criteria based upon the user's viewing habits. Further features of an illustrative television system with aided user program searching are described in Boyer et al. U.S. patent application Ser. No. 09/330,793, filed Jun. 11, 1999, which is hereby incorporated by reference herein in its entirety.

Figure 9:
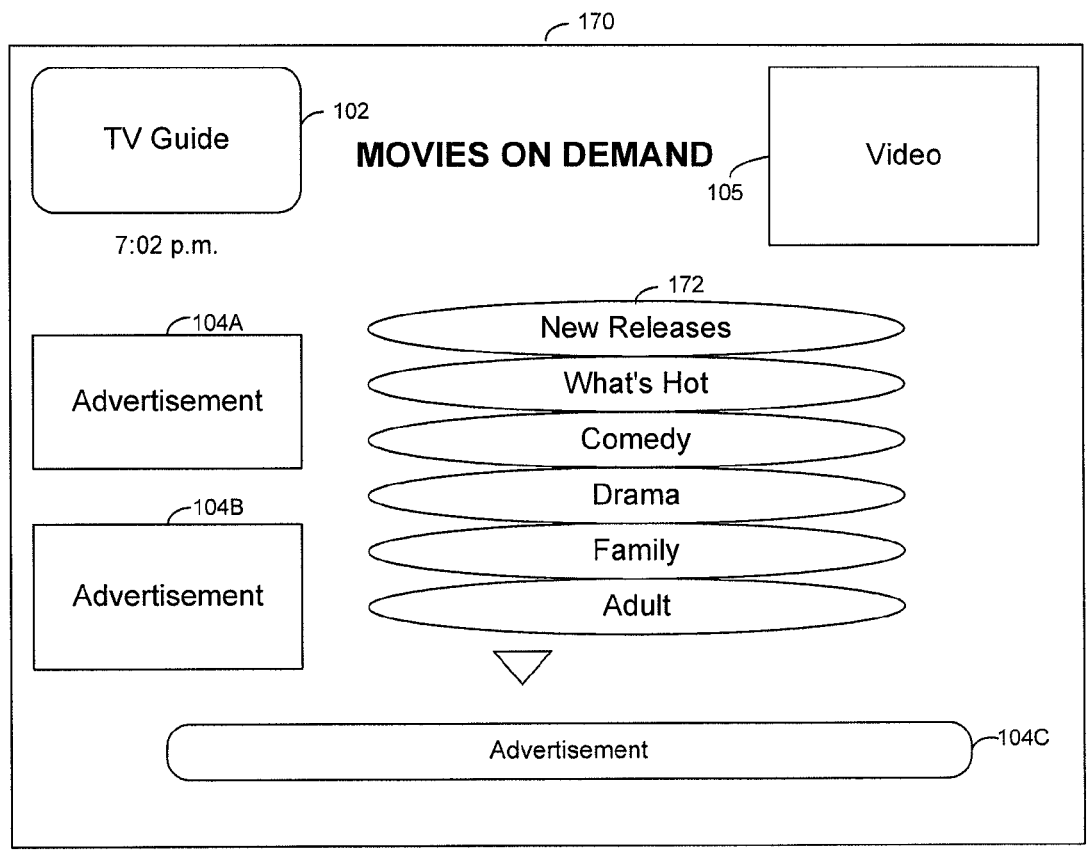
FIG. 9 is an illustrative interactive television display screen for movies on demand in accordance with the present invention.
Figure 10:
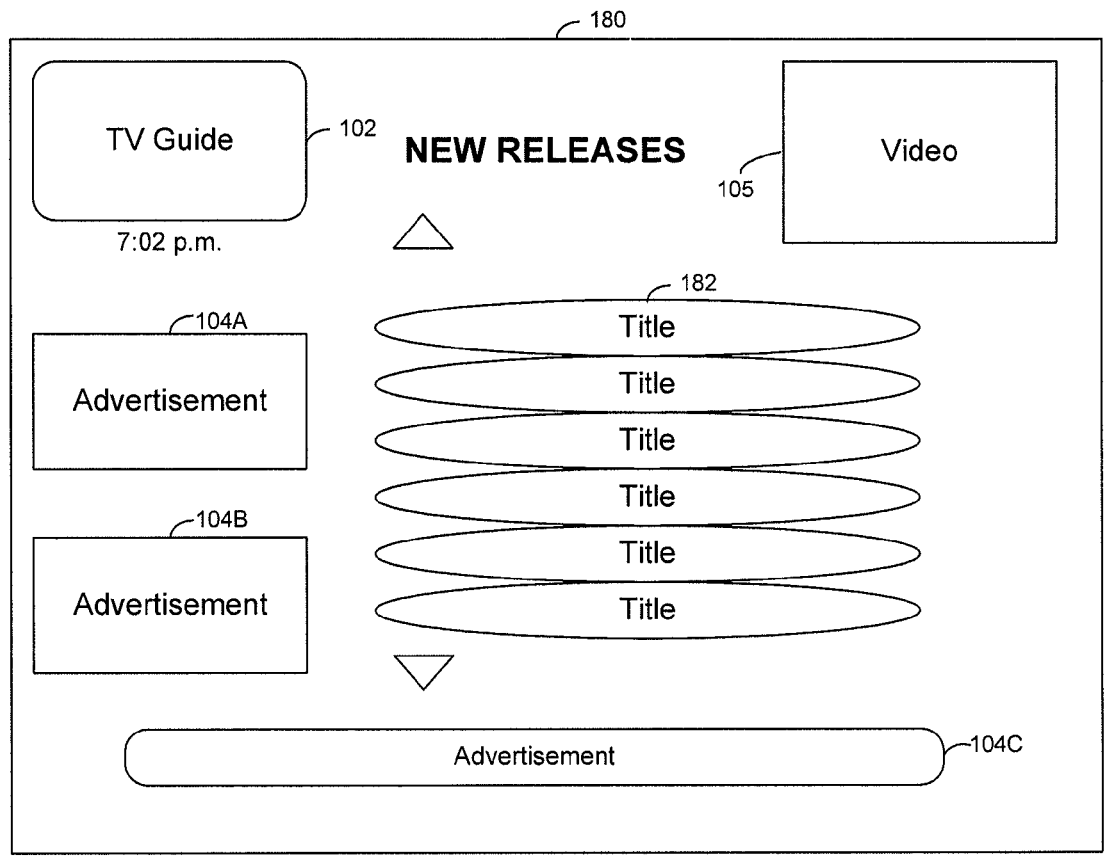
FIG. 10 is an illustrative interactive television display screen for providing a listing of programs that are new releases in accordance with the present invention.

If the user selects On Demand option 132C from Movies screen 130, the guide may present the Movies On Demand screen 170 shown in FIG. 9. Screen 170 may provide the user with various methods of accessing a list of movies available on demand. This may include options to view new releases, to view "hot" releases, and to view movies of a specific genre, such as comedy, drama, family, and adult by selecting from list 172. It may also include (not shown) options to find movies alphabetically, to see movies with special offers, to see movies that will be available soon on-demand, to view the staff picks of the service provider, etc. Picking one of the options, such as the New Releases option in list 172, may present a listing screen, such listing screen 180 shown in FIG. 10, that provides movies on demand related to the selected option. Choosing any of the programs from listing screen 180 causes the guide to display a Program Information screen for the selected program (such as screen 150), allowing the user to find out about the movie, to view a preview video clip, and to order it.

Figure 11:
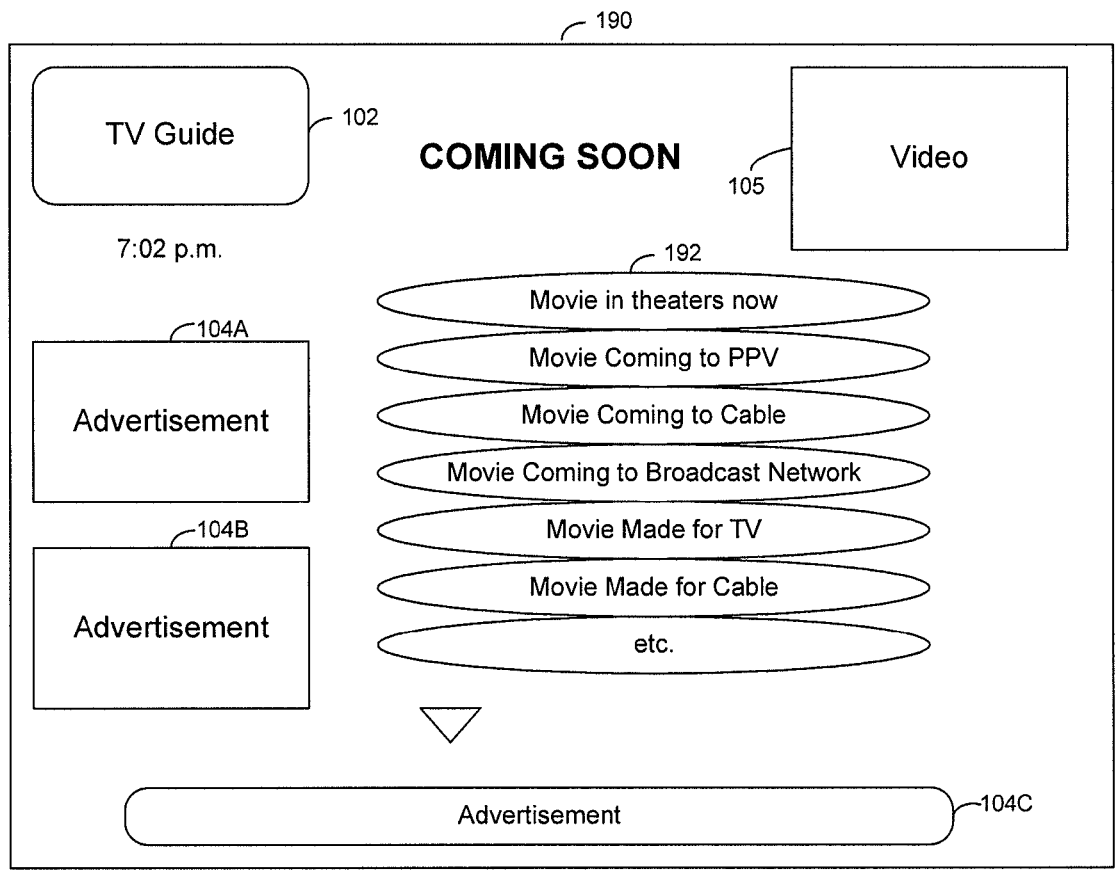
FIG. 11 is an illustrative interactive television display screen for movies that are coming soon in accordance with the present invention.

FIG. 11 shows an example of the Movies Coming Soon screen that may be displayed if the user selects Coming Soon option 132D from Movies screen 130. This screen shows list 192 of movies that are not currently scheduled in the time frame supported by the guide, but which will be available on Television in the future. List 192 may include options such as a movie that is currently in theatrical release, and which will be available on-demand or on pay-per-view in the next few weeks, a movie that may be available on cable channel, and a movie that will be available on broadcast networks. List 192 may also include a made-for-cable movie and a made-for-Television movie. The listings of movies or categories of movies coming soon may be maintained on a server at the television distribution facility or at database 14 and available on request by the program guide at set-top box 26.

The user may select a movie in listing 192 to view a Program Information screen for that movie which allows the user to view information related to the movie or find local theatrical showings. The Program Information screen may show the projected availability date and/or channel of the movie. The Program Information screen also allows the user to request a notification when the selected movie becomes available within the guide. Further features of an illustrative electronic program guide with advance notification is described in McKissick et al. U.S. patent application Ser. No. 09/378,533, filed Aug. 20, 1999, which is hereby incorporated by reference herein in its entirety.

Figure 12:
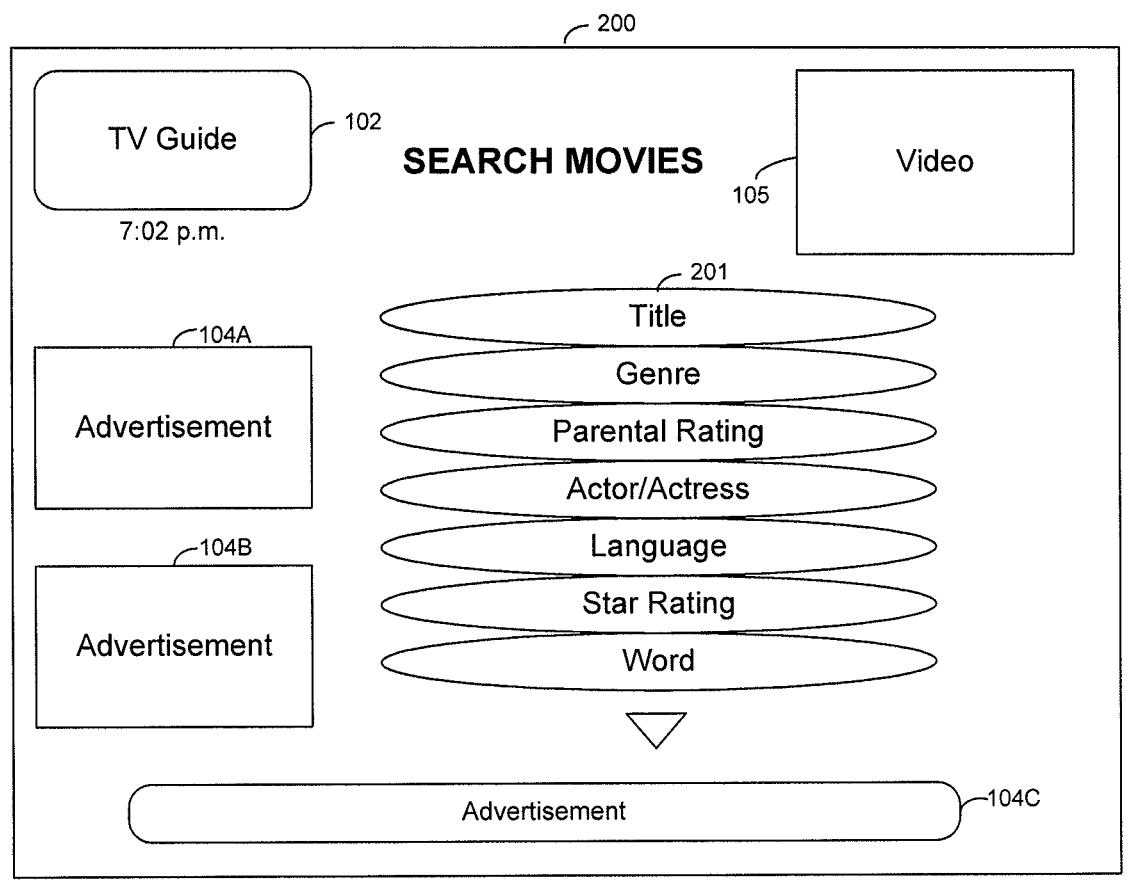
FIG. 12 is an illustrative interactive television display screen for searching for movies in accordance with the present invention.

FIG. 12 shows screen 200 that may be displayed if the user selects Search option 132E of Movies niche hub screen 130. This feature allows the user to search the complete database of movies based on selected criteria, such as the movie title, the movie genre, the parental (e.g., MPAA) rating, actors/actresses/producers/directors and other movie credits, the language of the movie, critic's star ratings, or any word or phrase that may be found in the movie information by selecting a search criteria category from list 201 in screen 200. Other criteria may include availability of high quality audio or video formats, year of release, or any other information in the movie database.

Once the user has selected a search criteria category from list 201, the program guide may provide the user with an opportunity to select or enter one or more search criteria (e.g., such as a specific title, genre, parental rating, actor, language, star rating, word, etc.). Once the user has entered one or more search criteria, the guide will display a list of matching movies. This may include movies on television, movies in theatrical release, and movies not currently available. The user may be given the opportunity to select a sorting criteria, such as by year of release, by title, or by time of airing on television. The user may select any individual movie to find out when it is available, select a reminder or advance notification, or any other action appropriate to the selected movie.

The searchable program database may be part of database 14, or it may be located at a television distribution facility or other location that is connected to the user television equipment through a communications network. The search criteria may be transmitted to the television distribution facility from the set-top box along an out-of band data channel or separate communications link (e.g. a direct Internet connection to the set-top box), and then transmitted to the searchable database from the television distribution facility. The search results may be transmitted from the searchable database back to the user along the same channel or link, or a separate channel or link. The program guide may also search multiple databases and combine the results to present to the user.

Figure 13:
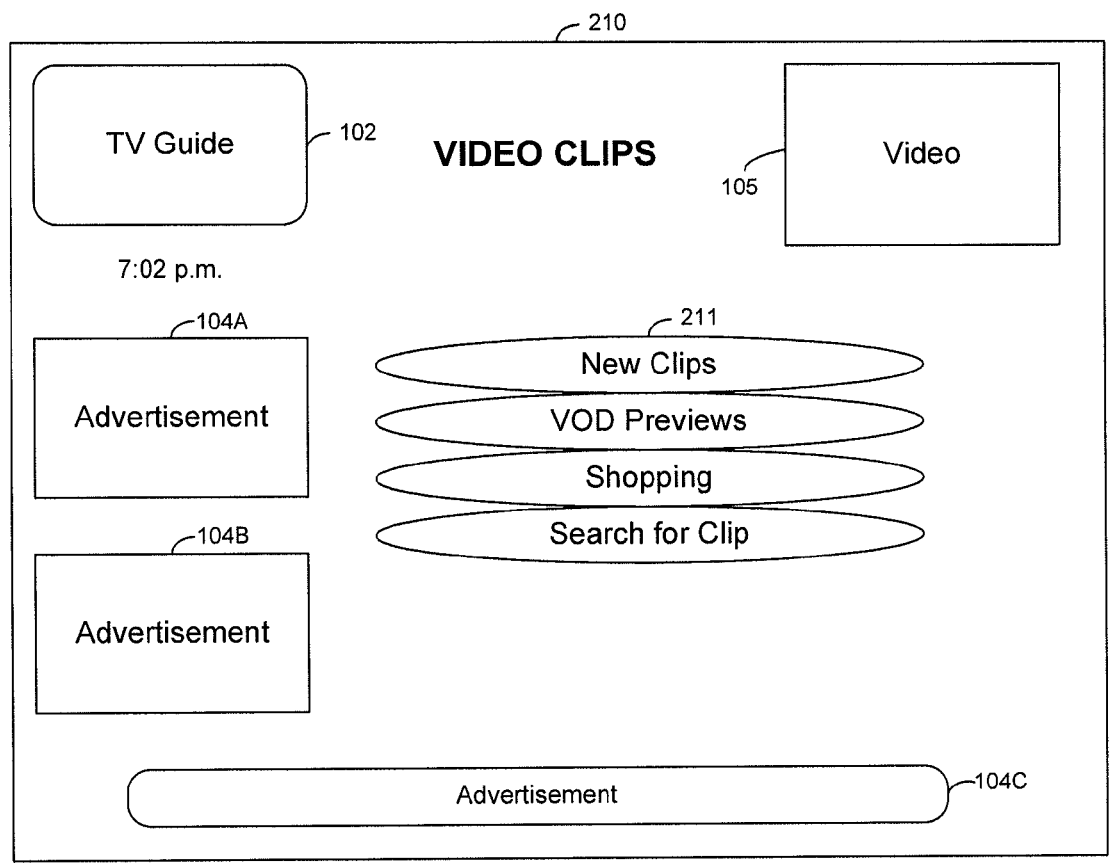
FIG. 13 is an illustrative interactive television display screen providing a listing of video clips in accordance with the present invention.

If the viewer selects Video Clips option 132F from Movies screen 130, the program guide may display a screen such as screen 210 shown in FIG. 13. Screen 210 allows the user to find specific video clips and to display them. The screen may allow the user to see a list of new video clips, to see a list of clips related to video on demand movies, to see a list of clips related to shopping, to see other predefined lists of video clips, or to search for a clip or clips by selecting an option from list 211. The program guide may provide the user with an opportunity to search for a video clip or clips, for example, by providing a television screen similar to screen 200 shown in FIG. 12. When the user selects a specific clip from list 211, it may be shown in the video window of a Program Information screen, or it may be shown as a full-screen video. The video clips may be maintained on a database 14 or on a server at the television distribution facility or elsewhere and transmitted to the user television equipment along communications paths shown, for example, in FIGS. 1A-1C.

While viewing the Program Information screen for any program with related video clips, the guide may also present the option to view any of those clips.

Figure 14:
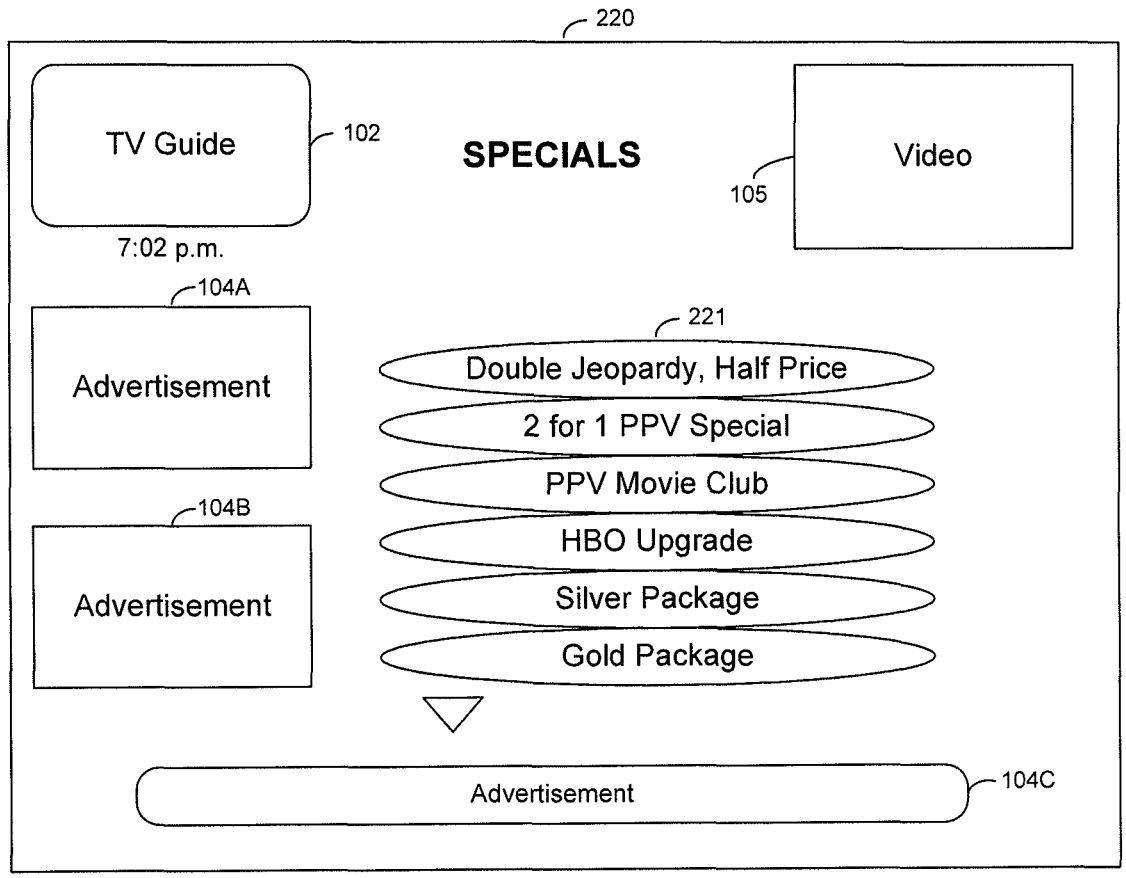
FIG. 14 is an illustrative interactive television display screen providing special ordering information in accordance with the present invention.

Selecting Specials option 132G from Movies screen 130 (FIG. 5) may display a screen such as screen 220 shown in FIG. 14. This screen presents list 221 of special offers related to movies that may be available from the system provider. These offers may include a special deal on a VOD movie, buy one get one free offers, movie clubs allowing the user to get discounts on purchases of multiple movies, upgrades of single or multiple movie channels, etc. Selecting a specific offer may display a screen similar to the Program Information screen with details on the offer, such as price and description, and the option to purchase the offer. When the user purchases one of the special offers, this information along with the user's account information may be transmitted to the television distribution for processing so that the user can access the purchased channels, programs, etc., and the user's account may be debited. Further features of an illustrative interactive television program guide system with pay program package promotion are described in Knudson et al. U.S. patent application Ser. No. 08/944,153, filed Oct. 6, 1997, which is hereby incorporated by reference herein in its entirety. While viewing the Program Information screen for any program that is part of a special offer, the guide may present the option to view and/or purchase any of those offers.

Figure 15:
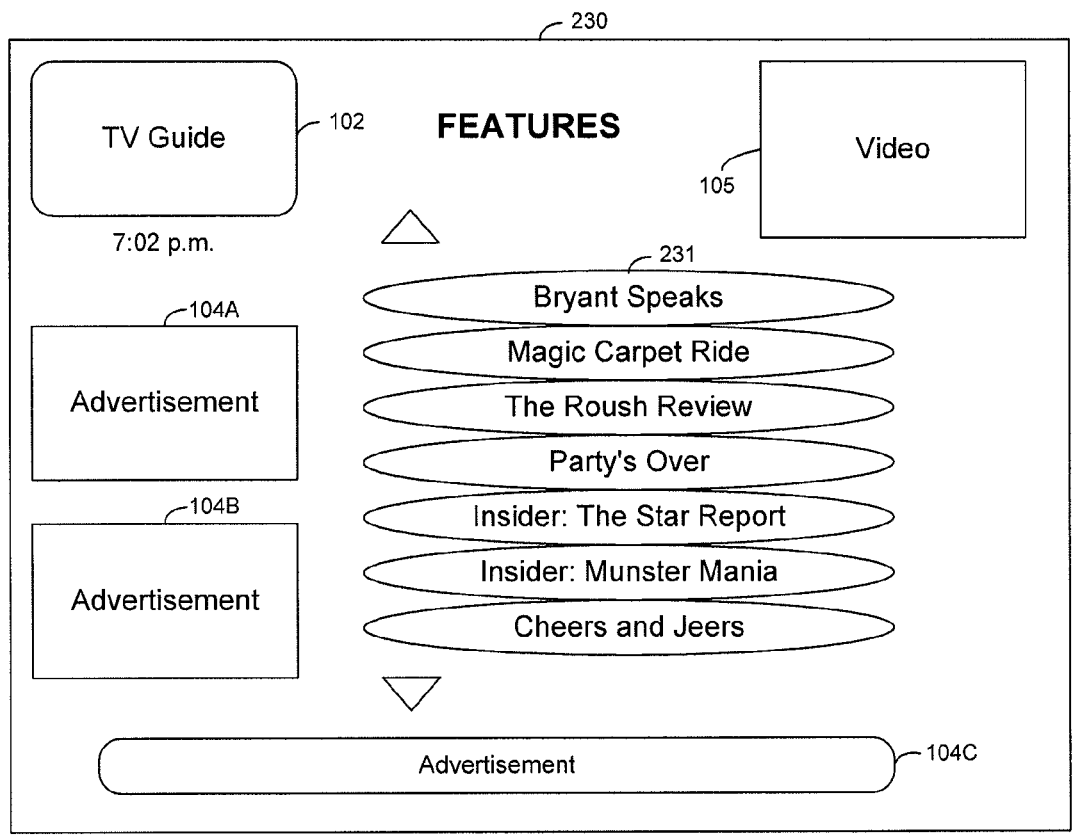
FIG. 15 is an illustrative interactive television display screen for program features in accordance with the present invention.

If the user selects Features option 132H from Movies screen 130, the guide may display a list of magazine-type feature articles. These articles may be taken directly from a magazine such as TV Guide Magazine, edited for the interactive program guide, or created for the interactive program guide. FIG. 15 shows such a list 231 in screen 230, as might be displayed if Features option 106L were selected from the Main Menu 100 of FIG. 2. If Features option 132H selected from Movies screen 130, this screen would include only features related to movies. The Features in list 231 may be filtered based on the current selected theme (e.g., movies) by a processor at the television distribution facility, the user television equipment, or a remote server from where the Features data was accessed so that only movie related features are provided in list 231.

Figure 16:
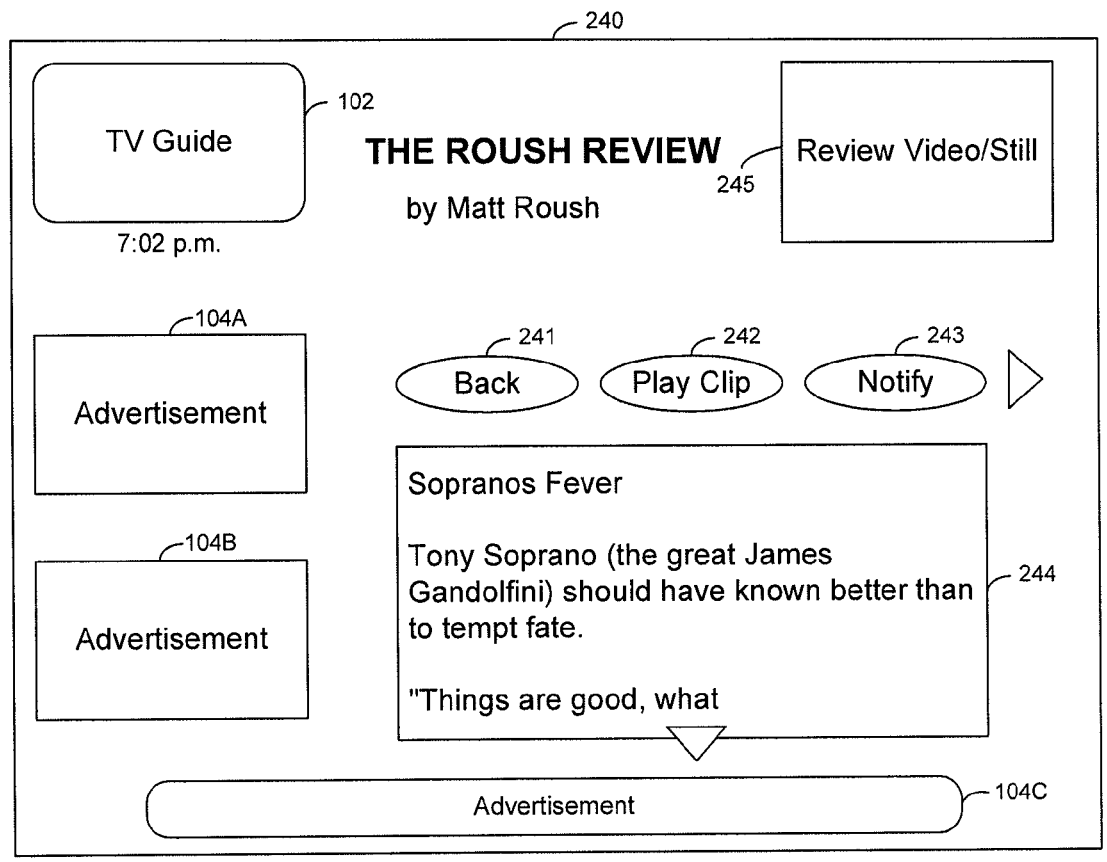
FIG. 16 is an illustrative interactive feature information display screen in accordance with the principles of the present invention.

Selecting any individual item from Features screen 230 may display a screen such as screen 240 shown in FIG. 16. Screen 240 may include a still image or video clip 245 related to the article, as well as the text of the article displayed in region 244. Screen 240 includes Back option 241 to return to the previous display screen. Screen 240 may include an option to start playing of the video clip in region 245 (e.g., such as option 242), or an option to stop playing the video clip (not shown). If the article is about a specific program, there may also be options related to that program. In the example of FIG. 16, the article is about a program that is not currently in the time frame covered by the guide, so the guide presents Notify option 243. Selecting option 243 would cause the guide to provide a user notification when the series season premiere for the program is to be shown. While viewing the Program Information screen for any program that has one or more related feature articles, the guide may also provide the option to access those articles directly. Data displayed in features screens 230 and 240 may be obtained from a server or database and transmitted to the user television equipment as shown, for example, in FIGS. 1A-1C.

Figure 17:
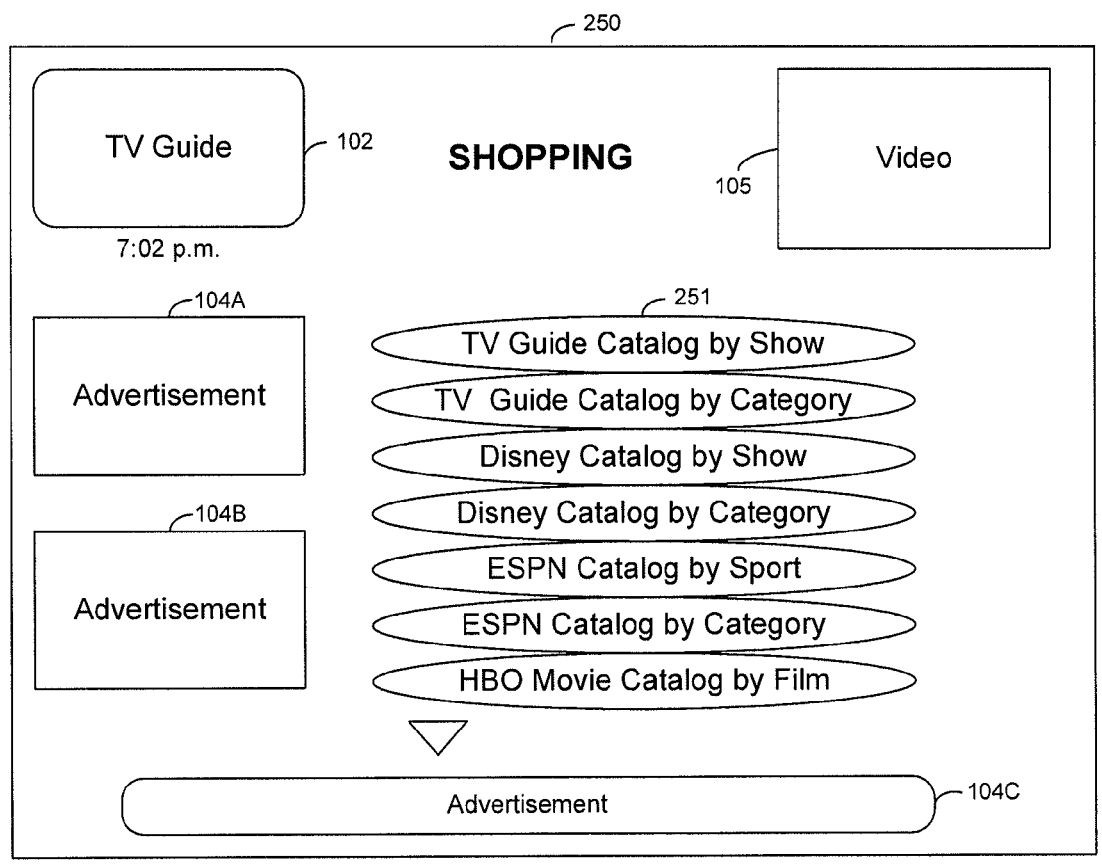
FIG. 17 is an illustrative interactive television display screen for shopping in accordance with the present invention.

FIG. 17 shows a screen that might be displayed if the user selects Shopping option 132I from the Movies screen 130 or Shop option 106K from the Main Menu screen 100. If selected from the Movies screen, this screen may be limited to only shopping related to Movies. Screen 250 in FIG. 17 shows list 251 of merchandise catalogs, sorted in various ways. The user may select one of the options in list 251 to see a list of available merchandise, or may be given the option to search one or more of the catalogs for specific items, types of items, items related to a specific movie, etc. On selecting a specific item, a screen similar to the Program Information screen may be presented to allow the user to order the item. While viewing the Program Information screen for any program that has related merchandise, the guide may also provide the option to order any of those items. If desired, the user may purchase the program merchandise as a gift for another person. Further features of an illustrative system for purchasing gifts for others through user television equipment are described in McKissick et al. U.S. patent application Ser. No. 09/356,245, filed Jul. 16, 1999, which is hereby incorporated by reference herein in its entirety. The program guide at the user television equipment may obtain data relating to purchasing available merchandise such as lists of products, product descriptions, and prices, from one or more servers or databases located at the main facility 12, the television distribution facility, or elsewhere along communications paths shown, for example, in FIGS. 1A-1C.

The interactive program guide with niche hubs of the present invention may act as a portal for other applications that are part of the niche hub. The interactive program guide may provide the other applications with access to various guide features (e.g., access to memory, access to remote control keys, tuning, parental control, user favorites, database access, etc.), and may share data and code with the other applications. The advantages of using the program guide application as a portal may include sharing a common user input device between the interactive program guide and the other applications to increase user friendliness, eliminating resource contention, and reducing the amount of code and data required by each application.

The interactive program guide of the present invention may act as portal to other applications that are features of the niche hubs using hot-linking. Hot linking involves invoking an application that has been preselected based on the current content of the program guide or status of set-top box 26. For example, if the user is watching a program, viewing a program listing, viewing the description of a program, or taking other action within the program guide related to a given program, channel, type of channel, or the like and the user directs the program guide to launch an application, the program guide may launch that application and direct that application to take an action related to the given program, channel, type of channel, or the like.

Hot links may be activated by dedicated buttons, a launch button, menu options, or any other suitable technique. The niche hubs of the present invention may use hot linking to launch applications accessible within the hub. For example, if the user selects an option to purchase merchandise in the movies niche hub screen 130, the guide may launch a shopping application (e.g., for purchasing program-related merchandise) and direct the shopping application to display catalogs and merchandise related to movies (e.g., HBO Movie Catalog by Film as shown in list 251 in screen 250). Further features of an illustrative electronic program guide as a portal for other applications are described in Ellis et al. U.S. patent application Ser. No. 09/346,164, filed Jul. 16, 1999, which is hereby incorporated by reference herein in its entirety.

Figure 18:
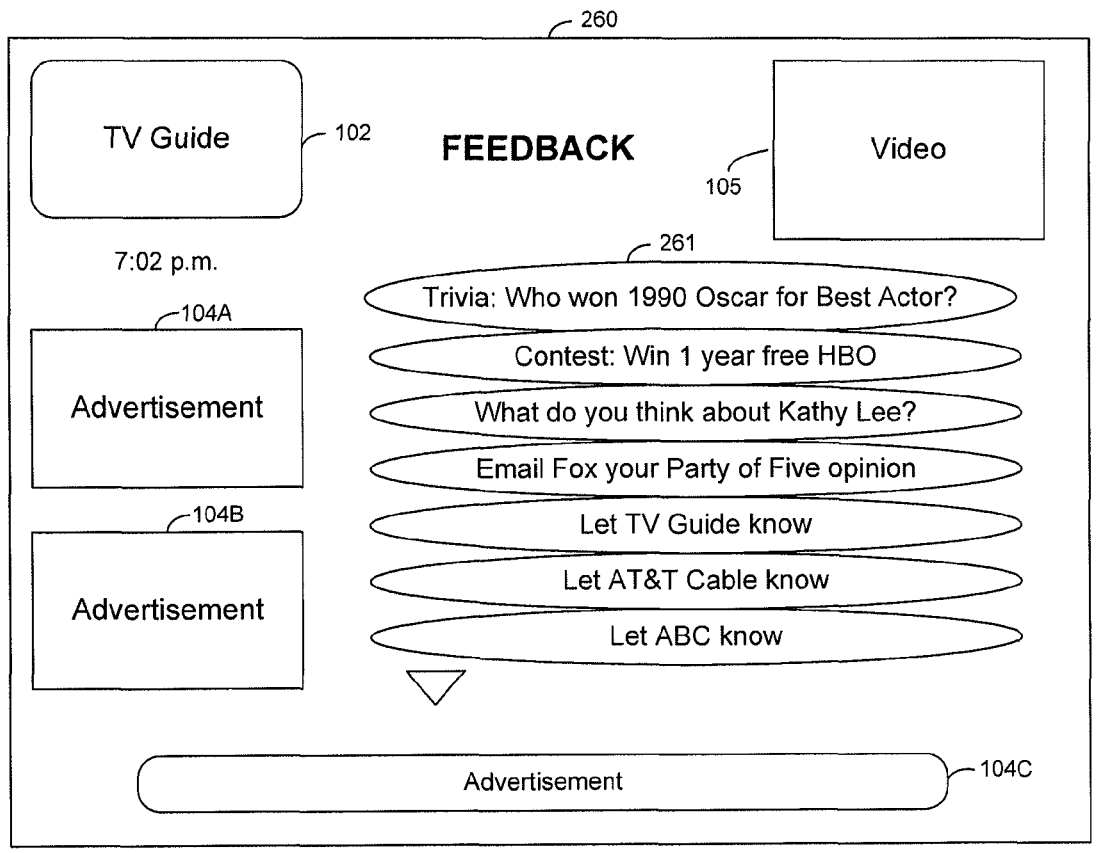
FIG. 18 is an illustrative interactive television display screen for providing feedback in accordance with the present invention.

FIG. 18 shows screen 260 that might be displayed if the user selects Feedback option 106P from the Main Menu screen 100 or Feedback option 132K from Movies screen 130. If selected from the Movies screen 130, this screen may be limited to only feedback related to Movies. This filtering function may be performed by a processor in the user television equipment, at the television distribution facility, or elsewhere. Screen 260 provides list 261 of feedback options that user may select (e.g., using UP or DOWN keys on the remote control). The Feedback in list 261 may include opportunities for the user to provide several types of feedback. For example, it might include trivia questions, or the opportunity to enter a contest. It may support opinion polling, such as the option to answer personal opinion questions related to movie or television personalities. It may allow the user to send a message to studio executives regarding the cancellation of a television series. It may also allow the user to send an electronic mail message to the guide provider, to the television service provider, or to any specific programmer. If any specific program has related feedback opportunities, these options may be made available from that program's Program Information screen. When the user selects an option in list 261, the program guide may, for example, provide the user with a blank screen or region on the screen where the user may compose a message by using an alphabetic keypad on the remote control, a wireless keyboard, an on-screen keyboard, etc. The program guide may provide the user with a Send option to transmit the message to the recipient when he is finished composing the message. The message may then be transmitted to message processing facility 71 along paths shown, for example, in FIG. 1D. Message processing facility 71 may be a television network or a facility that conducts contests or processes messages from television customers. Further features of an illustrative television message system is described in McKissick et al. U.S. patent application Ser. No. 09/356,245, filed Jul. 16, 1999.

Figure 19:
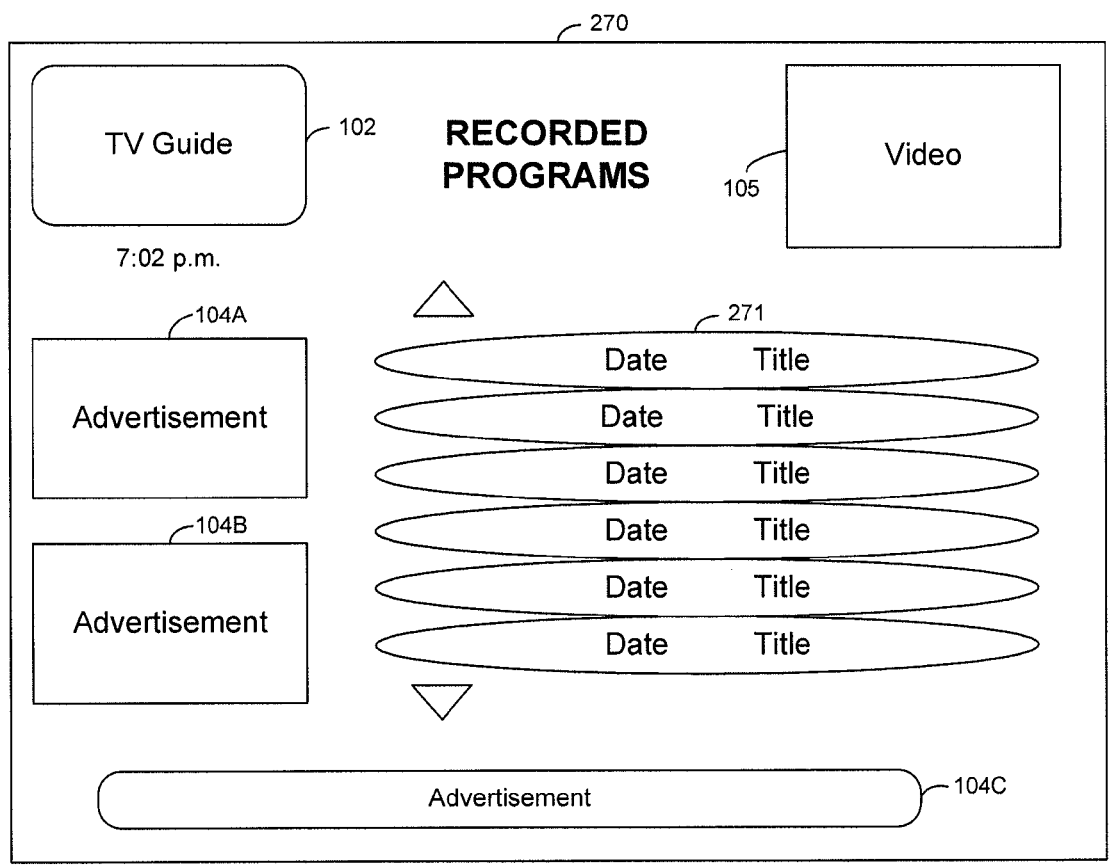
FIG. 19 is an illustrative interactive television display screen listing recorded programs in accordance with the present invention.

FIG. 19 shows screen 270 of that provides listing 271 of programs that have been previously recorded for the user. These programs may have been recorded because of a specific user request, or based on user preferences. They may have been recorded locally, for example on a hard drive or recordable DVD or videocassette recorder in the home (video recorder 28), or they may have been recorded at a centralized server that provides program-recording capacity for multiple homes (e.g., at a television distribution facility or elsewhere as shown in FIGS. 1A-1C). Selecting one of the titles from screen 270 may display the Program Information screen for that program, allowing the user to watch the program at any time. If the screen of FIG. 19 was displayed from Main Menu 100, it may include all programs recorded for the user household. If accessed from one of the niche hubs, it may only list those recorded programs matching the criteria of the hub—for example, listing only recorded movies if accessed from the Movies hub screen 130 of FIG. 5.

If desired, television programs may be recorded at one of the servers shown in FIGS. 1A-1C or at another memory storage device at a television distribution facility or connected to the user television equipment through the television distribution facility or a separate communications path (e.g., a phone line, cable line, satellite link, etc.). The program guide application or server may require that the user enter an debit account number before the transaction is complete so that the user's account may be charged. If desired, the user account information may be stored in set-top box 26 and sent to the television distribution facility so that the user's account may be charged for the recording. When the recording is complete, the program guide may notify the user that the program has been recorded and is available for viewing. Further features of an illustrative client-server based interactive television program guide system with remote server recording are described in Ellis et al. U.S. patent application Ser. No. 09/332,244, filed Jun. 11, 1999, which is hereby incorporated by reference herein in its entirety. The program guide application may also provide the user with an opportunity to record a program series (e.g., all the weekly episodes of a television sitcom in a programming season). Further features of an illustrative system for series recording from an interactive television program guide are described in Knudson et al. U.S. patent application Ser. No. 09/330,792, filed Jun. 11, 1999, which is hereby incorporated by reference herein in its entirety.

If the user selects My Schedule option 106N from the Main Menu screen 100 or the My Schedule option 132O from Movies screen 130, the guide may display a screen such as screen 280 that is shown in FIG. 20. Screen 280 displays a list 281 of all programs (or all programs matching the niche hub theme such as movies) that are scheduled for future viewing and recording. These programs may be scheduled for reminders, such as "Practical Magic" in the example. The check symbol in region 282 indicates that a reminder has been set for the program "Practical Magic." The programs in list 281 may be pay-per-view programs that have been purchased in advance, such as "Eyes Wide Shut" in the example. The dollar symbol in region 283 indicates that the movie "Eyes Wide Shut" is a pay per video program. The programs in list 281 may be programs that are scheduled to be recorded, such as "Bone Collector," which is also shown as a pay-per-view movie by the dollar symbol. The "R" symbol in region 284 indicates that the program "Bone Collector" has been scheduled to be recorded. Reminders and recordings may have been set for individual programs or as part of a series or package or programs. Further features of an illustrative system for series reminders from an interactive television program guide are described in Knudson et al. U.S. patent application Ser. No. 09/330,792, filed Jun. 11, 1999. Reminders and recordings may have been set explicitly by the user. They may also have been set automatically by the guide based on user preferences and history. Selecting a program from list 281 may display the Program Information screen for that program, allowing the user to cancel or modify the scheduled reminder, purchase or recording.

The program guide may provide the user with an opportunity to set a reminder remotely, such as via the Internet, via e-mail, or via a pager that will be displayed on the television electronic program guide. The program guide may also allow the user to set up a reminder at the user television equipment and send it to a remote location, such as to a personal computer, palmtop computer, pager, etc. The reminder may be displayed on the remote computing device at a appropriate time before the program begins. Reminder messages may be sent between user television equipment and user communications equipment (e.g., a personal computer, pager, palmtop, etc.) via two-way communications paths shown, for example, in FIG. 1B. Further features of an electronic television program guide with remote access are described in Ellis et al. U.S. patent application Ser. No. 09/354,344, filed Jul. 16, 1999, which is hereby incorporated by reference herein in its entirety.

The program guide may also provide the user with an opportunity to set a reminder for another person (e.g., a user of another user television equipment or user communications equipment). The reminder for the other person may sent to the recipient's user television equipment via the communications paths shown in FIGS. 1A-1C. The reminder may also be sent to the recipient's personal computer over the Internet or over communication paths shown in FIG. 1B. Further features of an illustrative system for sending reminders to others through user television equipment is described in McKissick et al. U.S. patent application Ser. No. 09/356,245, filed Jul. 16, 1999.

Figure 21:
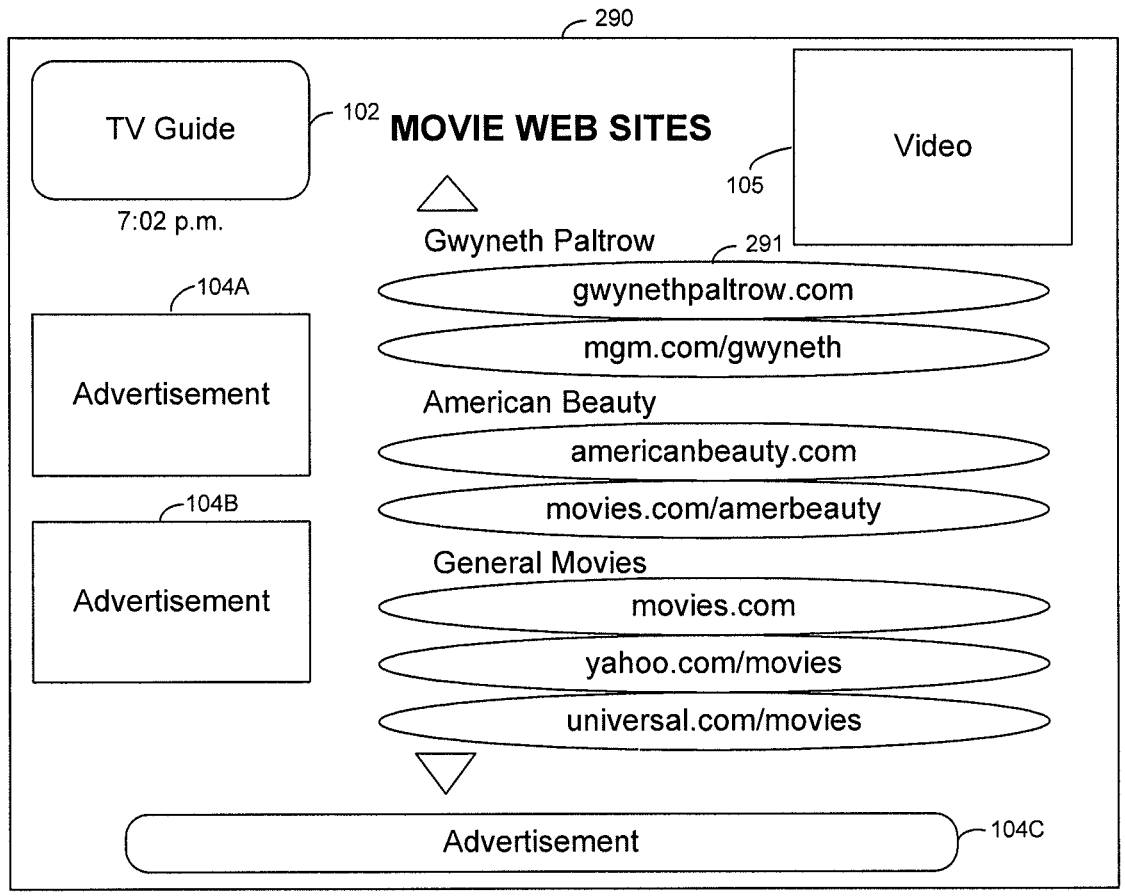
FIG. 21 is an illustrative interactive television display screen listing movie web sites in accordance with the present invention.

FIG. 21 is an example of screen 290 that may be displayed if the user selects the Web option 106M from the Main Menu 100 or Web option 132L from the Movies screen 130. Screen 290 provides list 291 of web sites related to the selected niche hub (e.g., movie web sites if option 132L is selected by the user to display screen 290), or general program-related web sites (if screen 290 is accessed from screen 100), and allows the user to choose one and view it. A web feature may also allow the user to search for related web sites, to mark them as favorites, to parentally control them, etc. If any specific program has related web sites, those sites may be made available from the Program Information screen for that program. The program guide may obtain URLs for and data from the web pages from a web server connected to the television distribution facility as shown, for example, in FIGS. 1A-1B.

Figure 22:
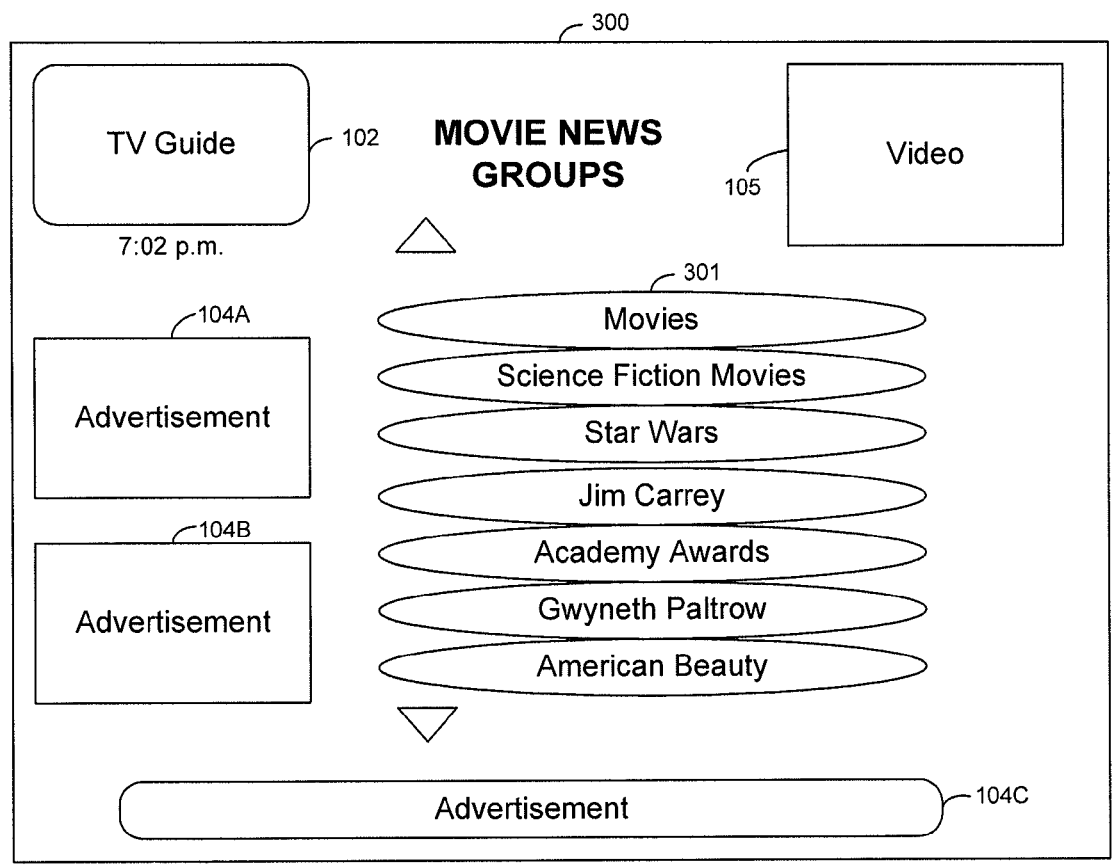
FIG. 22 is an illustrative interactive television display screen listing movie news groups in accordance with the present invention.
Figure 23:
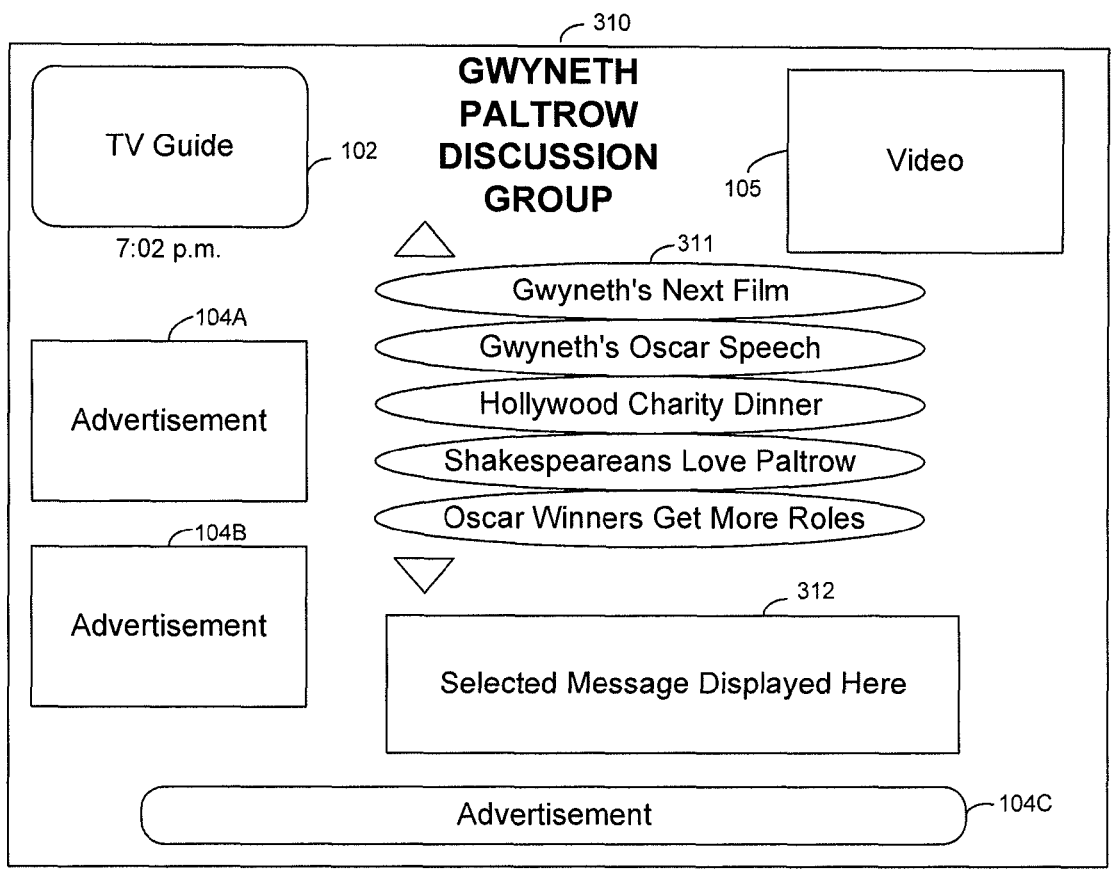
FIG. 23 is an illustrative interactive television display screen for a discussion group in accordance with the present invention.

FIG. 22 shows screen 300 that may be displayed when the user selects a Discussions option from the Main Menu 100 or Discussions option 132M from a niche hub such as the Movies hub screen 130. Screen 300 provides list 301 of news groups or discussion groups related to the topic of the niche hub (if screen 300 is entered from a niche hub such as screen 130). If the user selects a discussion group from list 301 (such as the Gwyneth Paltrow discussion group), the program guide may display messages from the discussion group in a list such as list 311 on screen 310 of FIG. 23. The user may select a message from list 311 to display the message in overlay 312 for viewing by the user.

A discussion feature may also allow the user to group the discussion groups, to view conversation threads, to save or delete messages, to subscribe or unsubscribe to specific discussion groups, etc. If any specific program has related discussion groups, those discussion groups may be made available from the Program Information screen for that program. The program guide may obtain data containing lists of discussion and news groups and messages within the discussion and news groups from a server or database located at the television distribution facility, main facility 12, or elsewhere along paths shown, for example, in FIGS. 1A-1C. Further features of an illustrative interactive television system with news groups are described in Ellis, U.S. patent application Ser. No. 09/605,683, filed concurrently herewith, which is hereby incorporated by reference herein in its entirety.

Figure 24:
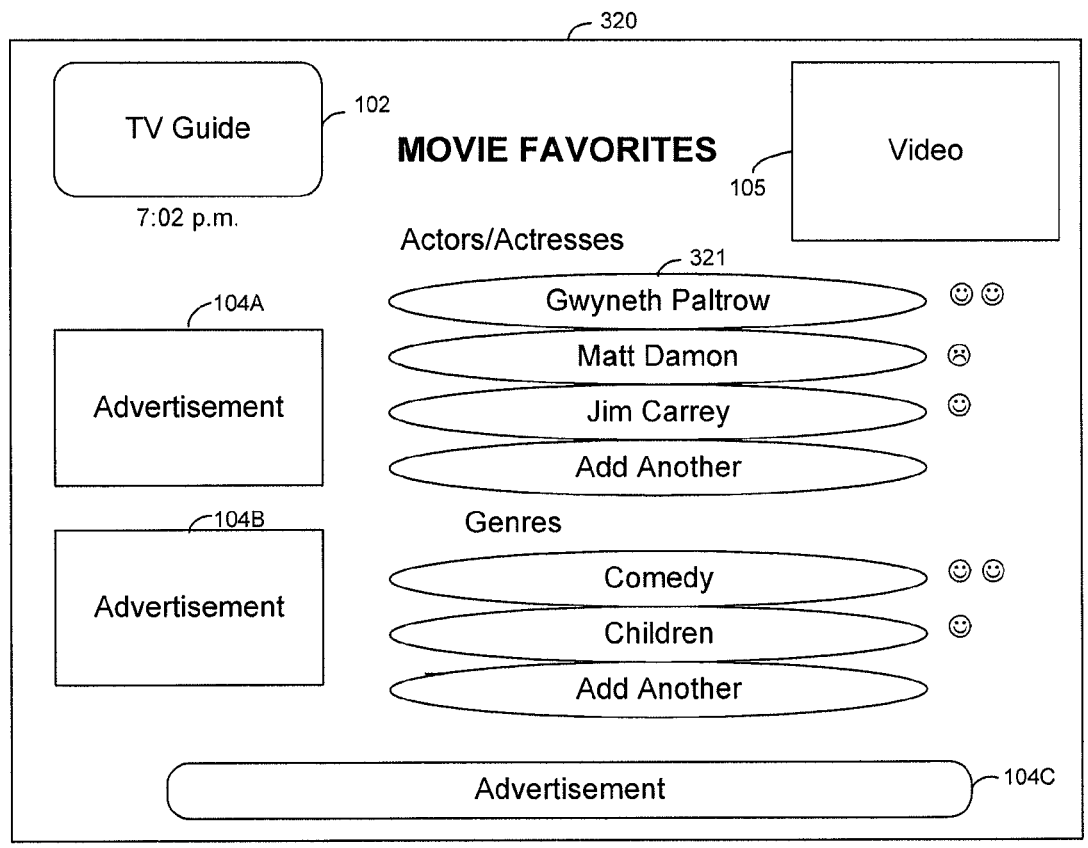
FIG. 24 is an illustrative interactive television display screen for movie favorites in accordance with the present invention.

Screen 320 in FIG. 24 is an example of a screen that may be displayed if the user selects Favorite option 132N from the Movies screen 130 (FIG. 5). Screen 320 provides list 321 of a number of categories in which the user can choose favorites, and a number of items within each category that the user can rate individually. For example, for the category "Actors/Actresses", the user has picked the individual items "Gwyneth Paltrow", "Matt Damon", and "Jim Carrey". The user has rated them with two happy faces, one unhappy face, and one happy face, respectively, to indicate whether the user likes movies starring these actors or not. This rating system is illustrative; any other rating system may be used. In the category "Genres", the user has selected the items "Comedy" and "Children's", and rated them two happy faces and one happy face, respectively, to indicate that the user likes children's movies and likes comedy movies even more.

Other categories that may be shown for movies include Directors, Producers, Channels, Parental (e.g. MPAA) ratings, Movie Titles, Language, Video Format (e.g., High Definition, Wide Screen, etc.), Audio Format (e.g., Digital Dolby, etc.). The program guide uses the user ratings (e.g., happy faces and unhappy faces in FIG. 24) to determine which programs the viewer is most likely to like or dislike. Programs with attributes the user has rated highly may be featured in various parts of the guide, and the guide may provide quick access to them, for example in listing screens. Programs with attributes that are rated low may be hidden from the user. The user may also rate individual movie critics. If the user rates a movie critic highly, the guide may give more weight to the critic's rating in determining what movies the viewer may like or dislike. These program guide functions with respect to changing program information displayed to the user based upon his or her preferences may be performed by a processor in the user television equipment or by a server at the television distribution facility or elsewhere in a client-server arrangement.

Attribute ratings may be set by the user on a screen such as 320. They may be set by the user after selecting a Favorite option from a Program Information screen for a certain program, at which point the guide may display the attributes of the selected program and allow the user to rate any of them, such as rating actors starring in a movie. Further features of an illustrative program guide system with preference profiles is described in Ellis et al. U.S. patent application Ser. No. 09/034,934, filed Mar. 4, 1998, which is hereby incorporated by reference herein in its entirety. The attribute ratings may also be set automatically by the guide based on program selections made by the user household.

If desired, the guide may support multiple sets of favorites based on household users, or for each niche hub. Upon selecting the Favorites option from any niche hub, the user is presented with the categories and items most appropriate for that hub. For example, the Movies Favorites screen may allow the user to rate Movie Critics, MPAA Ratings, and Movie Producers. The Sports Favorites screen may allow the user to rate individual sports and teams.

The user may add items to the Favorites list by selecting the Add Another option under any category in list 321. The program guide may then display a screen allowing the user to choose from items within the category, such as screen 330 shown in FIG. 25. Screen 330 displays list 331 of movie genres. The happy faces next to some movie genres indicate that the user has indicated these genres as his favorites (e.g., from a genre Information screen such as screen 340). The user may press UP or DOWN arrows on the remote control to select a genre in list 331.

Figure 25:
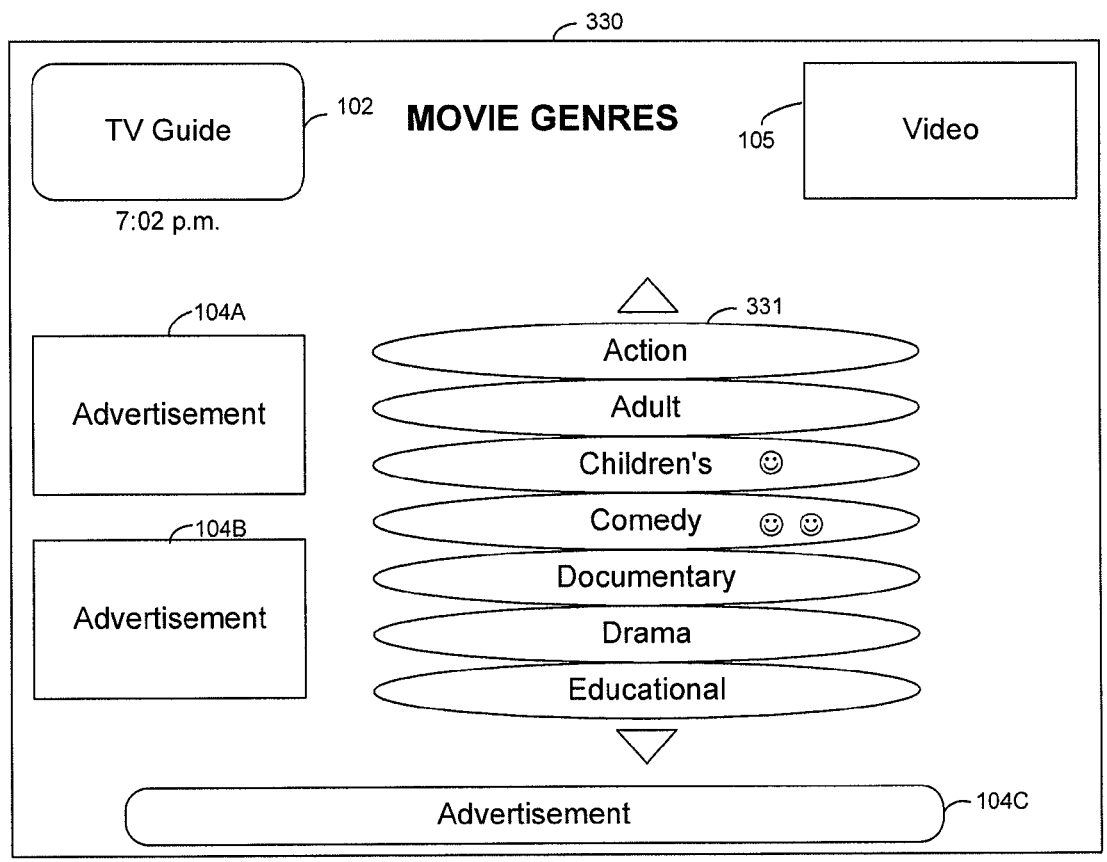
FIG. 25 is an illustrative interactive television display screen for movies genres in accordance with the present invention.
Figure 26:
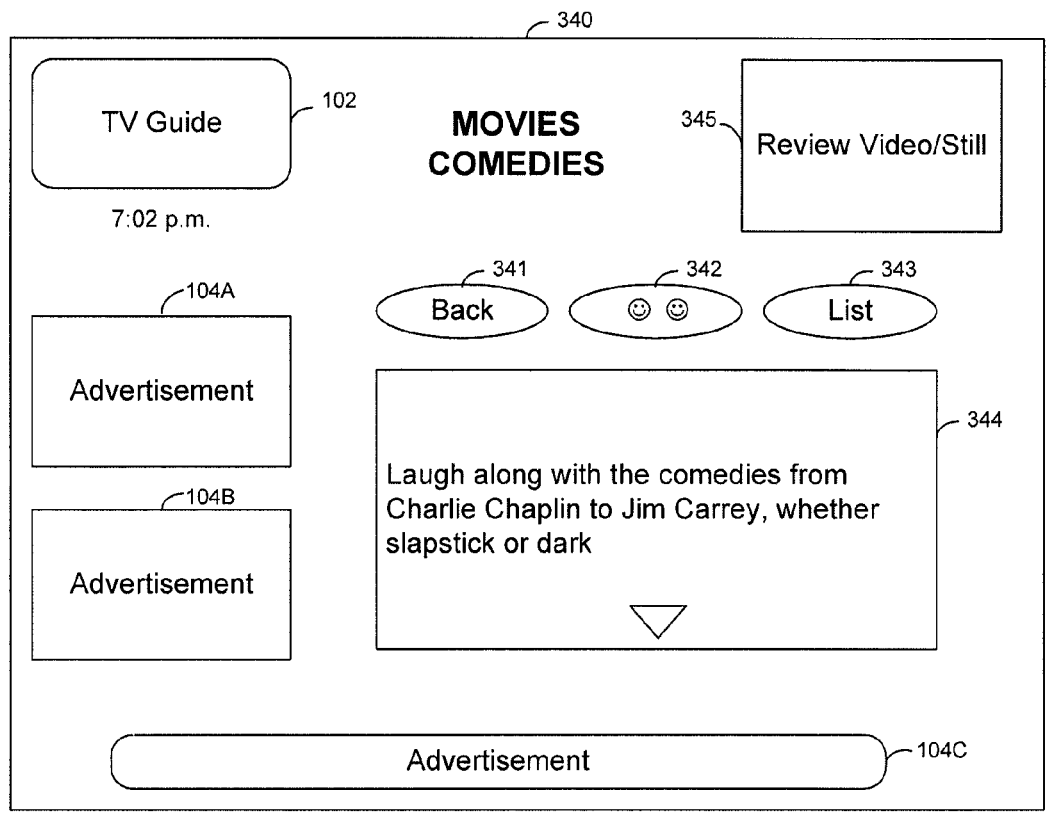
FIG. 26 is an illustrative interactive television display screen for movie comedies in accordance with the present invention.

When the user has selected a specific item from list 331 in FIG. 25, the guide may display an Information screen related to the item. For example, if the user selects comedy from list 331, the program guide may display genre Information screen 340 as shown in FIG. 26, or the guide may simply return to the screen of FIG. 24 with the selected item added to the list. In FIG. 26, the guide presents additional information about the selected item in region 344. Screen 340 also presents the option to change the user rating by selecting option 342. Screen 340 also presents the user with an option to list a group of programs matching the selected item by selecting option 343. The user may return to screen 330 by selecting Back option 341.

From screen 320 of FIG. 24, the user may select any specific item in list 321 and press a key on the remote control or select an on screen option (not shown) to change its rating. Selecting an item may alternatively display a screen such as FIG. 26, allowing the user to change the rating on that screen by selecting option 342. Removing the user rating from any item (i.e., setting the rating to "no (un)happy face") may cause that item to be removed from the screen the next time it is displayed, as the user has indicated no preference with respect to that item. The guide may support automatic reminders and/or automatic recordings of programs based on user preferences. Information relating to the user's favorites and programming preferences may be stored in memory 25 or at a server at a television distribution facility or elsewhere.

The Movies screen 130 may also have a Watch Movies button (not shown). Upon selecting this option, the guide may allow the user to watch television, but with quick access to movies. A Menu or Guide key on the remote control, which normally displays the Main Menu screen 100, may instead display the Movies screen 130 or the Movies On Now screen 140 (FIG. 6). While changing channels, the guide may limit the user to only channels currently airing movies, possibly limited to movies matching the criteria selected under Movies Favorites screen 320 in FIG. 24 with happy faces. Other guide functions, such as for example Browse, may also be similarly limited. While in this mode, the Movies screen 130 may change the Watch Movies option to a Watch Normal Television option; selecting this option would return the user to regular television watching and guide features.

The guide may support many other niche hubs. Each hub includes options that are appropriate for a user interested in that particular theme. Some options may be similar to those shown for the movies hub. Other options may be specific to another theme, such as a sports fan hub (option 112B), a music hub (option 112D), a soap opera hub (option 112G), a kids/family hub (option 112C), science fiction hub (option 112H), a news and information hub (option 112E), a local information hub (option 112K), a cultural hub (option 112F), a television lover's hub (option 112I), and an adult hub (option 112J). A user may enter these hubs by selecting, for example, the corresponding option in Themes screen 110 (FIG. 3).

Figure 27:
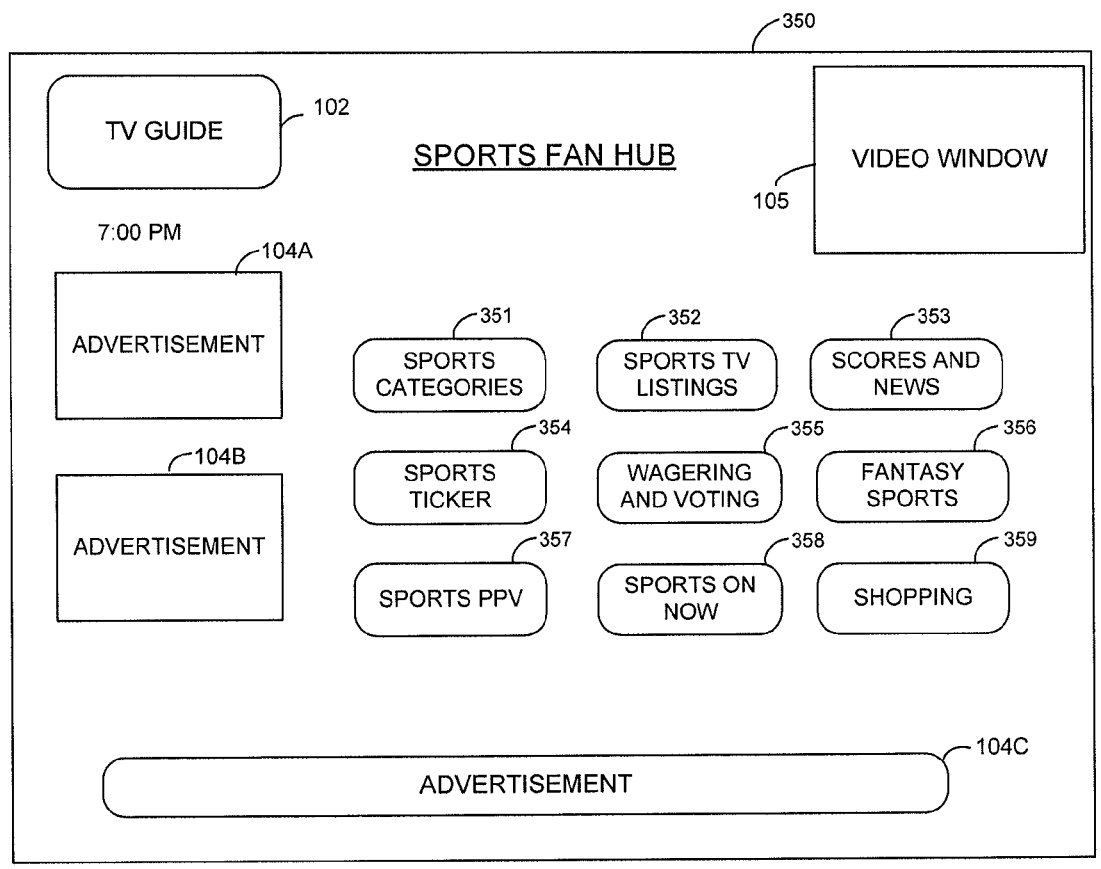
FIG. 27 is an illustrative interactive television display screen for a sports fan niche hub in accordance with the present invention.

Another illustrative television program guide main menu screen of a niche hub in accordance with the present invention is shown in FIG. 27. Screen 350 is the main menu screen of a sports fan hub. Screen 350 provides the user with the option of using a variety of program guide features related to sports programming by selecting one of options 351-359. A user may view sports television program listings, as shown and discussed, for example, with respect to FIG. 31, by selecting option 352. The user may view sports scores and news, as shown for example in FIG. 32-34, by selecting option 353.

Figure 35:
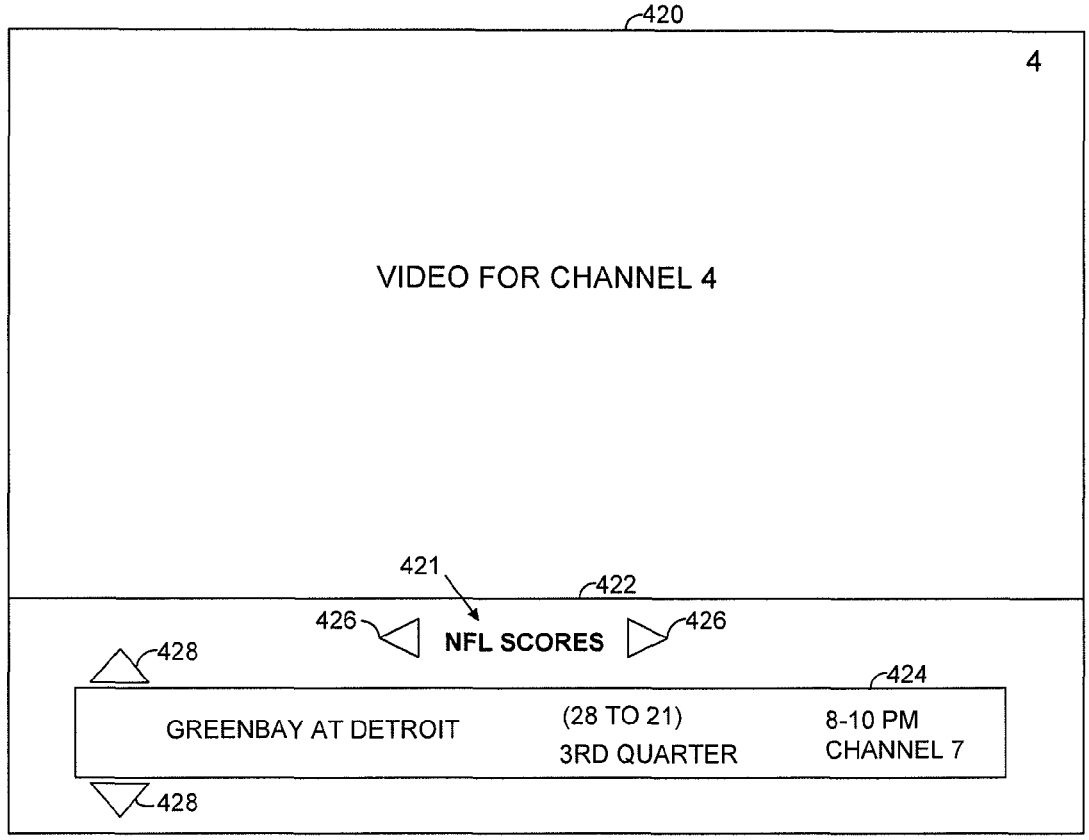
FIG. 35 is an illustrative sports ticker in accordance with the present invention.

The user may view a controllable sports ticker, as shown for example in FIG. 35, by selecting option 354. The user may participate in sports wagering and voting as well, as shown for example in FIG. 36-38, by selecting option 355. The user may participate in fantasy sports leagues, as shown for example in FIGS. 39-40, by selecting option 356. The user may also view a listing of pay-per-view sports by selecting option 357, or a listings of sports programs on now by selection option 358. The user may purchase sports-related merchandise through an interactive shopping application by selecting option 359. Sports hub screen 350 may also display options for accessing sports web sites, sports discussion groups, sports chat groups, and other program guide features (e.g., any features shown and used with other hubs) with sports-related content.

The program guide may also allow the user to enter favorites within the sports niche hub such as favorite sports, teams, leagues, etc. as part of a user profile. The profiles may indicate, for example, that the user likes certain sports and teams but not others. The program guide may customize the features within the niche hub based upon the user's favorites.

Figure 28:
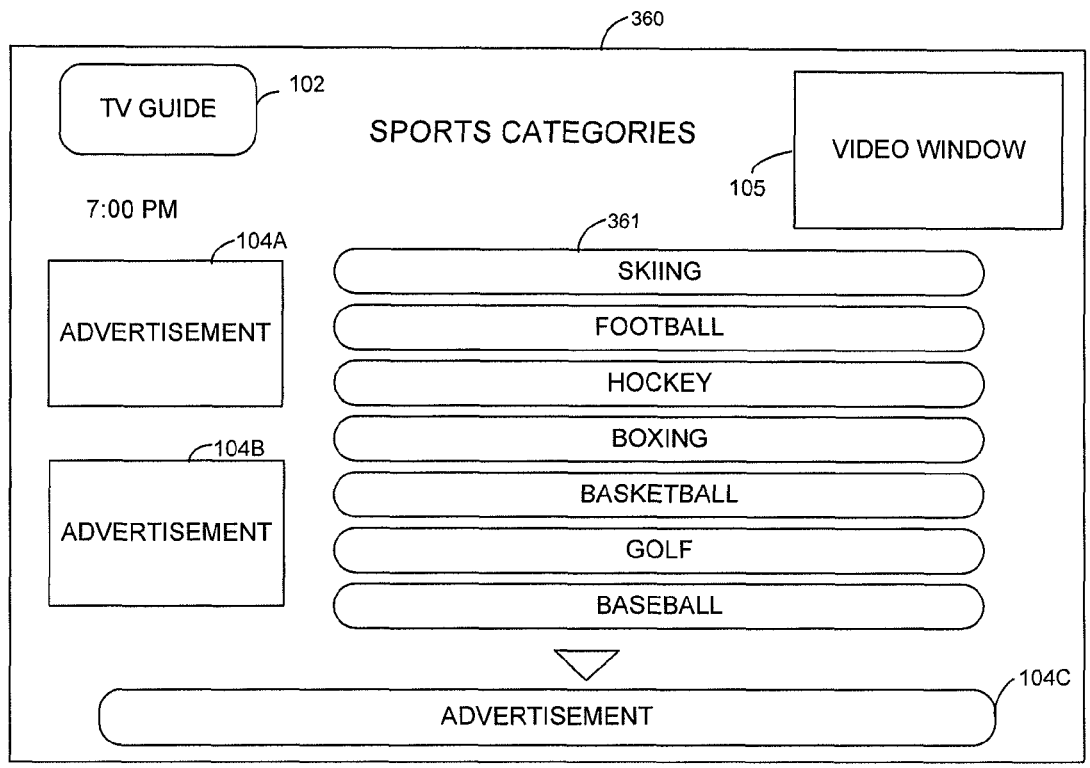
FIG. 28 is an illustrative interactive television display screen for selecting an individual area of the sports fan hub in accordance with the present invention.

The niche hubs of the present invention may contain individual areas within the hub for sub-categories within the niche hub category. For example, a sports fan hub may have individual areas within the hub for specific sports. Screen 350 provides option 351 for selecting an individual area within the sports hub that relate to a specific sport (e.g., football). If the user selects option 351, the program guide may display screen 360 as shown in FIG. 28. Screen 360 provides list 361 of individual sports that relate to an individual area of the sports niche hub. The user may select a sport from list 361 to enter the individual area of the hub corresponding to that sport. If desired, the program guide may provide the user with the option of selecting a specific team, league, etc. within that sport when the user selects a sport in list 361.

Each individual area within the hub that is tailored to a sub-category such as a specific sport, team, league, etc. contains niche hub features that relate to that sub-category. For example, if the user enters the football area of the niche hub, the program guide displays options such as television program listings, news groups, news stories, sports scores, fantasy sports leagues, etc. that relate (or only relate) to football in screen 350 and in other display screens of the sports fan hub. These options can be the same as screen 350 with filtered content related to the selected sub-category, a subset of the options displayed on screen 350, or options that are specific to the selected sub-category.

The program guide can customize the program guide features to match the user's selected sub-category so that options relating to that sub-category are displayed in the sports hub. This functionality may be performed by a processor in the user television equipment, at the television distribution facility, or elsewhere. If desired, the hub may be customized by a server (e.g., connected to user television equipment as shown in FIGS. 1A-1C) in a client-server arrangement.

Figure 29:
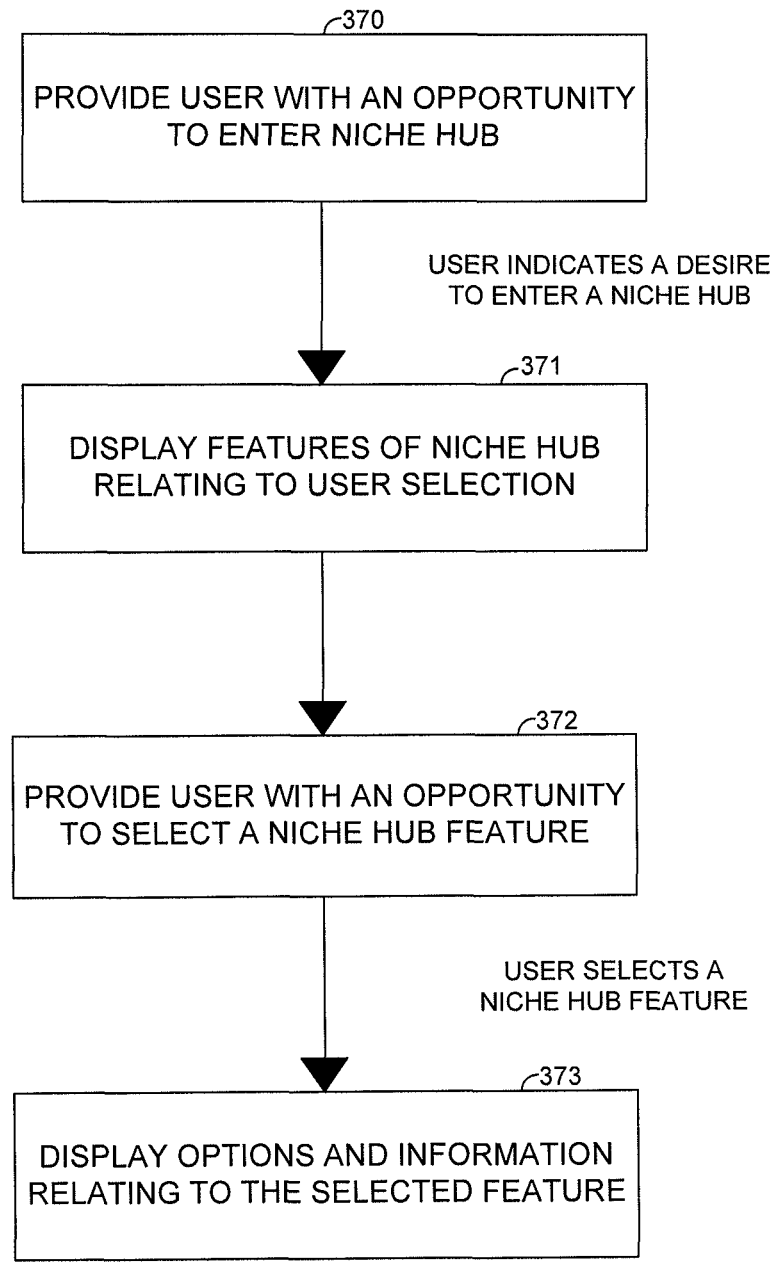
FIG. 29 is an illustrative process for using the program guide niche hubs in accordance with the present invention.

An illustrative process for using niche hubs of the present invention is shown in FIG. 29. At step 370, the interactive program guide provides the user with an opportunity to enter a niche hub, for example, by displaying Themes screen 110 in FIG. 3. The user may then select a niche hub based on the options provided by the interactive program guide or based upon the current selection in the program guide. In another example of step 370, the user may highlight a movie in a general-purpose program guide television listing and then select a "niche hub" button on a remote control to enter the movie niche hub. If the user indicates a desire to enter a niche hub, the program guide may then display features of the niche hub at step 371, for example, by displaying niche hub movie display screen 130 or other niche hub menu screens discussed further below. The niche hub features are related to specific types of television programming, or user interests. The niche hub features may also be selected by the user as discussed below with respect to FIGS. 65-67.

At step 372, the program guide may provide the user with an opportunity to select a niche hub feature, for example, by providing interactive options 132A-132O in screen 130. The user may select a niche hub feature by selecting the region on the niche hub menu display screen and press an "ENTER" key on the remote control. If the user selects a niche hub feature, the program guide may display options and information relating to the selected feature in step 373, as shown for example, by FIG. 9. The options and information displayed may be related to the selected feature. For example, screen 170 when selected from the movie niche hub displays video on demand movies.

Figure 30:
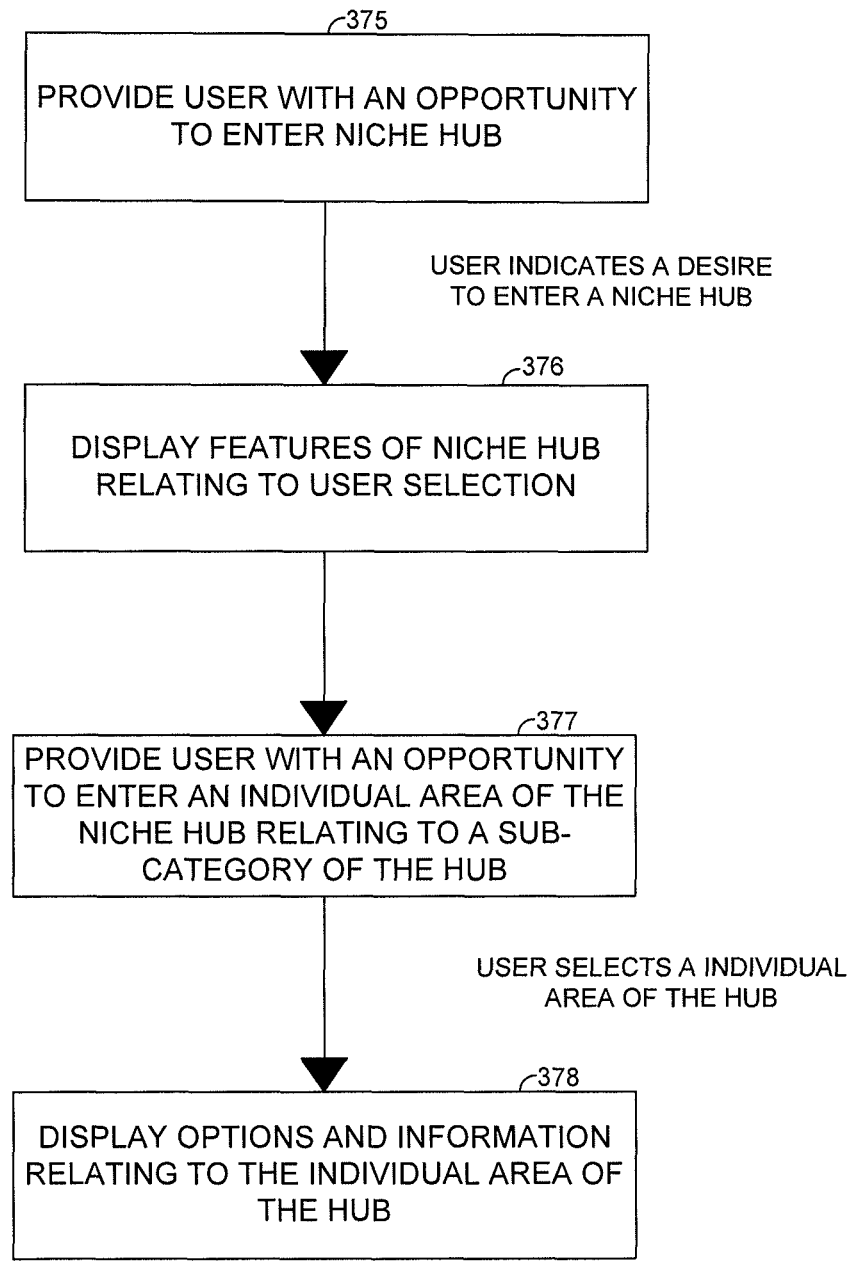
FIG. 30 is an illustrative process for using an individual area of a niches hub in accordance with the present invention.

Another illustrative process for using niche hubs of the present invention is shown in FIG. 30. At step 375, the interactive program guide provides the user with an opportunity to enter a niche hub, for example, by displaying Themes screen 110 in FIG. 3. The user may then select a niche hub based on the options provided by the interactive program guide or based upon the current selection in the program guide. If the user indicates a desire to enter a niche hub, the program guide may then display features of the selected niche hub at step 376, for example, by displaying niche hub menu display screen 130 for sports or other niche hub menu screens discussed in this application.

At step 377 the program guide provides the user with an opportunity to enter an individual area of the niche hub that relates to a sub-category of the hub. For example, screen 360 of the sports hub provides list 361 of individual areas within the sports hub that relate sub-categories such as specific sports. If the user then selects an individual area of the hub, the program guide then displays options and information relating to the selected individual area of the hub (e.g., as discussed with respect to FIG. 28) at step 378. The program guide application may obtain information regarding available individual areas of each niche hub and features available within each individual area from database 14, a server, or a television distribution facility. A processor in the user television equipment, the television distribution facility, or elsewhere may provide program guide features and information to the user at the user television equipment based upon the individual area of the niche hub that the user selected. For example, if the user selects football in list 361, the processor may provide football scores, news, and wagering options to the user in the sports niche hub.

Figure 31:
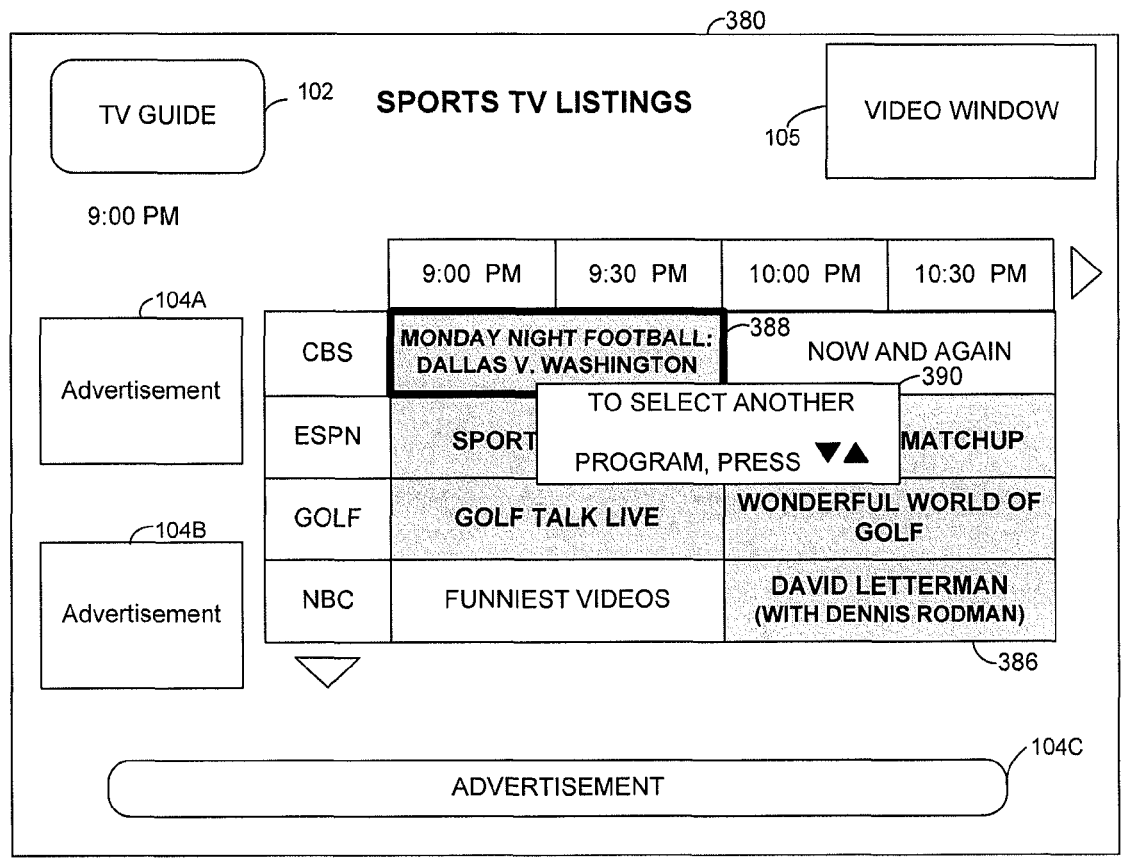
FIG. 31 is an illustrative interactive television display screen for highlighted sports television program listings in accordance with the present invention.

The program guide with niche hubs of the present invention may provide the user with an opportunity to view highlighted television program listings within the hub. Only programs relating to the user interest category of the niche hub are highlighted in the program listings. For example, the program guide may display listings screen 380 as shown in FIG. 31 when the user selects option 352 in menu screen 350 of the sports fan niche hub. Screen 380 displays listings grid 386 which is organized by time and television channel. Grid 386 displays all programs on the channels in the grid, but highlights sports programs since the user entered screen 380 from the sports hub. If a channel has no programs related to the category of the hub (e.g., sports), the program guide may omit that channel from the television programs listings entirely. Alternatively, the program guide may display a screen similar to Movies On Now shown in FIG. 6 (but directed toward sports programming on now) when the user selects option 352.

If the user has selected a sport from list 361 in screen 360 (such as football), only programs relating to that sport are highlighted in grid 386. The program guide listings may be obtained from database 14. The program guide application on the set-top box or computing equipment at the television distribution facility or other location may highlight the sports programs as shown in FIG. 31.

The interactive program guide application may also display context sensitive pop-up hints. These hints appear either when the user explicitly asks for help or when the system detects that the user needs assistance through the user's inaction or when the user presses an improper key on the remote control (i.e., a key that does not correspond to a valid command at the current program guide operating point). The pop-up hints may be text messages, instructional video images, and/or audio programs or messages. The pop-up hints may be context sensitive, displaying information based on the user's current location within the program guide and, possibly, taking into account the prior user control commands by which the user reached the current location.

For example, if the user selects a program such as program 388 and either remains inactive for a period of time, requests help (e.g., presses a "HELP" key on the remote control), or presses an improper key, the program guide automatically displays a pop-up hint such as pop-up hint 390. Pop-up hint 390 provides a suggestion to the user on how to select another program by pressing the UP or DOWN arrow keys on the remote control. If the user continues to remain inactive, request help, or press improper keys, the program guide may cycle through other pop-up hints (e.g., "to watch this program press OK"). Further features of an illustrative electronic television program guide schedule system and method with pop-up hints is described in Davis et al. U.S. Pat. No. 5,822,123, issued Oct. 13, 1998, which is hereby incorporated by reference herein in its entirety.

Figure 32:
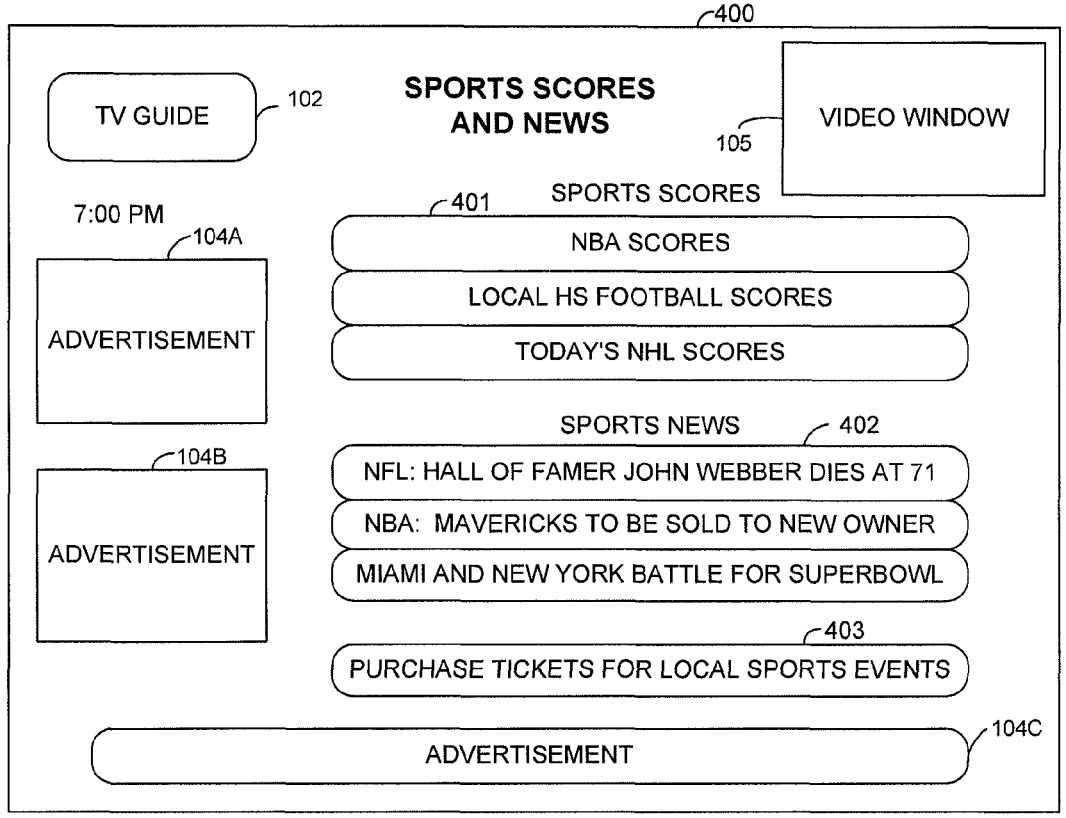
FIG. 32 is an illustrative interactive television display screen for selecting sports scores and news in accordance with the present invention.

The program guide with niche hubs of the present invention may provide the user with an opportunity to view sports scores and news within a niche hub. The news stories displayed within the niche hub relate to the user interest category of the hub. For example, the program guide may display screen 400 as shown in FIG. 32 when the user selects option 353 in screen 350. Screen 400 may display list 401 of sports leagues for which the user may view scores in the program guide. If the user has entered an individual area of the sports hub relating to a specific sport, then screen 400 can display only sports scores and news relating to that specific sport.

Figure 33:
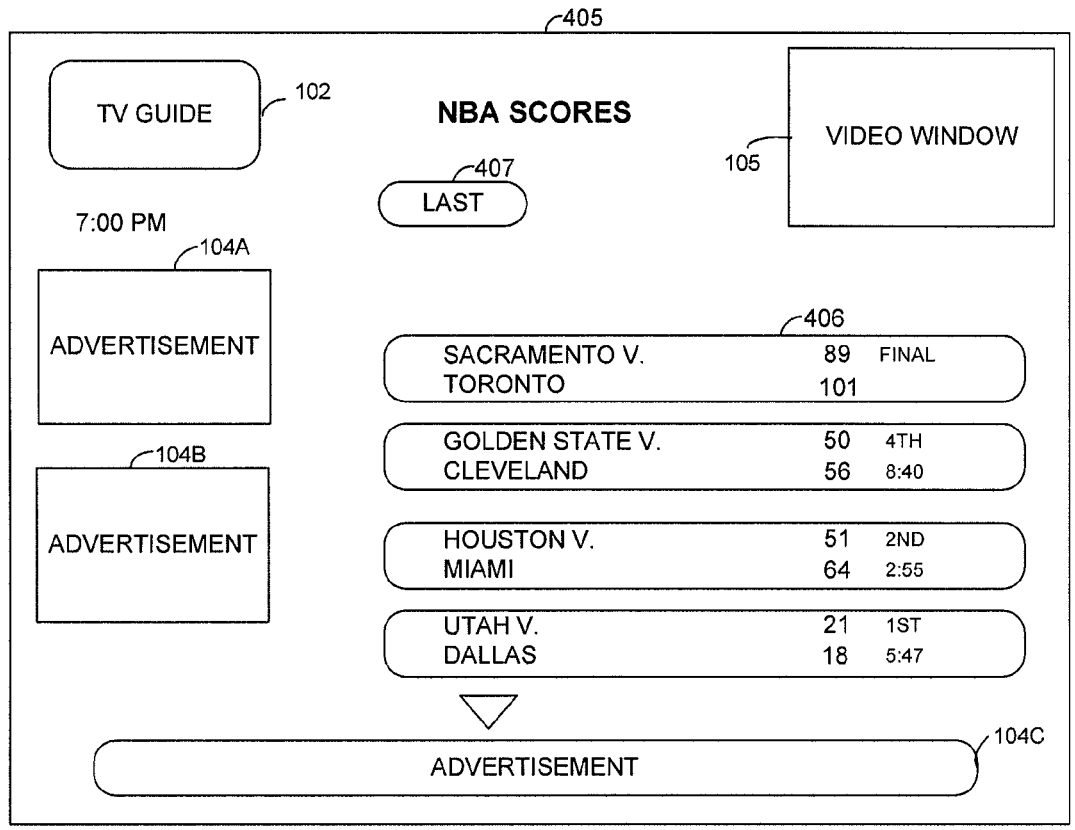
FIG. 33 is an illustrative interactive television display screen for viewing sports scores in accordance with the present invention.
Figure 34:
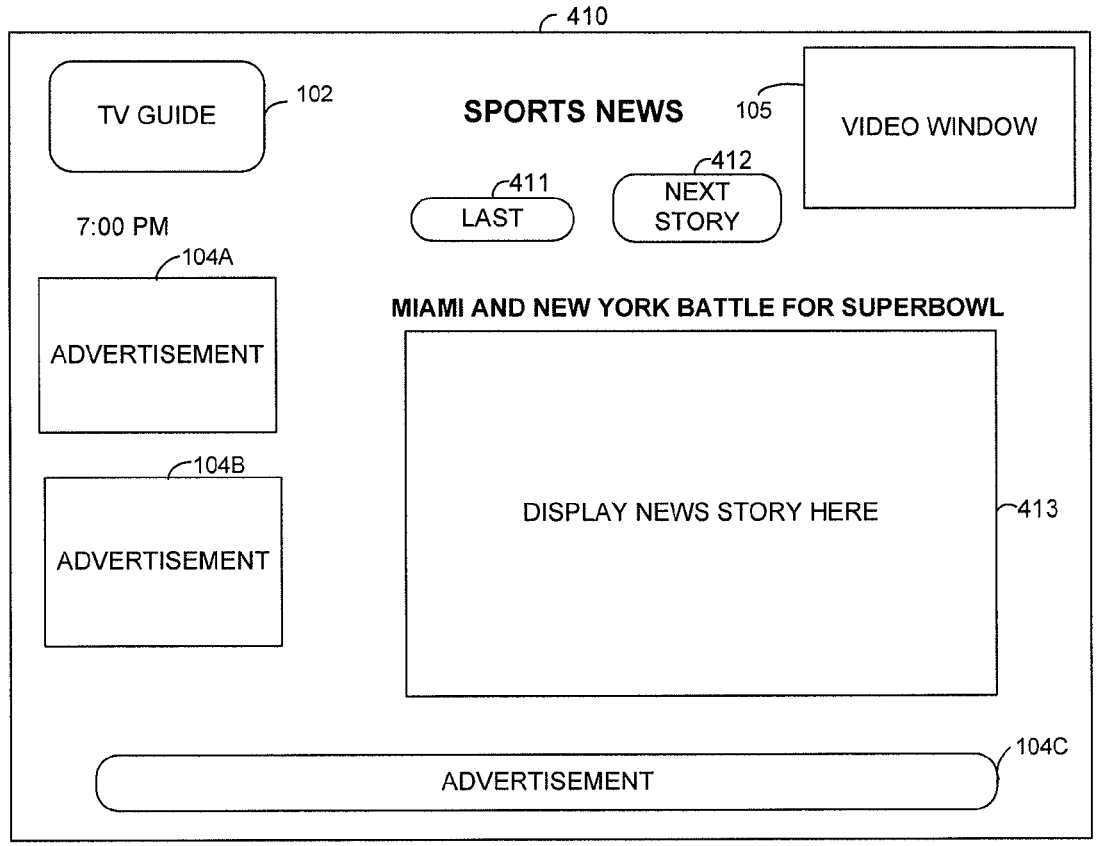
FIG. 34 is an illustrative interactive television display screen for viewing sports news in accordance with the present invention.

The user may select a sport from list 401 to view scores from that sport. For example, if the user selects "NBA scores" the program guide may display screen 405 as shown in FIG. 33. Screen 405 displays listing 406 of recent NBA scores. The user may select an option in listing 406 to view an information screen that provides for information about the game. The information screen may be a Program Information screen for a program that is currently on television. The scores in listing 406 may be obtained from real-time sports data source 15 (FIG. 1A) and updated periodically or continuously as scores from current games change. The user may select Last option 407 to return to the previous display screen. The user may press a DOWN arrow key on the remote control to view scores from previous days.

If desired, the program guide may provide a listing of current and future television games that correspond to the sport selected in list 401. The user can select a game in this list to view a Program Information screen for that game. The Program Information screen may provide scores for current games.

Screen 400 in FIG. 32 also displays list 402 of top news stories relating to sports. The user may select a story in list 402 to read the story. The program guide may then display the selected news story such as shown in screen 410 of FIG. 34. The text or video of the story selected by the user is displayed in region 413. The user may view the text or video of the next story in list 402 by selecting Next Story option 412 in screen 410. If desired, news video may be displayed in window 105, instead of region 413. If desired, screen 410 may be formatted as an information screen with options (on-screen or remote control based) that such as play, fast forward, rewind, pause, and stop that allow the user to control the news story segment (e.g., video or scrolling text) as it is played on screen 410. Screen 410 may also provide a mail option to send this story to a friend. The user may return to screen 400 by selecting Last option 411.

News stories may be obtained from real-time news data source 19 (FIG. 1A), from program guide database 14, from a television distribution facility, or from a web server connected to user television equipment via communications network 38 (e.g., the Internet) and paths shown in FIG. 1B. If an individual program has sports scores or news stories associated with it, the scores or news may be available directly from a listing or information screen by, for example, providing on-screen options for scores or news stories related to the program. These options act as hyperlinks which allow users to access related information or features within the hub.

News and scores may also be displayed on screen 350 based upon user preferences, or the most popular teams, sports, etc. Selecting the option on screen 350 may cause program guide to bring up more details relating to the news story or sports score such as an information screen that provides options related to the news or scores. For example, scores for a past game may be displayed on screen 350. The user may then select the score option on screen 350 to display an information screen for the game. The information screen may have highlights of the game, an option to display video highlights, statics, related stories, etc.

Screen 400 may also provide other options such as the option to buy tickets for local sports events by selecting option 403. When the user selects option 403, the program guide may provide a schedule of sporting events. The user may select a sporting event to purchase a ticket for that event. Sporting schedules may be obtained from a real-time data source, server, or other database.

The program guide with niche hubs of the present invention may provide the user with an opportunity to view real-time (live) data relating to the user interest category of the niche hub. For example, the program guide may display screen 420 as shown in FIG. 35 when the user selects option 354 in screen 350. The user may also be able to bring up a sports ticker without going into the hub (e.g., by pressing a key on the remote control while watching television). FIG. 35 displays live data of sports scores on controllable sports ticker 424 in overlay 422 on top of a television program displayed on screen 420 (e.g., program shown on channel 4). Controllable ticker 424 may contain a selectable sports category 421 such as national football league (NFL), major league baseball, national hockey league, etc.

The user may select from different sports categories that are available using RIGHT and LEFT cursor keys on the remote control as indicated by arrows 426. Each sports category 421 has a number of associated items of status information. For example, in ticker 424, the program guide displays status information which contains real time data such as the game title, current score, current quarter, time, and channel of the current game (e.g., Greenbay v. Detroit). A user may select from among the various status information items associated with a given category by using UP and DOWN remote control cursor keys as indicated by arrows 428. For example, if the user presses the DOWN cursor key, the program guide may display the status information from another football game. The program guide may also automatically scroll through the scores of current and recent games from sports category 421 without user intervention. The user may press OK on the remote control while viewing a score for a game to tune to that game if it is currently available on television.

Real-time data such as sports scores may be transmitted from real-time data sources 11 (e.g., real-time sports data source 15) via television distribution facility 16 and real-time data collection facility 13 or main facility 12 along the communications paths shown in FIG. 1A to user television equipment 20. If desired, real-time data may be transmitted to user television equipment from real-time data sources 11 directly to server 22 or server 50 (FIG. 1C) or from the Internet (e.g., communications network 38 in FIG. 1B). Further features of a program guide system with real-time data sources is described in Knudson et al. U.S. patent application Ser. No. 09/229,047, filed Jan. 12, 1999, which is hereby incorporated by reference herein in its entirety. Further features of an illustrative electronic television program guide schedule system and method with data feed access are described in Knee et al. U.S. Pat. No. 5,589,892, issued Dec. 31, 1996, which is hereby incorporated by reference herein in its entirety.

Figure 36:
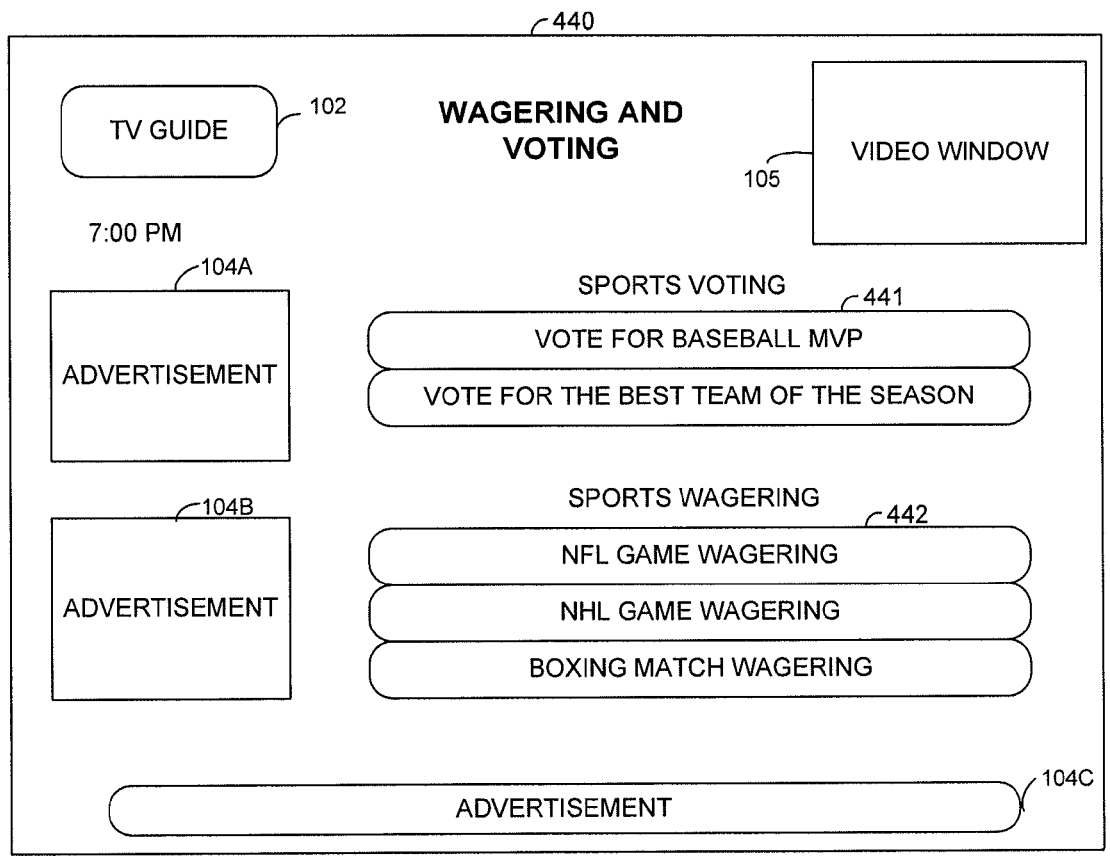
FIG. 36 is an illustrative interactive television display screen for selecting sports wagering and voting in accordance with the present invention.
Figure 37:
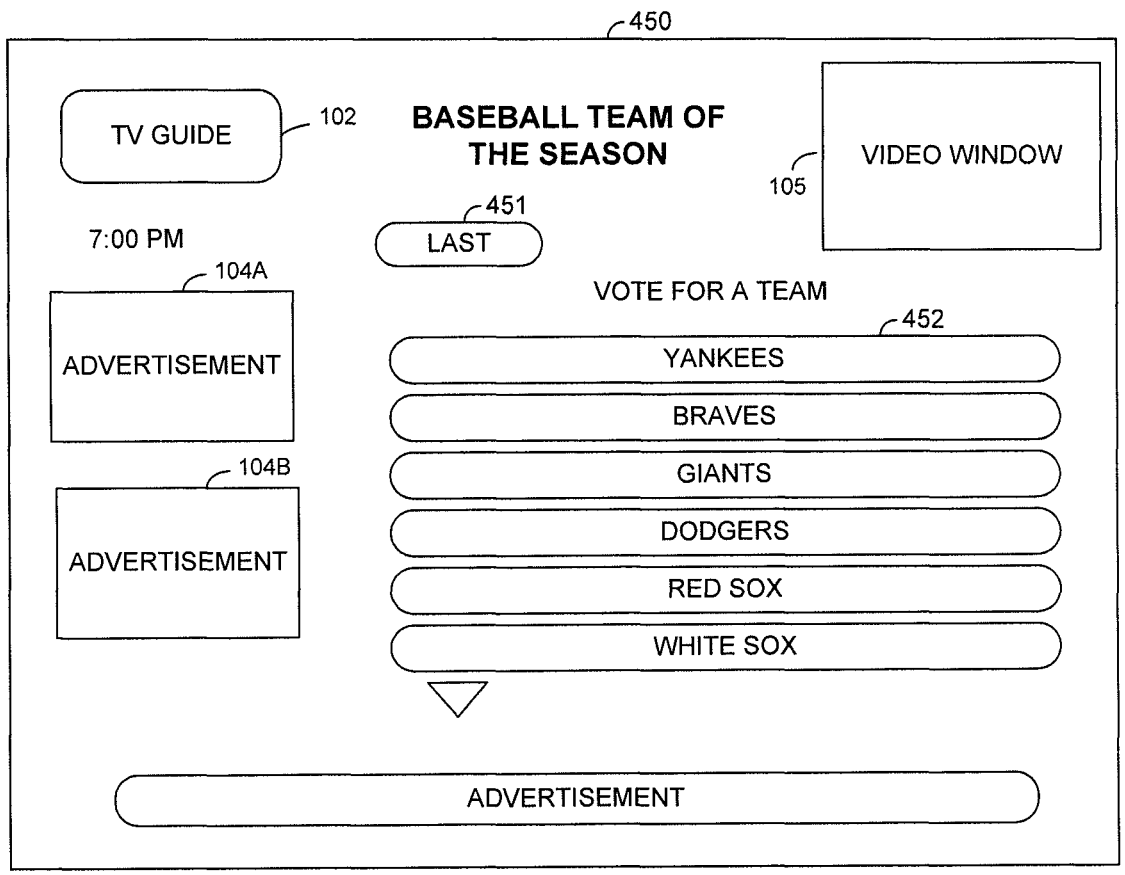
FIG. 37 is an illustrative interactive television display screen for sports voting in accordance with the present invention.
Figure 38:
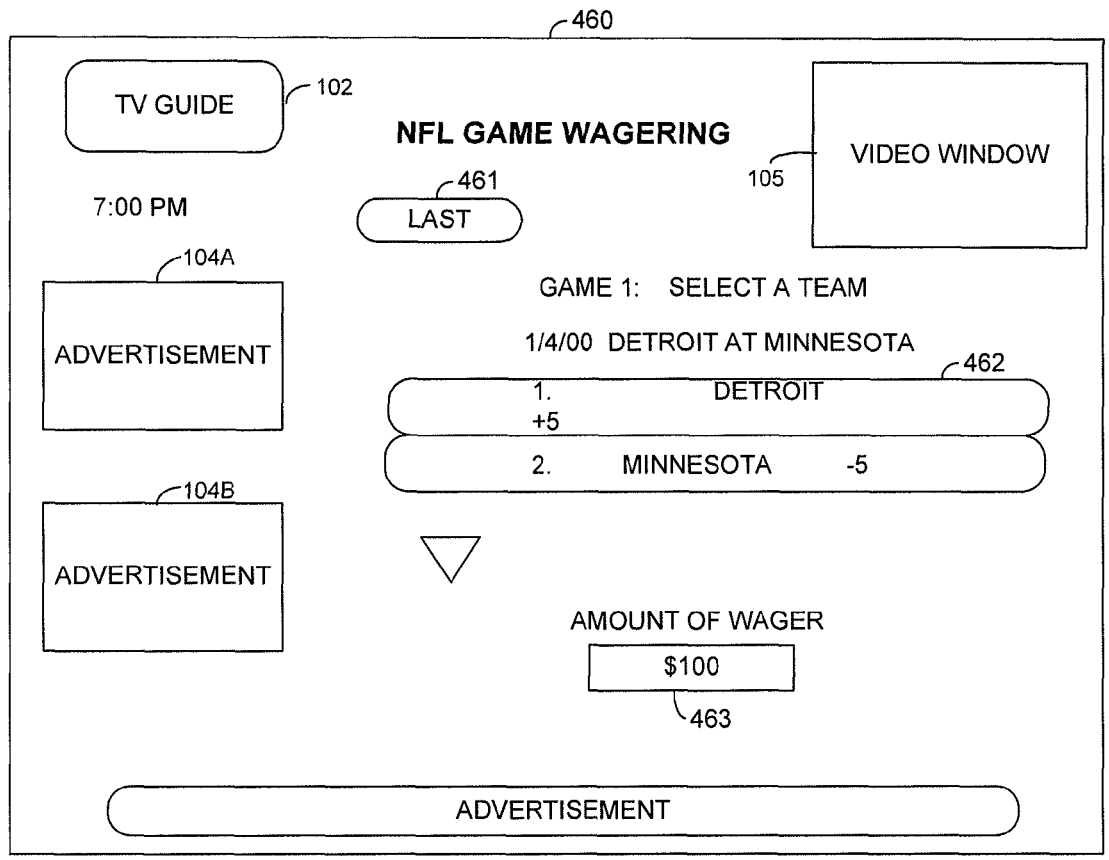
FIG. 38 is an illustrative interactive television display screen for sports wagering in accordance with the present invention.

A program guide niche hub of the present invention may provide the user with an opportunity to view and participate in program-related wagering and voting relating the programming category of the hub (e.g., sports all-star voting and sports game wagering). For example, the program guide may display screen 440 as shown in FIG. 36 when the user selects option 355 in screen 350. Screen 440 provides the user with an opportunity to select a voting option from list 441. When the user selects a voting option (such as voting for the best baseball team of the season or voting for players for an All-Star team), the program guide may display, for example, screen 450 as shown in FIG. 37. The user may vote for a team of the season by selecting a team from list 452 of baseball teams. The program guide may then transmit the user's vote to a television distribution facility or message processing facility 71 along communications paths such as the ones shown in FIG. 1D for counting and processing users' votes. The user may return to the previous screen by selecting option 451.

Screen 440 also provides the user with the opportunity to participate in sports wagering. For example, screen 440 provides the user with an opportunity to select a type of sports wagering from list 442. When the user selects a sports wagering option from list 442 (e.g., NFL game wagering), the program guide may provide a wagering screen such as screen 460 in FIG. 38. The program guide then provides the user with upcoming games for the selected sport and the point spread for that game. For example, if the user has chosen NFL wagering (football), the program guide provides an upcoming football game, and the point spread for this game. The user may bet on a team by selecting the team from list 462. For example, if the user selects Detroit in list 462, this means that the user is betting that Detroit will beat Minnesota by 5 points or more. The user may enter the amount of money he wishes to wager in region 463 by pressing numbers on the remote control. The user's bet information may be transmitted to a television distribution facility or message processing facility 71 along communications paths such as the ones shown in FIG. 1D for processing the user's bet. The user may bet on other games by pressing the DOWN arrow on the remote control. The program guide will them display teams and point spreads for other upcoming NFL games.

The wagering may be real or pretend. In real wagering, the program guide provides user setup accounts, personal identification number (PIN) to access the account, and other user security features. Also, once the user has set up an account and placed a bet, the program guide provides an option to access the user's account to view the status of pending bet, the results of previous bets, the user's account value, betting dollar limits, betting statistics, and other useful information. Wagering and voting options may be available from a Program Information screen, if applicable to a specific program. Further features of illustrative interactive wagering systems and processes are described in Brenner et al. U.S. Pat. No. 5,830,068, issued Nov. 3, 1998, which is hereby incorporated by reference herein in its entirety.

Figure 39:
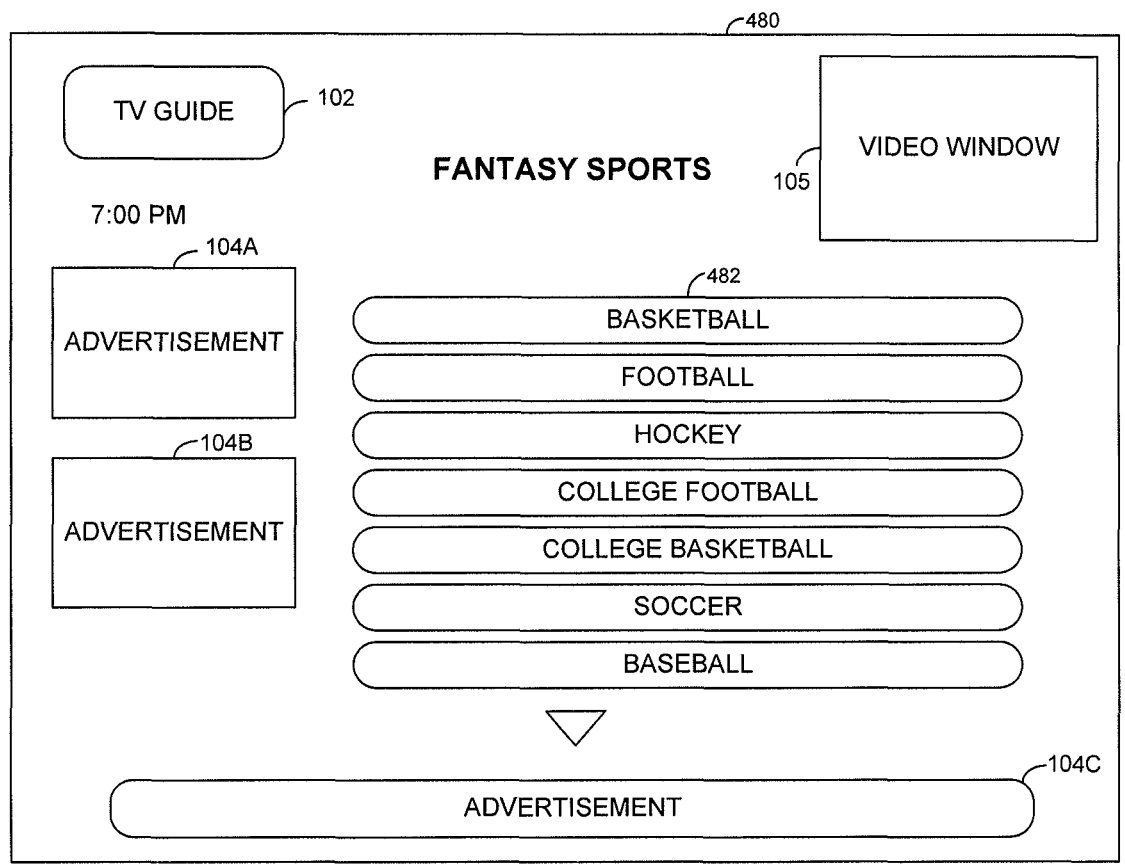
FIG. 39 is an illustrative interactive television display screen for selecting a fantasy sport in accordance with the present invention.
Figure 40:
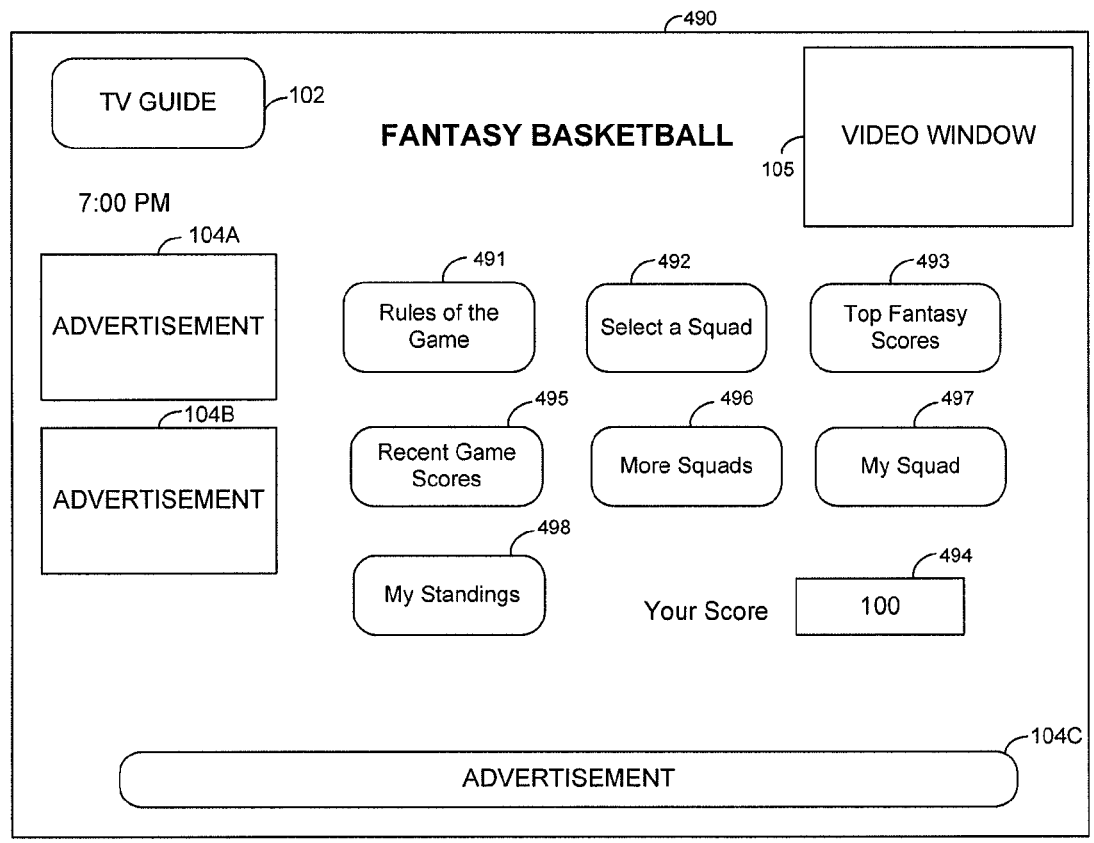
FIG. 40 is an illustrative interactive television display screen for fantasy sport features in accordance with the present invention.

A program guide sports niche hub (or other related hub) of the present invention may provide the user with an opportunity to participate in a fantasy sports league. Fantasy sports leagues allow users to form a squad of real-life sports teams that are evaluated on the basis of their real-life performance. Users compete against each other for the highest fantasy sports score. The program guide may provide display screen 480 as shown in FIG. 39 when the user selects option 356 in screen 350. Screen 480 provides the user with an opportunity to enter an interactive fantasy sports league display screen by selecting a fantasy sport from list 482. For example, if the user selects fantasy basketball, the program guide may subsequently provide display screen 490 as shown in FIG. 40.

Display screen 490 is an example of an interactive fantasy sports league display screen for fantasy basketball. Screen 490 allows the user to select a fantasy basketball squad by choosing real-life basketball teams by selecting option 492. The user may view the rules of fantasy basketball by selecting option 491. The user may view scores for recent basketball games by selecting option 495. The user may view the top scores of all the participants in the fantast sports league by selecting option 493. The user's current score in the fantasy league is displayed in region 494. The user may select option 496 to add more squads for other users in the household that want to participate in the same fantasy sports league. The user may select option 497 to view details of the teams of the currently selected squad. The user may select option 498 to view the details of his standings with respect to the performance of the teams in his squad relative to other players in the league (such as a ranking).

The program guide may obtain fantasy sports league data such as available fantasy sports leagues, lists of real-life sports teams, recent real-life game scores, and fantasy sports rules from program guide database 14, a television distribution facility, or a server (e.g., a web server connected via the Internet). Fantasy sports league data may be transmitted to user television equipment along communications paths such as the ones shown in FIGS. 1A-1C. A user's current score in a fantasy sports league (in region 494) may be calculated by the program guide operating on the set-top (e.g., if the set-top box has a processor).

If desired, the program guide operating on the set-top box may transmit the teams on the user's fantasy sports squad to a server (e.g., at the television distribution facility or elsewhere as shown in FIGS. 1A-1C). The user's current score in region 494 may be then be calculated by the server, transmitted back to the set-top box, and stored in memory 25. Fantasy sports leagues scores of other users may be stored in a server such as a web server, and the top scores may be transmitted from the server to user television equipment upon request by the interactive program guide on the user television equipment when the user selects option 493 (e.g., through communications network 38 along paths shown in FIG. 1B).

Figure 41:
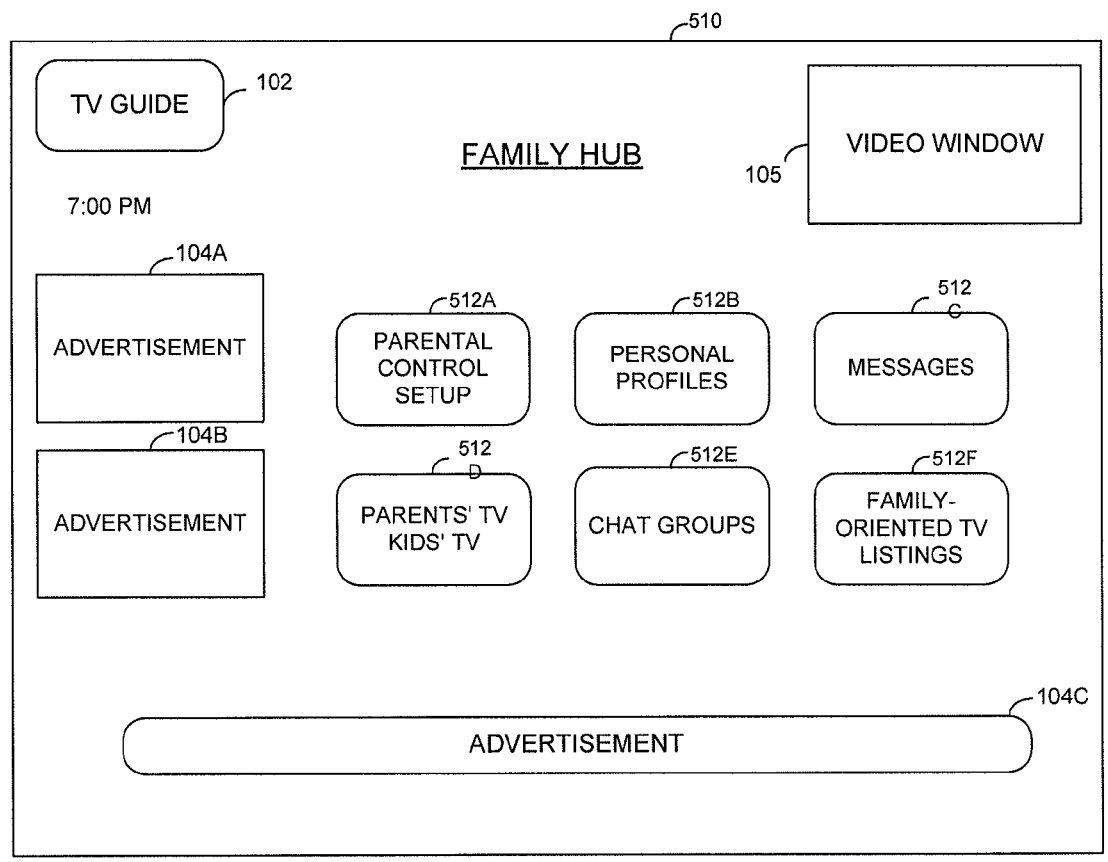
FIG. 41 is an illustrative interactive television display screen for a family niche hub in accordance with the present invention.
Figure 42:
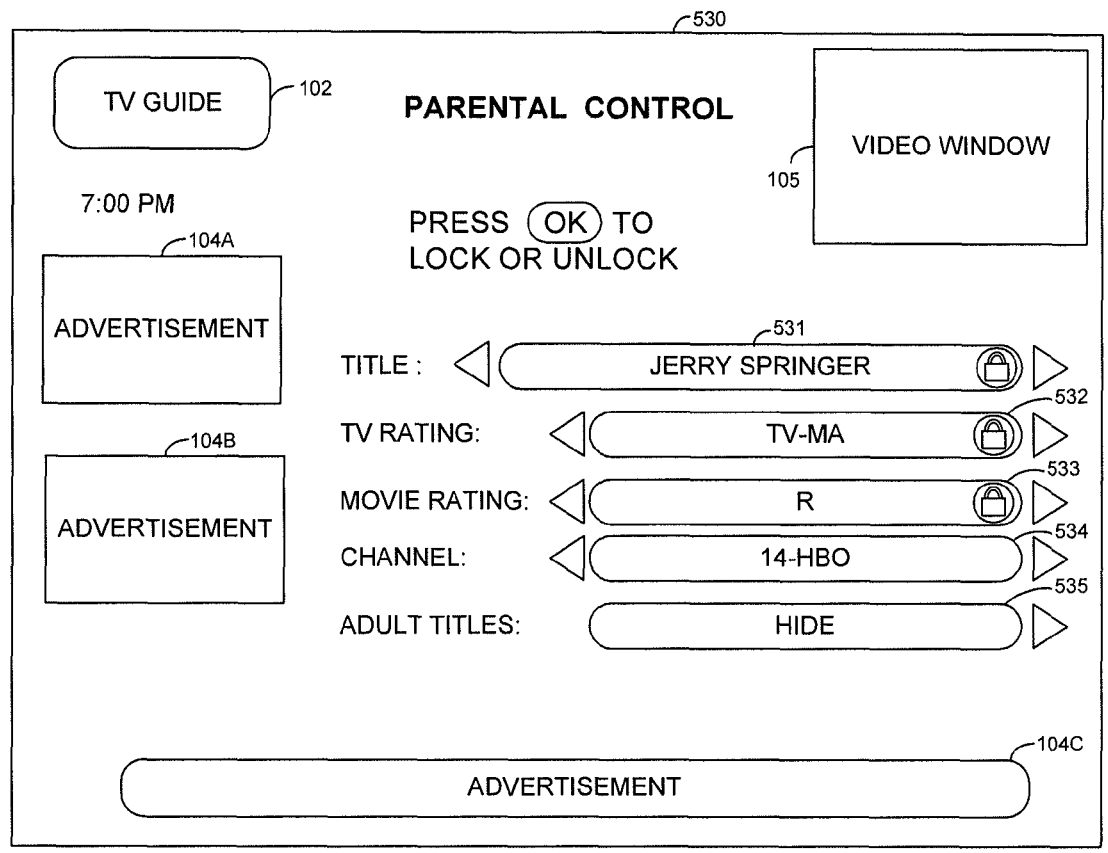
FIG. 42 is an illustrative interactive television display screen providing parental control of programming in accordance with the present invention.
Figure 43:
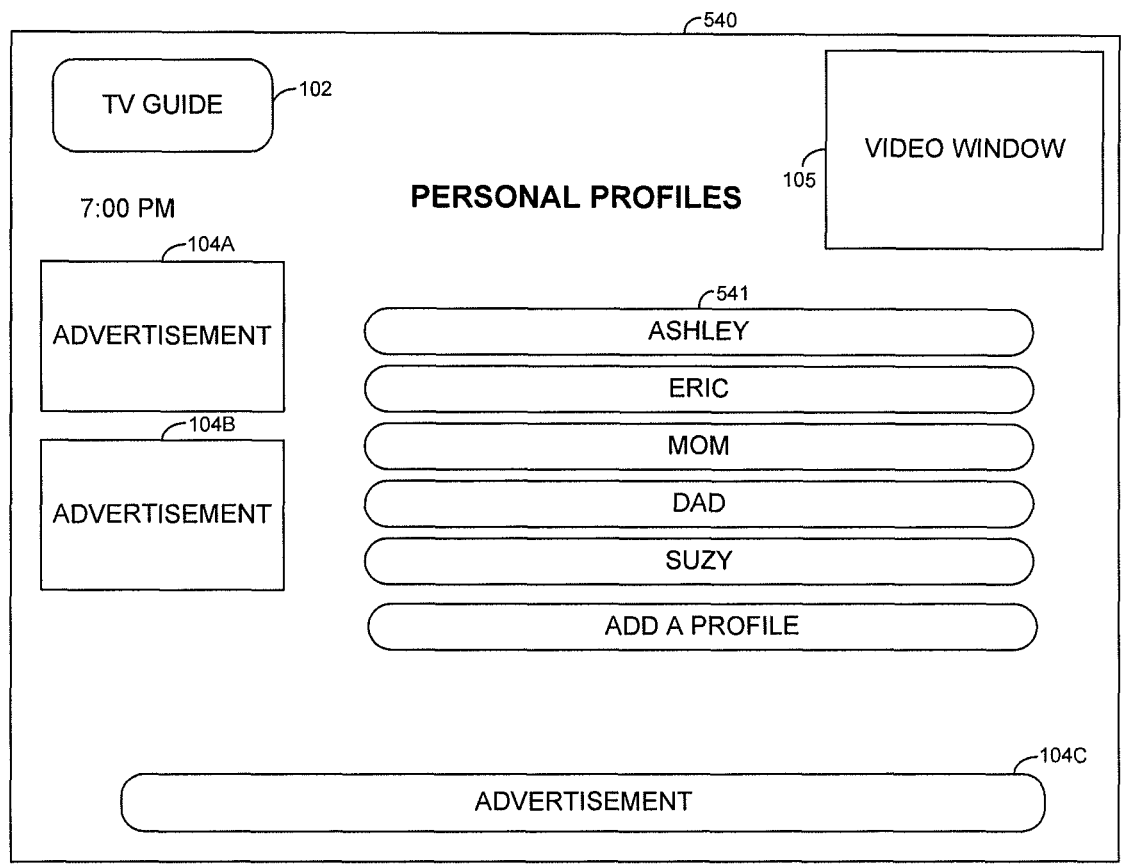
FIG. 43 is an illustrative interactive television display screen with personal profiles in accordance with the present invention.

Another illustrative television program guide main menu screen of a niche hub in accordance with the present invention is shown in FIG. 41. Screen 510 is the main menu screen of a family hub. Screen 510 provides the user with the option of using a variety of program guide features related to family programming by selecting one of options 512A-512F. A user may program parental control setup features in the family hub, as shown for example in FIG. 42, by selecting option 512A. A user may program personal profiles in the family hub, as shown for example in FIG. 43-44, by selecting option 512B. A user may send messages to other users, as shown for example in FIGS. 45, 46A, and 46B, by selecting option 512C. A user may select parents' television and kids' television options, as shown for example in FIGS. 47-49, by selecting option 512D. A user may also view and send messages in chat groups by selecting option 512E, as shown, for example, in FIG. 50-51. A user may also view family-oriented television program listings by selection option 512F. The television program listings may be arranged similarly to listings displayed from other hubs with programs appropriate for family viewing and/or particular age groups. There also may be multiple programming categories for families such as program listings for young children, education programming, programming for teenagers, etc.

The main family hub screen may also include options similar to other hubs (such as the movie hub and the sports hub) that are tailored to family or kids programming. For example, the family hub screen may provide options for video on-demand or pay-per-view family movies, kids programs on now, video clips of interest to families, web pages of interest to children, shopping features for toys, etc. The family hub may also include the ability to control which features of the hub or general purpose program guide are accessible by children (e.g., making a shopping feature password protected).

The program guide with niche hubs of the present invention may provide the user with an opportunity to use parental control features. For example, display screen 530 in FIG. 42 may be displayed within the family hub when the user selects option 512A in screen 510. Screen 530 provides the user with list 532 of typical television programming features that a user can lock or unlock. By the locking (or blocking) the selected feature, the user prevents other users (e.g., children) from viewing that feature without entering a password or code.

For example, the user can lock a program, rating, or channel from a Program Information screen by selecting a lock option for that program, rating, or channel. The user can unlock a program such as "Jerry Springer" by selecting option 531 and then pressing "OK" on the remote control to unlock that program. A user may lock or unlock a specific television program rating (e.g., TV-MA) by selecting option 532, and then pressing "OK" on the remote control to lock or unlock that rating. A user may lock or unlock a specific movie rating (e.g., R) by selecting option 533, and then pressing "OK" on the remote control to lock or unlock that rating. A user may lock or unlock a specific television channel (e.g., 14-HBO) by selecting option 534, and then pressing "OK" on the remote control to lock or unlock that channel. The user can scroll to other locked programs, ratings or channels in regions 531-534 by pressing RIGHT and LEFT arrow keys on the remote control. A lock icon in any of regions 531-534 indicates that the selected option is currently locked. A user may hide adult programs by selecting option 535, then using a LEFT arrow key on the remote control to scroll from the "SHOW" to the "HIDE" option to hide adult programs and their titles in the program guide listings. Parental control features may also be available, for example, from a Program Information screen.

The lock features in screen 530 may be stored in memory 25 of set-top box 26 or provided to the set-top box from a server along communications paths such as shown in FIGS. 1A-1C. The set-top box may contain a processor for performing the locking functions including evaluating which programs, music, and channels are to be locked when a given locking feature has been chosen in screen 530. The set-top box and program guide may also be configured to block web sites based on specific URLs or certain words as entered by the user. Programming provided from the television distribution facility may contain labels (e.g., data provided in band with the television program channel or in its vertical blanking interval) that identify the program, music, or channel as having an adult theme, containing foul language, nudity, violence, etc. If desired, data may provided as part of the program guide data from main facility 12 that identifies program ratings and content. The program guide application on the set-top box may then compare each program, music, and channel label with the locked features to determine whether to permit the user view the program, music, or channel or whether to require a password or access code before viewing is permitted. The program guide may also provide locking of other content such as web sites, chat rooms, applications, etc.

A family niche hub or other hub of the present invention may provide the user with an opportunity to enter personal profiles with different levels of rating restrictions for various viewers (e.g., family members) and other personal preferences. For example, display screen 540 in FIG. 43 may be provided when the user selects option 512B in screen 510. Screen 540 displays list 541 of profiles for household users that have previously been entered into the program guide system, and provides an option to add a new profile. The user may select a user profile by choosing an option in list 541. Each user profile may contain a particular rating restriction, and may contain information regarding the user's favorite programs and interests. The program guide may require that an access code or password be entered by the user before he or she can select a particular user profile.

Figure 44:
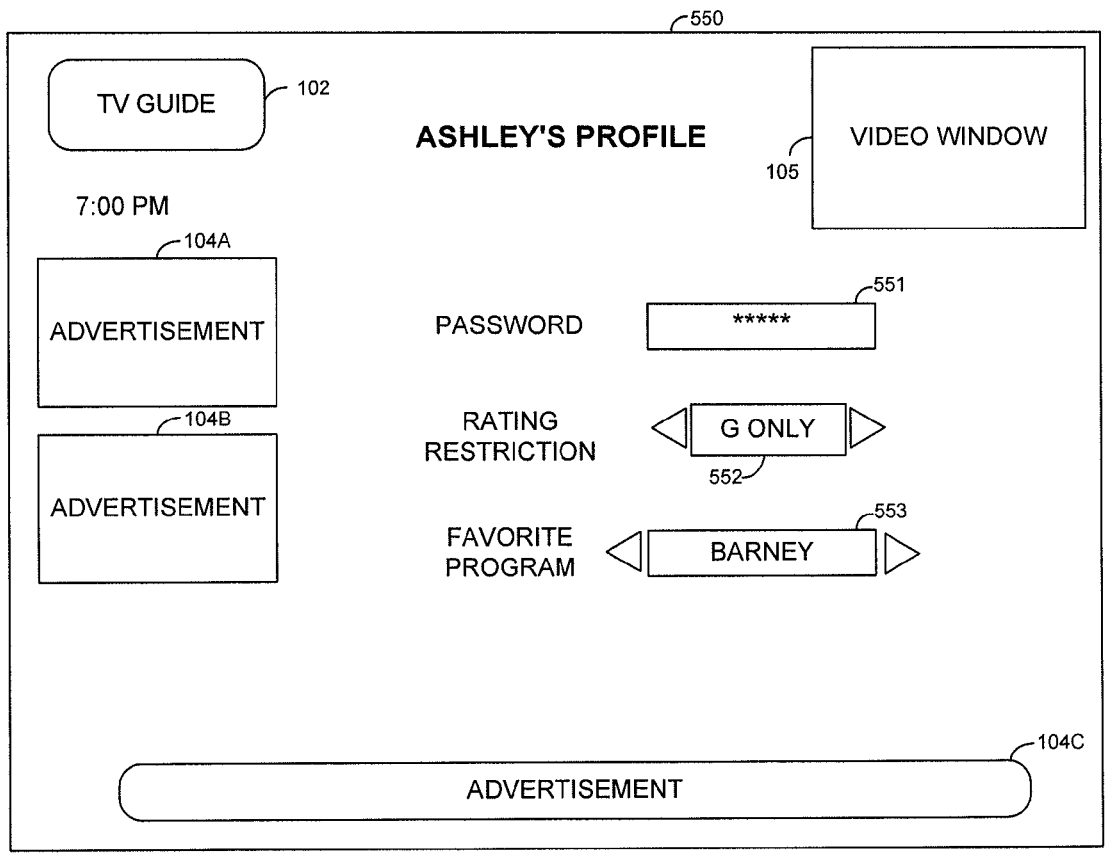
FIG. 44 is an illustrative interactive television display screen for a editing a personal profile in accordance with the present invention.
Figure 45:
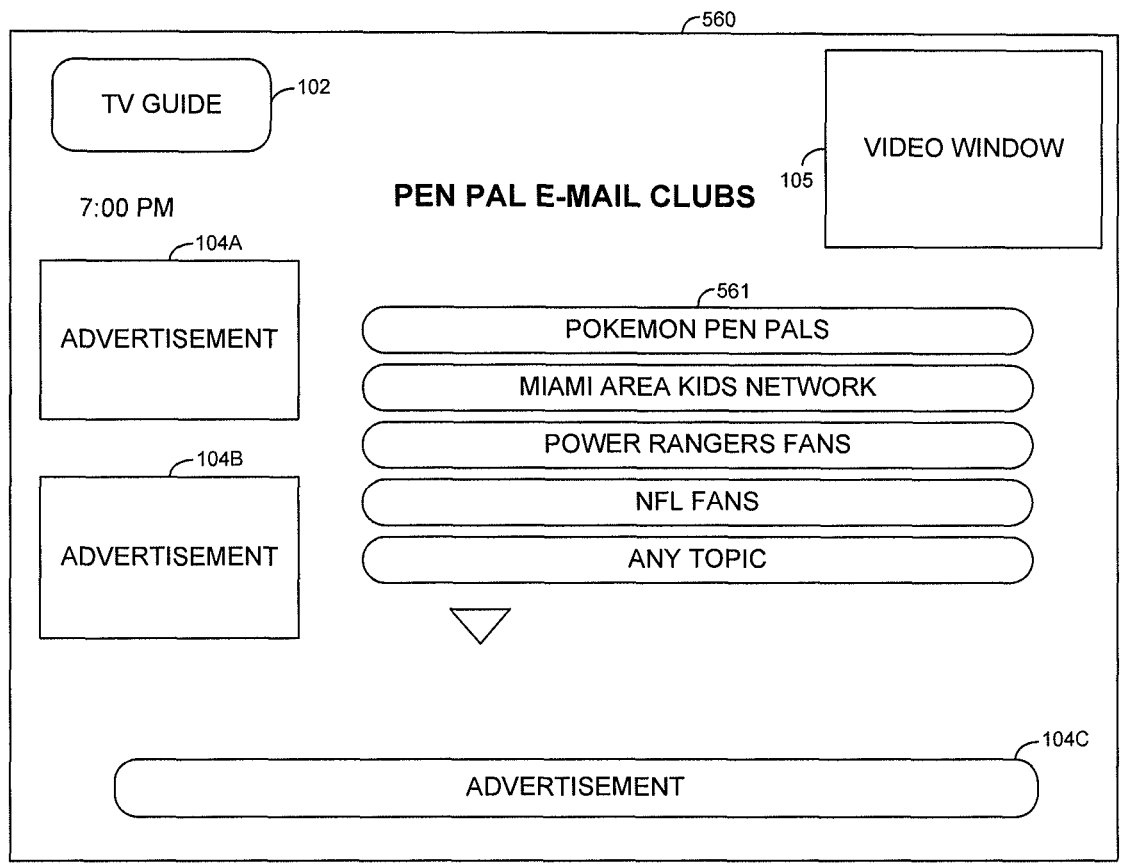
FIG. 45 is an illustrative interactive television display screen providing pen pal e-mail clubs in accordance with the present invention.

The user may edit a user profile by selecting a profile in list 541 and then pressing an "OK" key on the remote control. The program guide may then display a screen such as television display screen 550 as shown in FIG. 44. The user may enter a password in region 551 to enter that user profile. The user may set a rating restriction in region 552 for the selected name by pressing LEFT and RIGHT arrow keys on the remote control to scroll through a list of rating restrictions. The users favorite program or programs are displayed in region 553. The personal profile screen may also provide the user with the opportunity to enter other user preference information such as favorite channels, actors, directors, genres of programming, etc. The program guide may use the user preference information to set targeted advertising, automatic reminders, automatic recording of favorite programs, etc.

Profiles may be defined by example from a Program Information screen. For example, a Program Information screen may provide a favorites option. When the user selects that option, the program guide adds that program to the user's profile and displays that program in region 553. The user may scroll between her favorite programs in region 553 by pressing RIGHT and LEFT arrow keys on the remote control. The program guide may use the user's profile in a number of ways. For example, the program guide may provide program listings that match the user's favorite programs, genres, actors, etc. The program guide may also customize other features of the guide based upon the user's preferences. For example, the guide may provide web sites or merchandise in a shopping application that match the user's preferences.

A program guide niche hub of the present invention may provide the user with an opportunity to read, compose, and send messages to other users in pen pal e-mail clubs that are related to the programming category or user interest of the hub. For example, the program guide may provide display screen 560 in FIG. 45 when the user selects option 512C in screen 510. If desired, pen pal clubs related to a program may be selected from a Program Information screen for that program. Screen 560 provides the user with the opportunity to view listing 561 of topics related to programming, certain localities, sports, etc. or any topic. The user may select an option in list 561 to display a list of persons who have indicated an interest in that topic or who wish to receive messages from a pen pal on any topic.

Figure 46A:
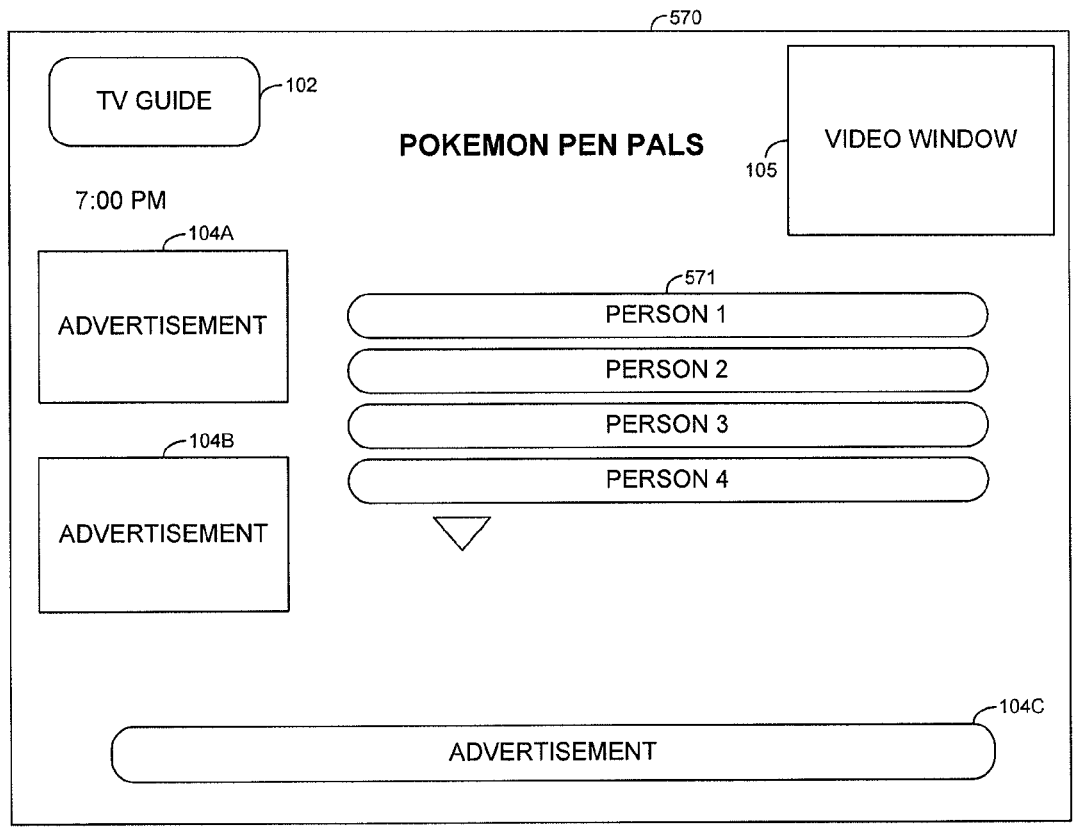
FIG. 46A is an illustrative interactive television display screen for selecting a pen pal in accordance with the present invention.
Figure 46B:
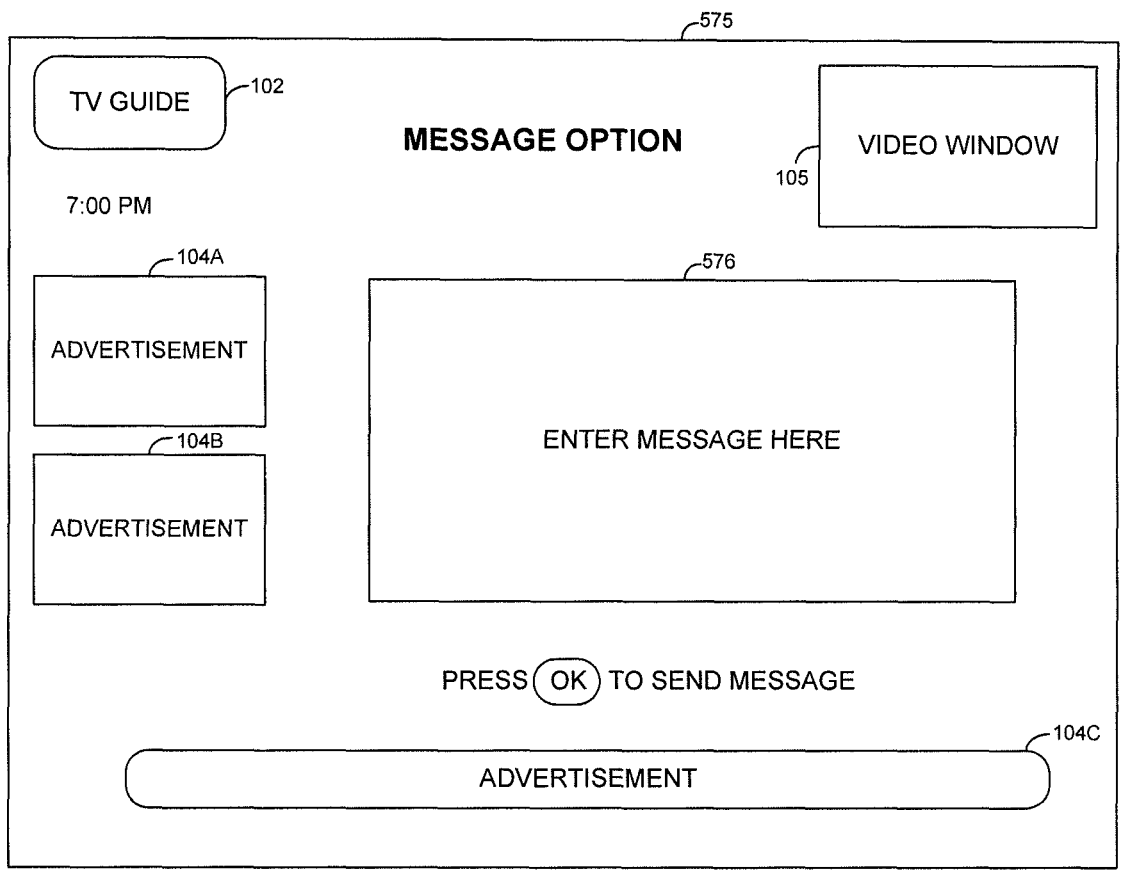
FIG. 46B is an illustrative interactive television display screen for sending a message in accordance with the present invention.

The program guide may then, for example, display television display screen 570 as shown in FIG. 46A. Screen 570 displays list 571 of persons that have indicated a desire to receive messages from a pen pal on the selected topic or any topic. The user may select a person in list 571 to send a message to that person. Each option is list 571 may provide the person's name as well as further information about the person such as where they live. When the user selects a person in list 571, the program guide may, for example, display television display screen 575 as shown in FIG. 46B. The user may compose the text of a message (e.g., using a wireless keyboard) in region 576. The user may press an "OK" key on the remote control to send the message in region 576 to the intended recipient.

The program guide application operating on set-top box 26 may receive and transmit e-mail messages for pen pal e-mail clubs via communications network 38 (e.g., the Internet) and a television distribution facility as shown in FIG. 1B. The message may be maintained on a message server (e.g., server 36). If desired, e-mail messages for pen pal e-mail clubs may be sent and received via a direct Internet connection to set-top box 26 (e.g., a separate phone line to the set-top box) that is not routed through a television distribution facility. The messages in the e-mail pen pal clubs may also be messages that are transmitted between user television equipment via a television distribution facility and maintained at a server at the television distribution facility or elsewhere (e.g., FIG. 1C).

Messages between user television equipment may be transmitted along communications paths as shown, for example, in FIGS. 1A-1C. The messages may also be maintained at message processing facility 71 as shown, for example, in FIG. 1D. Message processing facility 71 may be associated with a television channel that maintains pen pal e-mail clubs relating to its programming. Further features of an illustrative television message system is described in McKissick et al. U.S. patent application Ser. No. 09/356,245, filed Jul. 16, 1999.

Figure 47:
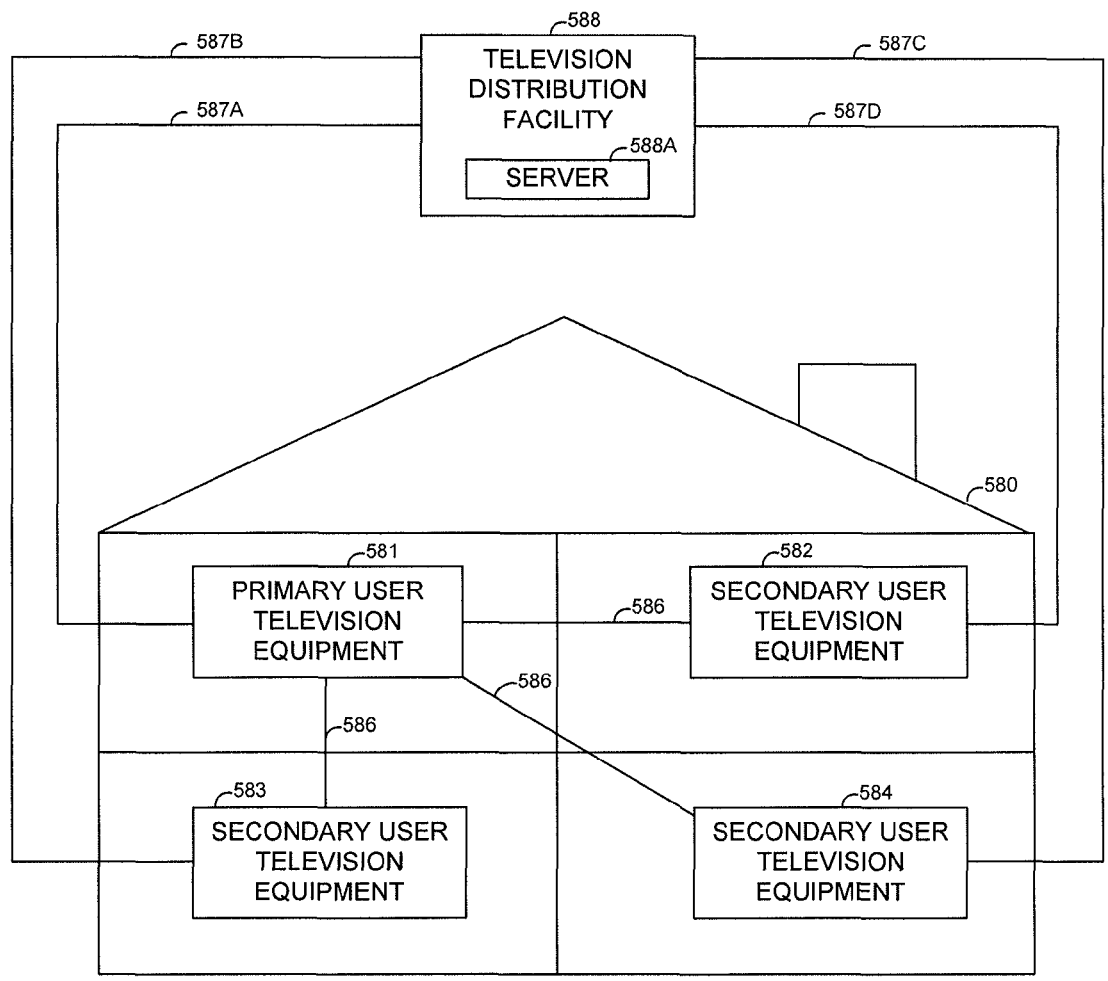
FIG. 47 is an illustrative arrangement of multiple user television equipment within a house in accordance with the present invention.
Figure 48:
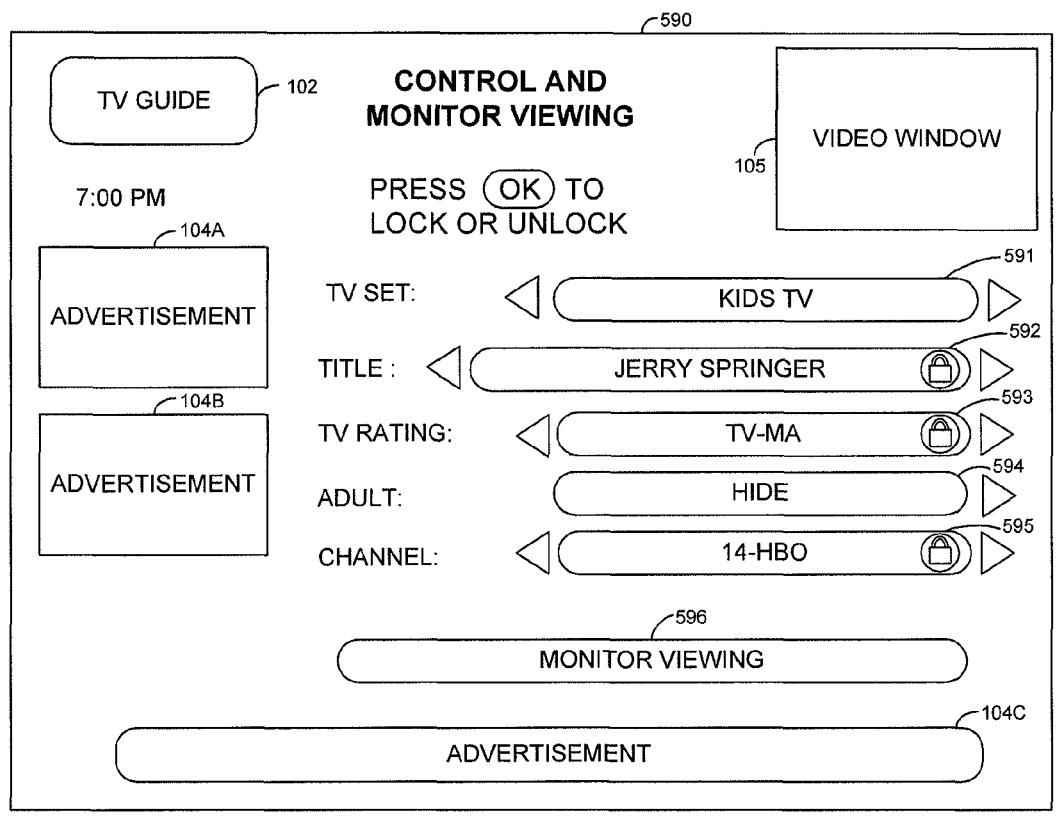
FIG. 48 is an illustrative interactive television display screen for locking channels and programming in accordance with the present invention.

The program guide with niche hubs of the present invention may provide the user with an opportunity to control programming options between multiple user television equipment devices or multiple television sets within a home. FIG. 47 shows an illustrative arrangement for interconnecting various user television equipment within a home. Primary user television equipment 581 may be connected to secondary user television equipment 582, secondary user television equipment 583, and secondary user television equipment 584 via communications paths 586. Communications paths 586 may be any suitable communications paths for an in-home network, such as twisted pair lines, Ethernet links, fiber optics, power lines, radio frequency links, infrared and other wireless links, Firewire (IEEE 1394) paths, dedicated cables, etc. As shown in FIG. 47, one or more pieces of secondary user television equipment may be connected to primary user television equipment 581 in a star configuration.

User television equipment devices are typically located in different rooms within home 580. For example, primary user television equipment 581 may be placed in the parents' bedroom, secondary user television equipment 582 may be placed in the children's room, secondary user television equipment 583 may be placed in a living room, and secondary user television equipment 584 may be placed in a guest room. With such an arrangement, the parents' bedroom may be used as a master location to adjust user settings for the program guides on the user television equipment in the children's room and other rooms.

Each of user television equipment 581-584 may be connected to television distribution facility 588 and server 588A independently along communications paths 587A-587D as shown, for example, in FIG. 47. If desired, only primary user television equipment 581 may be connected to television distribution facility 588 and server 588A along path 587A while secondary user television equipment devices 582-584 communicate with television distribution facility 588, server 588A, and each other (e.g., for sending messages between user television equipment 581-584) via primary user television equipment 581 through an in-home network such as an Ethernet link using paths 586 or other suitable connections. If all of user television equipment 581-584 are connected to server 588A, then there is no need for having an in-home network as well.

A user at primary user television equipment 581 may control and monitor the programs that may be viewed from each secondary user television equipment device in the home. For example, a parent may wish to block certain channels on a television set in the children's room, or monitor the programs that are being watched on television sets through the home. The interactive program guide may provide screen 590 in FIG. 48 when the user selects option 512D in screen 510. Screen 590 provides the user with the opportunity to control and monitor viewing on various user television equipment devices in the home. The user may select a television set in the home such as the Kid's TV by selecting option 591 and pressing RIGHT and LEFT arrow keys on the remote control. The user may then select blocking features for the television set selected in region 591 by manipulating options 592-595 on screen 590.

For example, the user can lock a program, rating, or channel for the kid's television set from an information screen (e.g., Program Information screen) by selecting a lock option for that program, rating, or channel. The user can unlock a program such as "Jerry Springer" for the kid's television set by selecting option 592 and then pressing "OK" on the remote control to unlock that program. A user may lock or unlock a specific television program rating (e.g., TV-MA) for the kid's television set by selecting option 593, and then pressing "OK" on the remote control to lock or unlock that rating. A user may lock or unlock a specific television channel (e.g., 14-HBO) for the kid's television set by selecting option 595, and then pressing "OK" on the remote control to lock or unlock that channel. The user can scroll to other locked programs, ratings or channels in regions 592, 593, and 595 by pressing RIGHT and LEFT arrow keys on the remote control. A lock icon in any of regions 592, 593, and 595 indicates that the selected option is currently locked. A user may hide adult programs for the kid's television set by selecting option 594, then using a LEFT arrow key on the remote control to scroll from the "SHOW" to the "HIDE" option to hide adult programs and their titles in the program guide listings. Parental control features may also be available, for example, from a Program Information screen.

Figure 49:
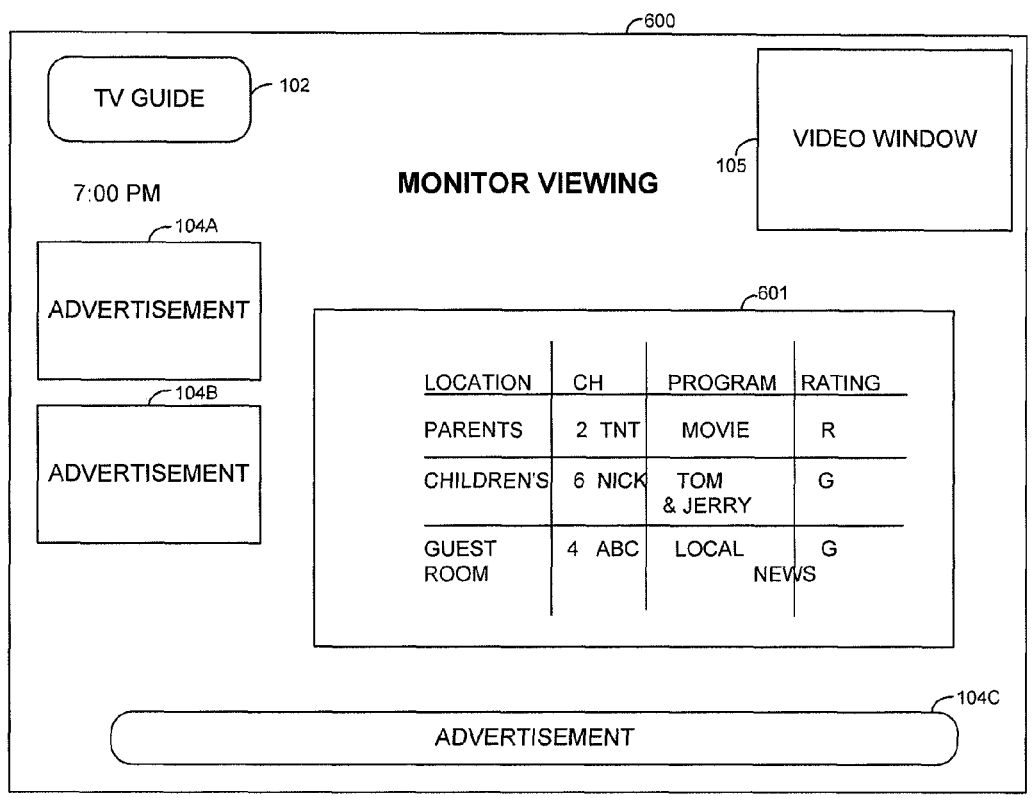
FIG. 49 is an illustrative interactive television display screen for monitoring viewing on other user television equipment within the house in accordance with the present invention.

The user may select option 596 in screen 590 to monitor the channels that are being viewed on user television equipment throughout the home. The program guide at primary user television equipment 581 may poll the program guides at secondary user television equipment in the home to determine whether anyone is currently viewing television and which channels they are tuned to. When the user selects option 596, the program guide may provide, for example, screen 600 as shown in FIG. 49. Screen 600 provides a grid in region 601 which shows the channel and program that is being currently viewed on user television equipment in the home. Grid 601 also provides the ratings for the programs currently being viewed on each user television equipment that is being monitored (e.g., R for 17 and up, G for general audiences). Video window 105 on screen 590 or screen 600 may be video from the other television being monitored. The set-top box at the primary user television equipment may tune to the same channel that the monitored television is tuned to. If the monitored television is displaying video from another source such as a local video recorder, then the video shown in window 105 on the primary user television equipment may be reduced quality if it needs to be transferred from one location in the house to another.

The program guide may also provide the user at primary user television equipment 581 with the option of changing the television channel at one or more of secondary user television equipment 582-584 by selecting a location user television equipment and pressing UP or DOWN arrow keys on the remote control. The program guide on primary user television equipment 581 then directs the selected secondary user television equipment to tune to the selected channel. The program guide may also provide the user with the opportunity to turn off viewing by pressing an OFF key on the remote control or to control the volume in one of the secondary user television equipment by manipulating volume control buttons on the remote control. The program guide may only provide option 512D, and screens 590 and 600 on primary user television equipment 581 and may require an access code to enter screen 590. Further features of an illustrative interactive television program guide system having multiple devices within a household are described in Ellis et al. U.S. patent application Ser. No. 09/356,161, filed Jul. 16, 1999, which is hereby incorporated by reference herein in its entirety.

Figure 50:
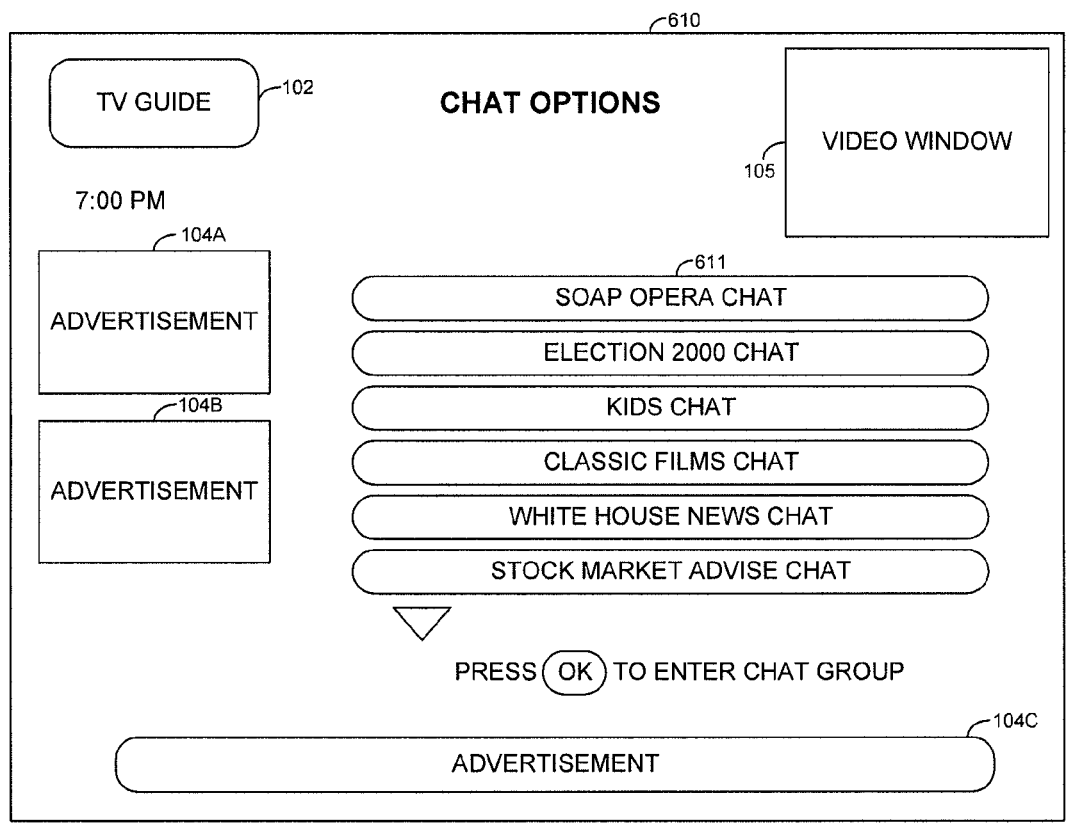
FIG. 50 is an illustrative interactive television display screen for selecting a chat group in accordance with the present invention.
Figure 51:
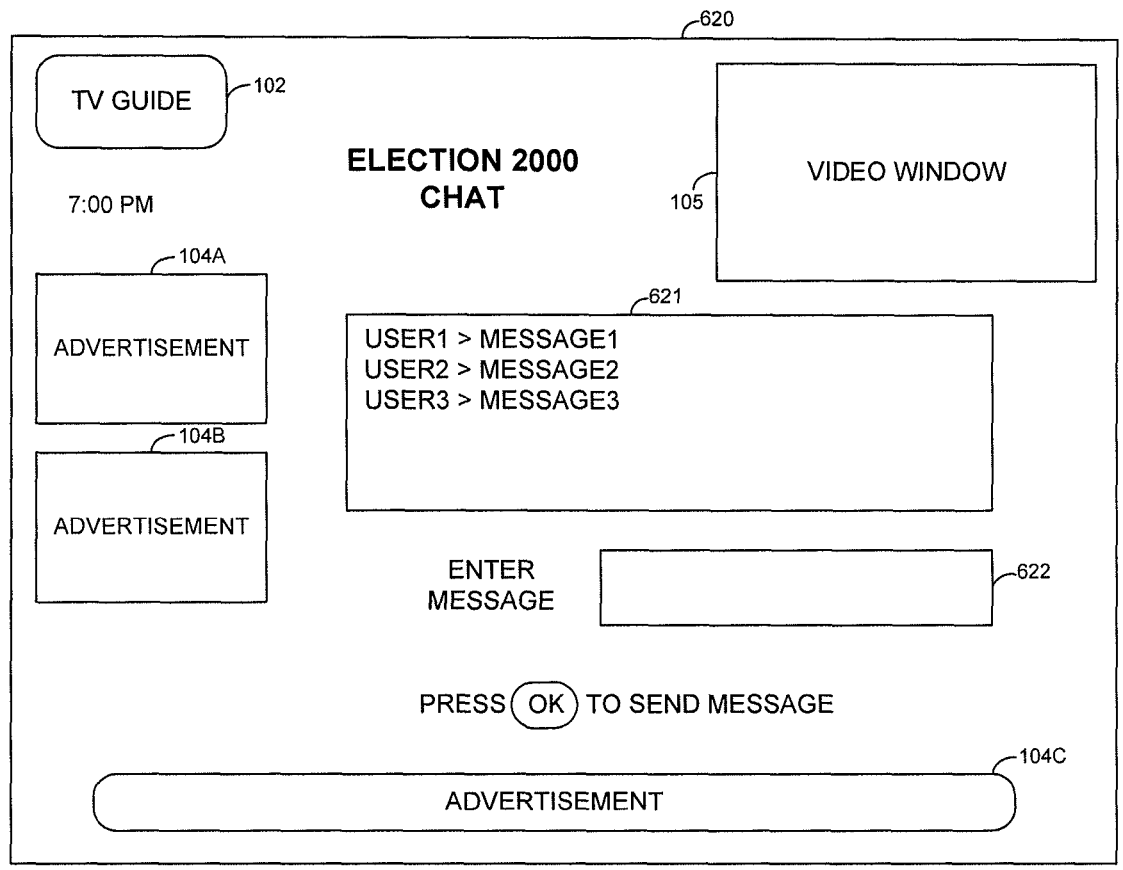
FIG. 51 is an illustrative interactive television display screen for displaying a chat group in accordance with the present invention.

Screen 610 in FIG. 50 is an example of a display screen that provides the user with an opportunity to participate in a chat group. The program guide may display screen 610 when the user selects, for example, option 512E from screen 510. A chat group comprises a group of users who send real-time messages to each other. The users may be Internet users and users of user television equipment devices. The real-time messages in the chat group may be maintained on a chat server at, e.g., a television distribution facility or elsewhere as shown in FIGS. 1A-1C, such as such as servers 33, 35, 36, and 50. The user may participate in a chat group by selecting from list 611 in screen 610. List 611 may contain chat groups that are related to family oriented programming. The user may view additional chat groups by pressing the DOWN arrow key on the remote control. The program guide may also provide the user with an opportunity to enter chat groups related to a program from a Program Information screen for that program.

When the user selects a chat group in list 611, the program guide may communicate with a television distribution facility to connect to the chat server that maintains that chat group. When the program guide connects to the selected chat group, the program guide may display a screen such as screen 620 in FIG. 51. Messages from the chat group are displayed in region 621. The user may compose a message in region 622 to be added to the chat group using, e.g., a wireless keyboard. The user may send the message to other users in the chat group by, e.g., pressing an "ENTER" key on the remote control. The message in region 622 then appears in region 621 and is sent to the other users in the chat group. Messages between users (of user television equipment and user communications equipment) in chat groups may be sent along communications paths such as the ones shown in FIGS. 1A-1C. The user may also enter a chat group for a program by selecting a chat option from a Program Information for that program. Further features of an illustrative television chat system is described in DeWeese et al. U.S. patent application Ser. No. 09/356,270, filed Jul. 16, 1999, which is hereby incorporated by reference herein in its entirety.

Figure 52:
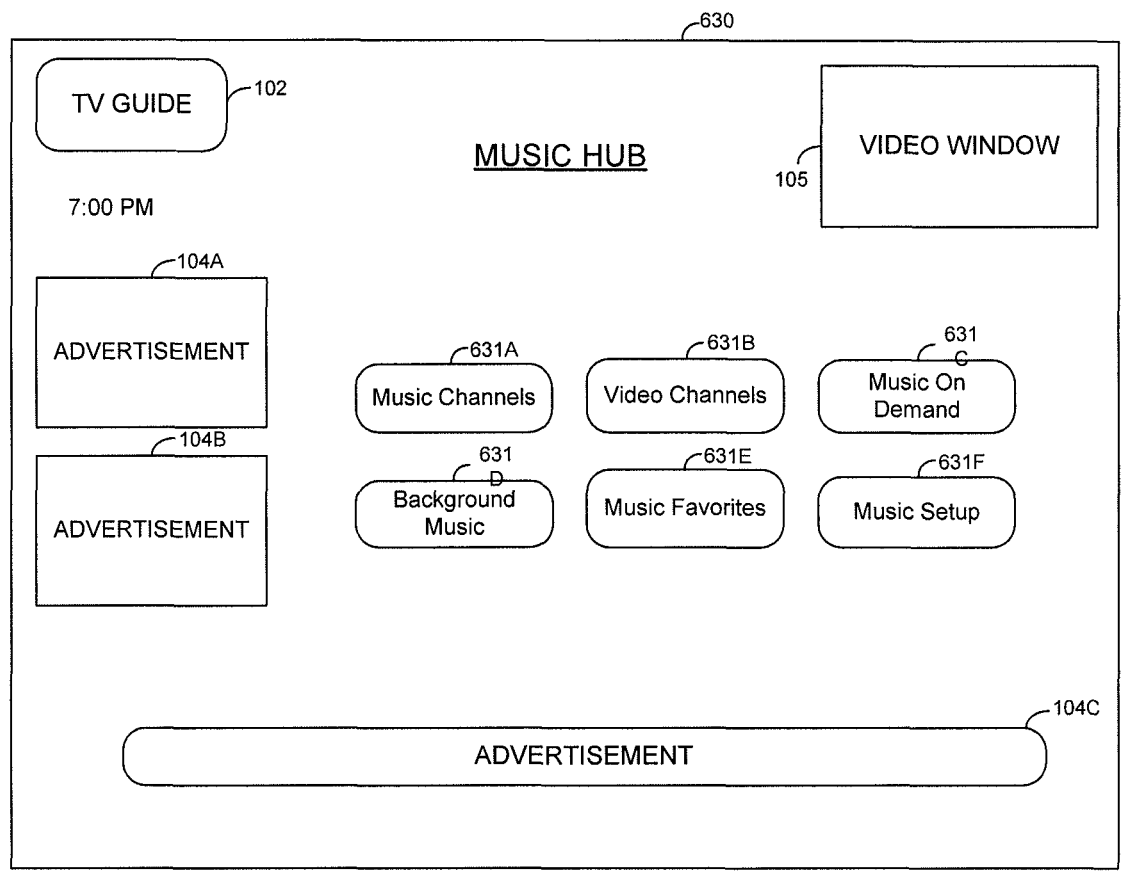
FIG. 52 is an illustrative interactive television display screen for a music niche hub in accordance with the present invention.

Another illustrative television program guide main menu screen of a niche hub in accordance with the present invention is shown in FIG. 52. Menu screen 630 in FIG. 52 is the main menu screen of a music niche hub. Screen 630 provides the user with the option of using a variety of program guide features related to music and music related programming. The music hub may have many of the same options as the other hubs such as program listings, shopping, web sites, chat groups, video on-demand or pay-per-view concerts, etc.

The music hub may also have an option to see music-related programs, in addition to actual music programming within each feature of the hub. This might include programs with guest appearances by music celebrities or music groups, or any other programs that may be of interest to a music fan. The music hub may have an option to provide feedback for rating individual songs and the ability to see other people's ratings. The music hub may also provide parental control for music such as the ability to block songs with sexual or foul language. Also, songs and song categories may come with parental warning labels. The music hub may also have features for fan clubs such as chat groups, the ability to buy merchandise relating to an artist, concert schedules, etc. The music may also have recording features that are used to record music.

Figure 53A:
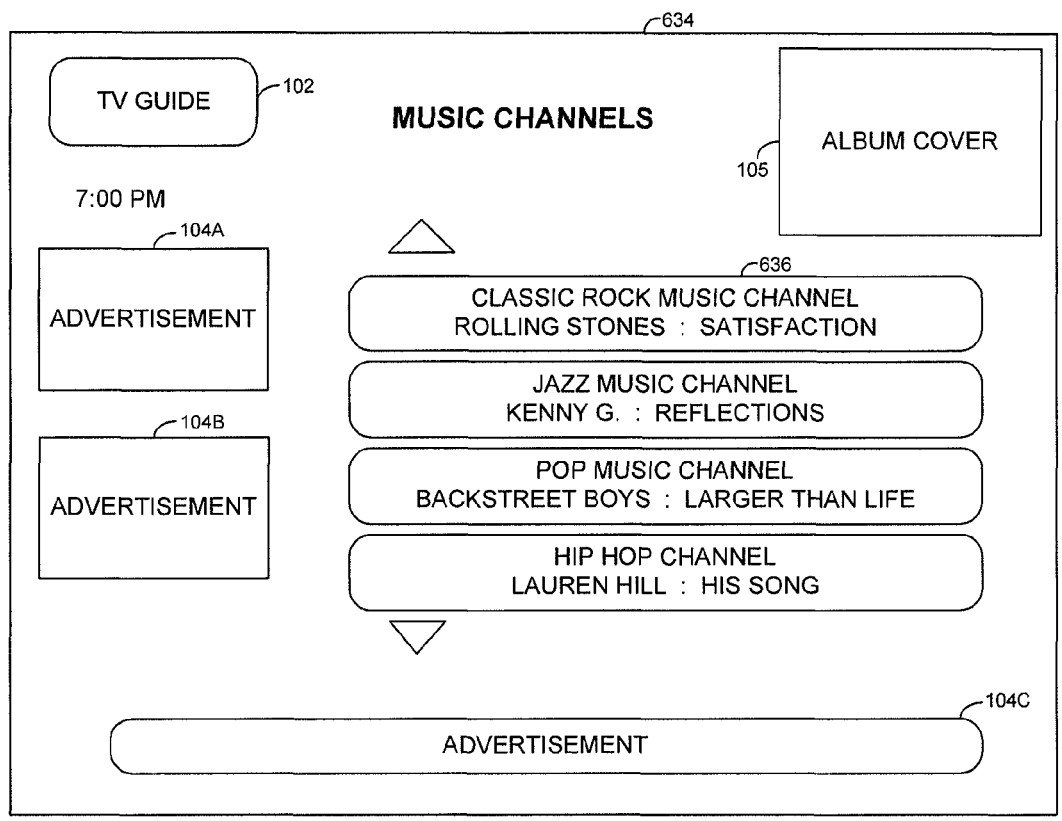
FIG. 53A is an illustrative interactive television display screen for viewing music channels in accordance with the present invention.

Screen 630 provides the user with the opportunity to view a listing of music channels (e.g., cable music channels) by selecting option 631A as discussed in further detail with respect to FIG. 53A. The user may view a listing of music video channels by selecting option 631B as discussed in further detail with respect to FIG. 53B. The user may view a listing of available music-on-demand song tracks by selecting option 631C as discussed in further detail with respect to FIG. 54A-54E. The user may select background music for the program guide by selecting option 631D as discussed in further detail with respect to FIG. 55. The user may select music favorites by selecting option 631E as discussed in further detail with respect to FIG. 56. The user may manipulate music setup options by selecting option 631F as discussed in further detail with respect to FIG. 57.

If the user selects option 631A in screen 630, the program guide may, for example, display screen 634 as shown in FIG. 53A. Screen 634 displays listing 636 of available music channels. When the user selects a channel option from listing 636 using UP and DOWN arrow keys on the remote control, the program guide switches the current audio to the selected music channel. When the user selects or highlights an option in listing 636, the program guide may display the album cover for that song in window 105.

Each option in listing 636 includes the title of the music channel, and the title and the artist for the current song on that channel. When the user selects an option in listing 636, the program guide tunes to the selected music channel and displays the song title, artist, and album cover of the song that is currently playing on the selected music channel. Song title, artist, and album cover graphics for current songs may be provided to the set-top box from a television distribution facility in-band with the music channels. The set-top box may decode the in-band track, artist, and title information from the selected music channel signal using the tuner tuned to that channel.

The program guide may also display track and artist information for songs that are currently playing on available music channels other than the music channel currently selected in listing 636. The set-top box may contain two tuners. The set-top box may have a second tuner for decoding the in-band track and artist information for the song currently playing on a music channel other than the one that the first tuner is tuned to. The second tuner may sequentially tune to each available analog and digital music channel so that the program guide application may obtain in-band music information such as track and artist information for current songs on each channel.

The song title, artist, and album cover information for the current songs on the available music channels may be stored in memory 25 of set-top box 26 and displayed in listing 636. The song title, artist, and album cover information for the current songs on the available music channels may also be obtained from an Internet web server via a television distribution facility (e.g., as shown in FIG. 1B) and transmitted to the set-top box along an out-of-band channel along communication paths connected to the television distribution facility. Further features of an illustrative music information system using second tuner to collect in-band data is described in Ellis, U.S. patent application Ser. No. 09/330,860, filed Jun. 11, 1999, which is hereby incorporated by reference herein in its entirety.

Figure 53B:
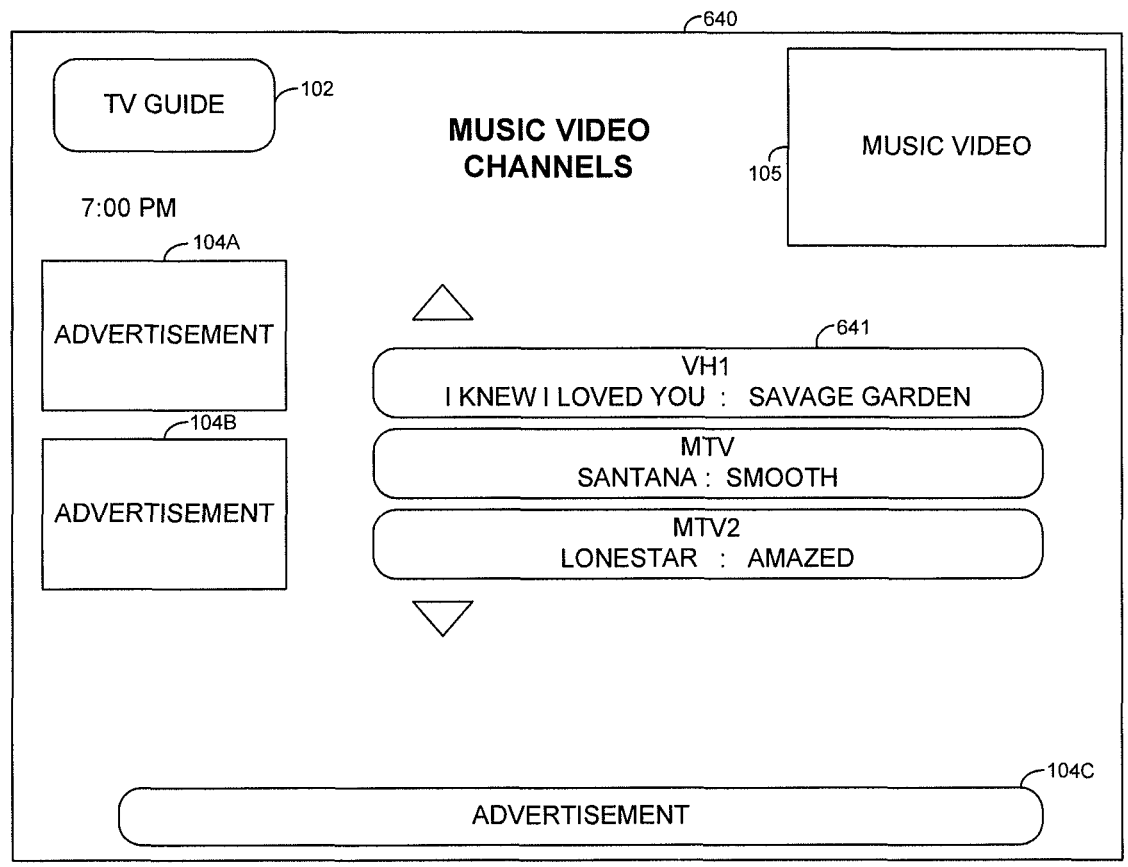
FIG. 53B is an illustrative interactive television display screen for viewing video music channels in accordance with the present invention.

If the user selects option 631B in screen 630, the program guide may, for example, display screen 640 as shown in FIG. 53B. Screen 640 displays listing 641 of available music video channels. When the user selects a channel option from listing 641 using UP and DOWN arrow keys on the remote control, the program guide switches the current video in window 105 to the selected music video channel to play the current video and accompany music. The program guide displays song title and artist information for each video music channel in listing 641. The program guide may obtain the song title and artist information for the current video from by decoding in-band data using two tuners as discussed above with respect to FIG. 53A, from the program guide database 14 at main facility 12, or from a server.

Figure 53C:
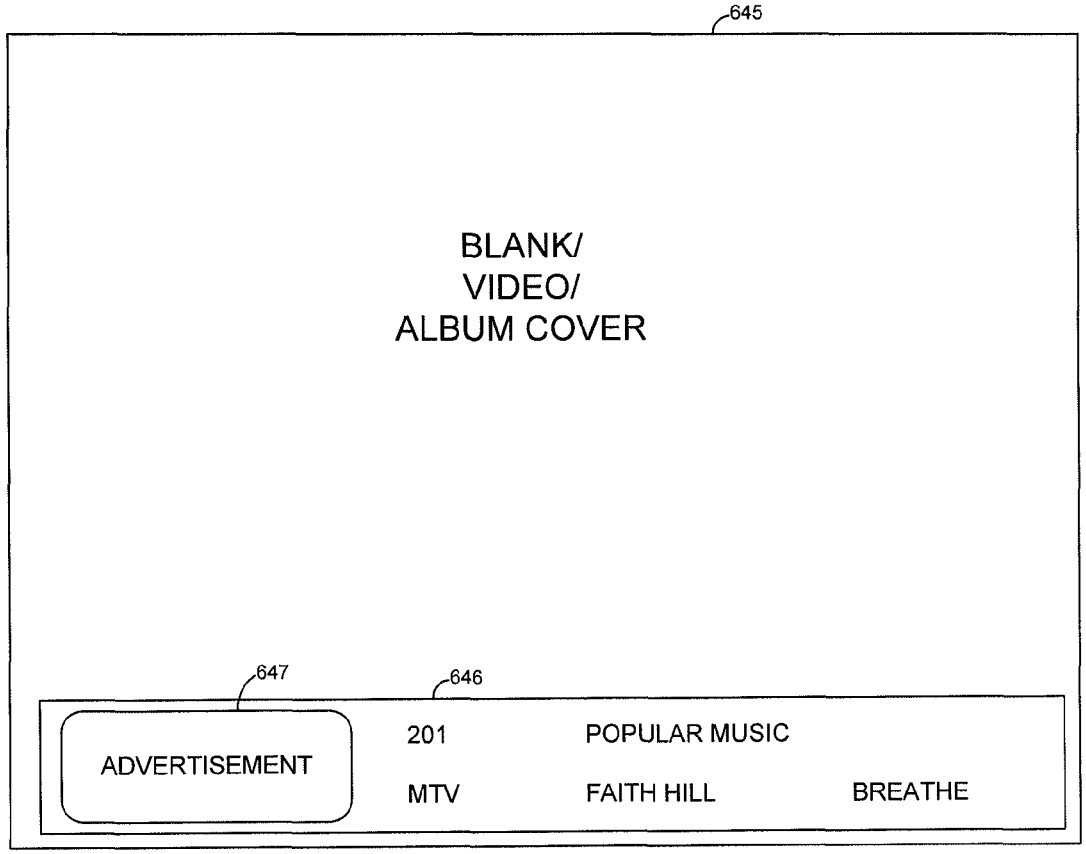
FIG. 53C is an illustrative music flip interactive television display screen in accordance with the present invention.

Screen 645 in FIG. 53C is an example of a music flip screen that may be displayed for a few seconds when the program guide tunes to a music channel or music video channel. The guide may tune to a music or music video channel when, for example, the user presses the OK key while a channel is highlighted on screen 634 or screen 640, presses channel UP or channel DOWN while on another channel, or enters the channel number of the music or music video channel. The album cover, music video, or other still image for the current song on the music or music video channel may be displayed on screen 645. If desired, screen 645 may be blank. Screen 645 displays the music genre, artist, and title for the current song on the music or music video channel, as well as selectable advertisement 647, and channel information, in overlay 646.

Figure 53D:
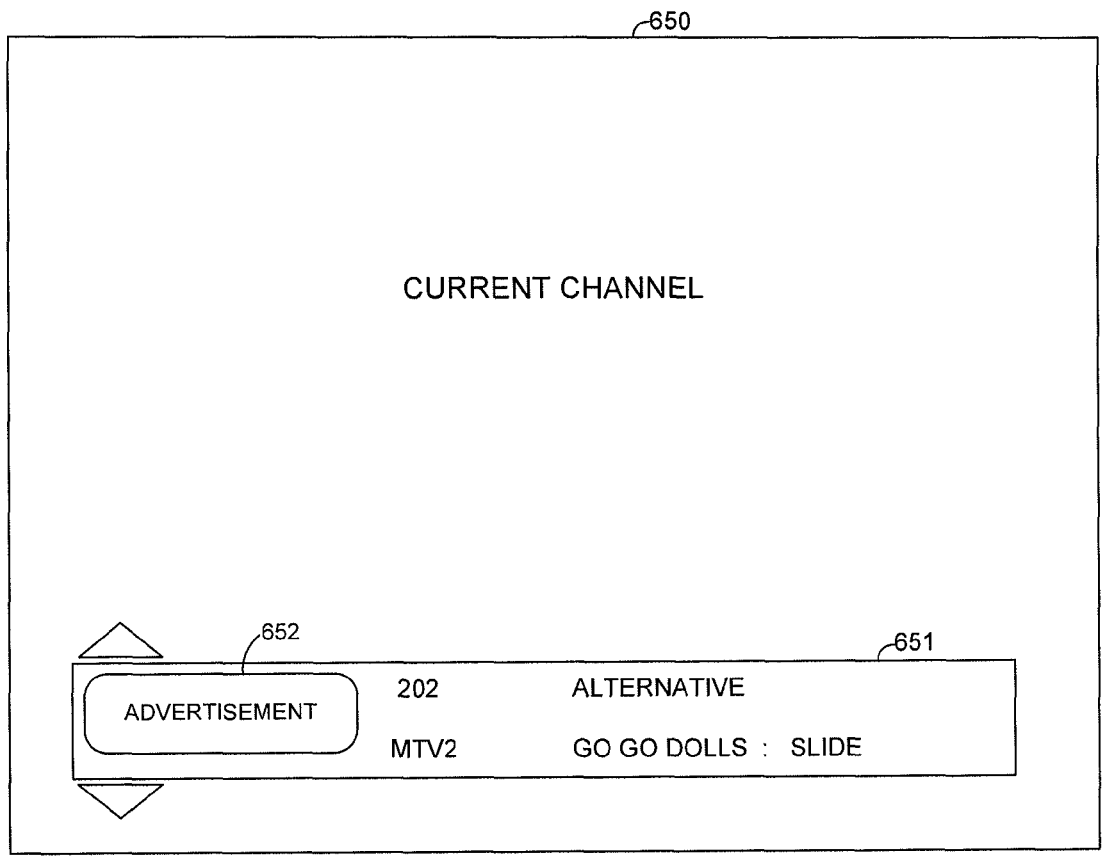
FIG. 53D is an illustrative interactive television display screen with a music channel browse region in accordance with the present invention.

If the user presses the UP or DOWN arrow on the remote control while the set-top box is currently tuned to a music or music video channel, the program guide may display music browse region 651 as shown in screen 650 of FIG. 53D. Region 651 displays the music genre, title, and artist of the song playing on each available music and music video channel without having to change channels. This information may be obtained by the set-top box as discussed with respect to FIG. 53A. The user may press the UP and DOWN arrows to view additional music channels. If desired, the program guide may automatically scroll through the available music or music video channels in region 651. Region 651 also displays advertisement 652 which may be selectable. The user may press OK on the remote control to tune to (and display the music flip screen for) the channel currently displayed in region 651.

Figure 53E:
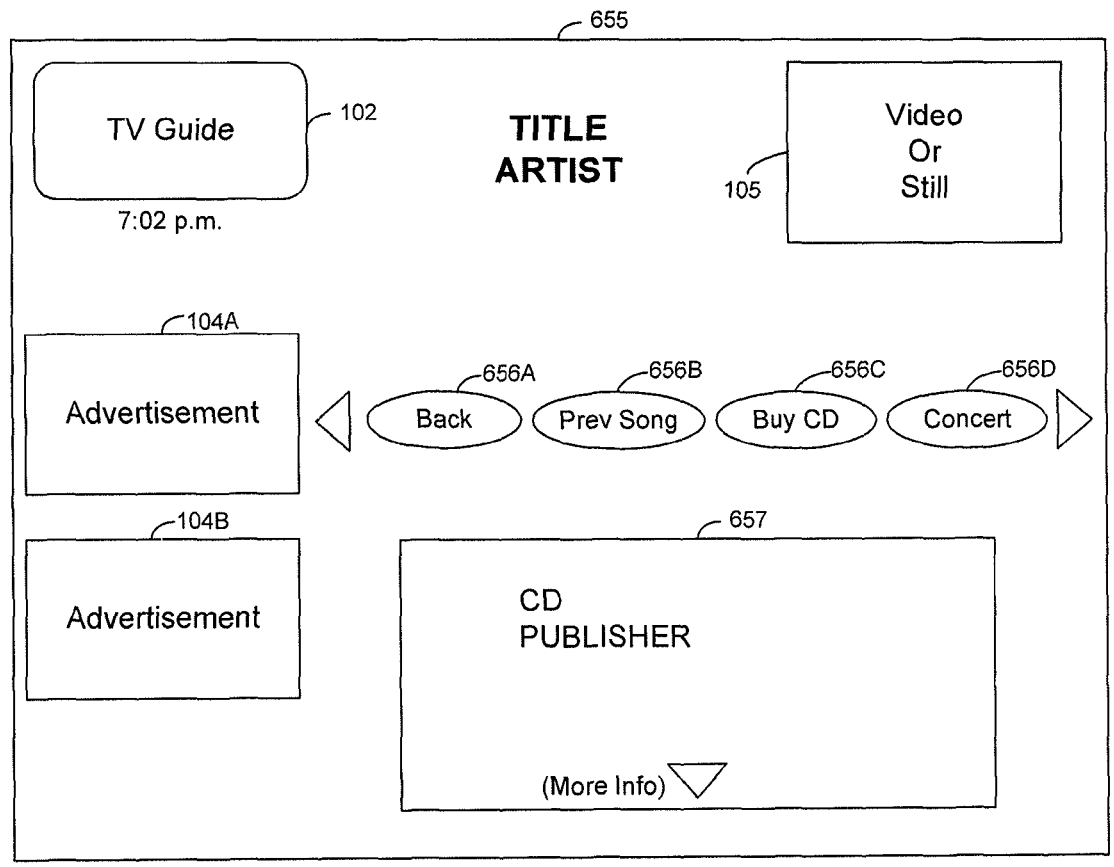
FIG. 53E is an illustrative interactive Song Information display screen in accordance with the present invention.

The user may press an INFO key on the remote control to display a Song Information screen for the current song playing on the currently selected channel (e.g., from screen 634, 640, 645, or 650). An example of a Song Information screen in shown in FIG. 53E. Screen 655 in FIG. 53E displays the title and artist for a song the user is listening to or a song that is listed on any program guide menu screen. Region 657 also includes further details about the song, for example, the title of the compact disc for that song, and the name of the publisher.

Screen 655 also has options related to the song, as appropriate. For example, screen 655 has option 656A to return to the previous display screen, option 656B to display the Song Information screen for the previous song heard, and option 656C to buy the compact disc indicated in region 657. Screen 655 also displays option 656D to display a concert schedule for the artist indicated in screen 655 if one is available. When the user selects option 656D, the program guide may display national or local concert schedules and concert reviews, and provide the user with an opportunity to purchase tickets to a concert. The concert option is another example of a hyperlink feature that links the user to options that are related to information the user is currently viewing.

A Song Information screen such as screen 655 may provide further options. The user may press RIGHT or LEFT arrow keys on the remote control to display these options on screen 655. For example, screen 655 may provide further options relating to the song and artist shown in screen 655 such as an option to view information about the artist (e.g., biographical information or music reviews), and an option to view a discography for the artist (i.e., a listings of the artist's albums or songs). These features may include an option to select an individual song and to view further information about that particular song and an option to buy a featured compact disc.

Screen 655 may also include an option to enter a karaoke mode for video music channels, in which the program guide plays the song and music video without vocals. The program guide may provide the vocals for video music channels separately from the instrumental music. In karaoke mode, the program guide only provides the instrumental portion of the music for the selected video music channel without the vocal portion of the music, and provides the words of the song as text on the television screen. Screen 655 may also include an option to add the song to the music on-demand play-list (e.g., maintained at a music on-demand server at a television distribution facility). Screen 655 may also include an option to request the song from a music or music video channel that takes requests. The program guide may indicate to the user the price of the song and may debit the user's account when the user confirms the transaction. Screen 655 may also include an option to add the song to the user's profile of likes and dislikes (discussed further with respect to FIG. 56). A Song Information screen may be displayed automatically every time the song on the current channel changes.

Figure 54A:
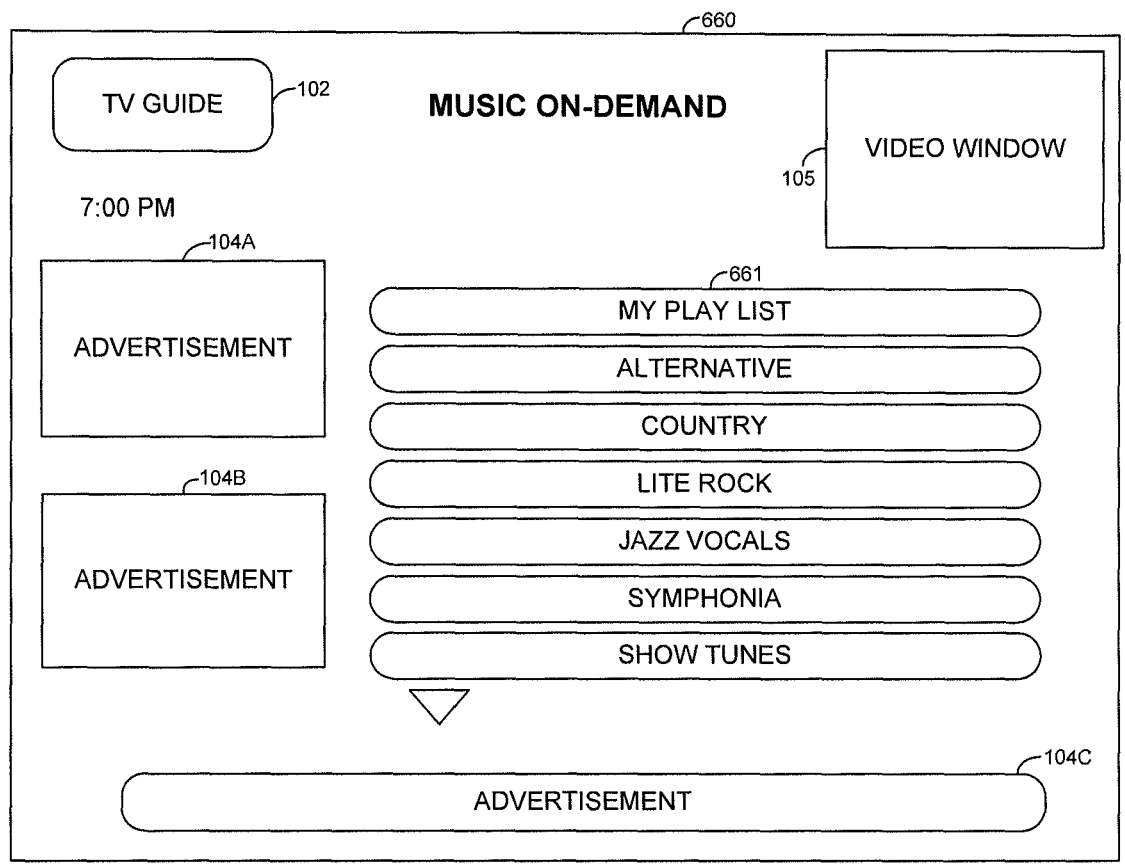
FIGS. 54A-54E are illustrative interactive television display screens with music on-demand options in accordance with the present invention.
Figure 54B:
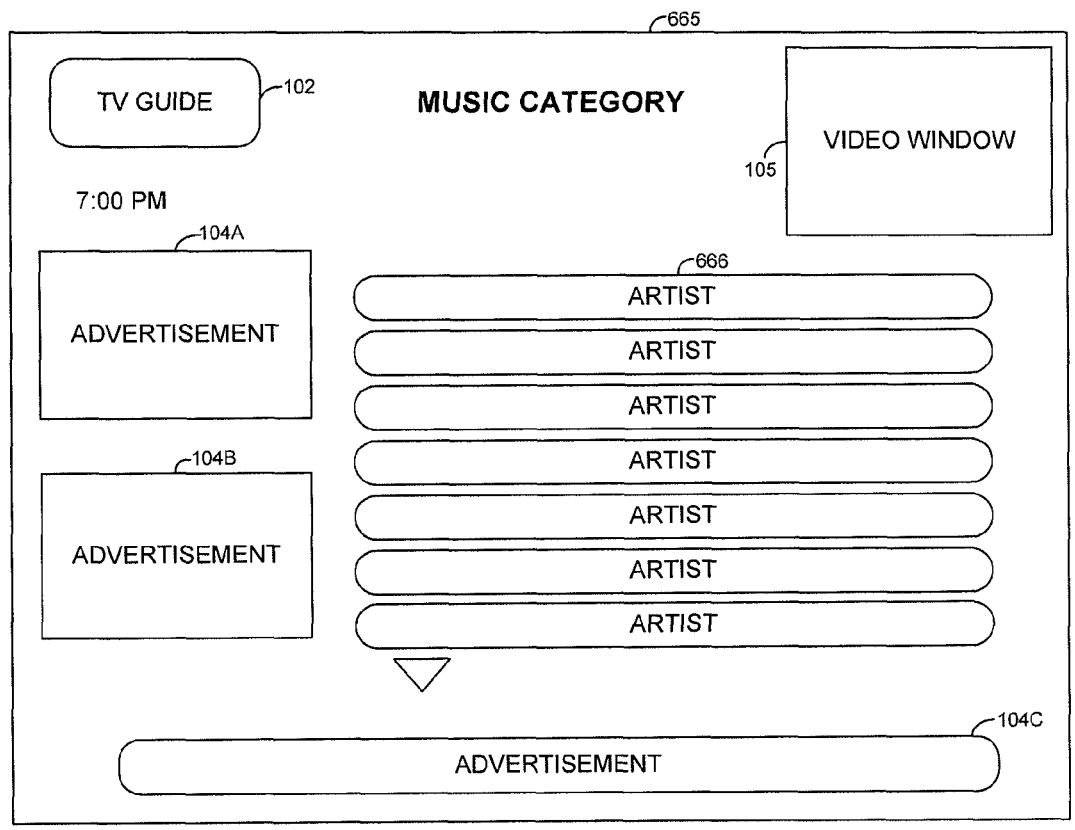
Figure 54C:
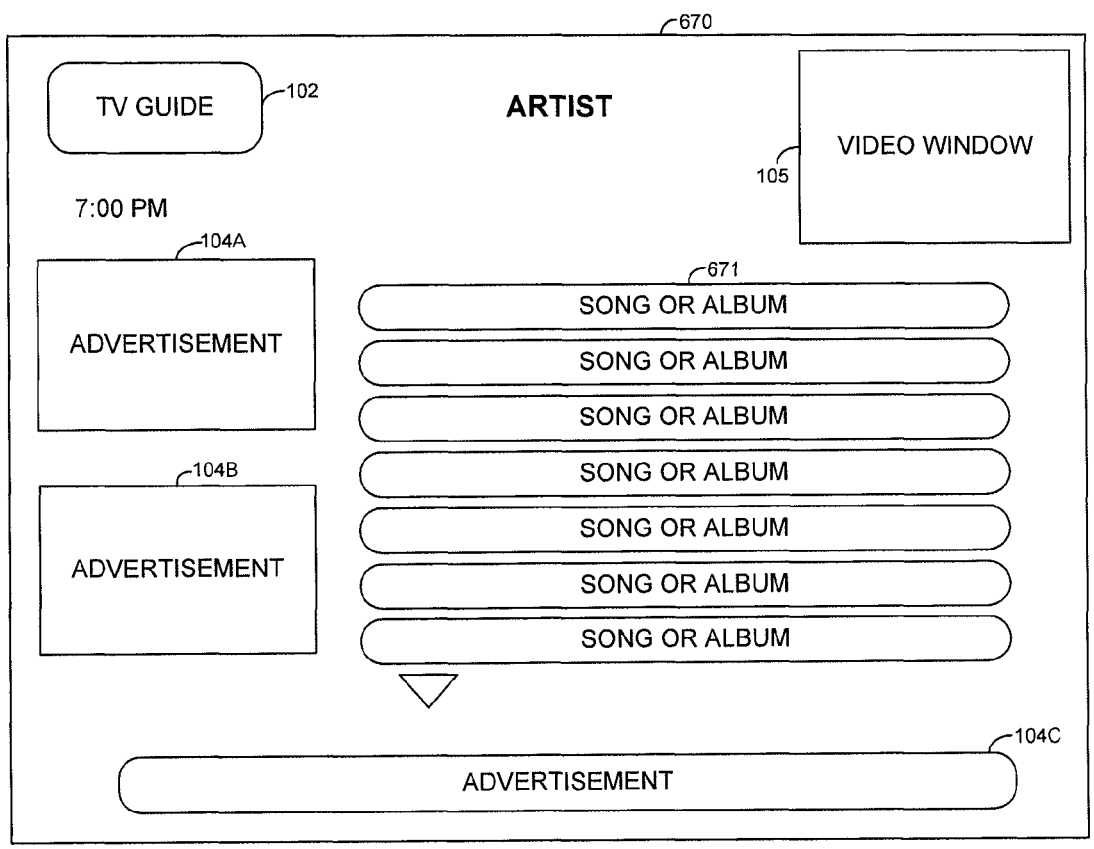
Figure 54D:
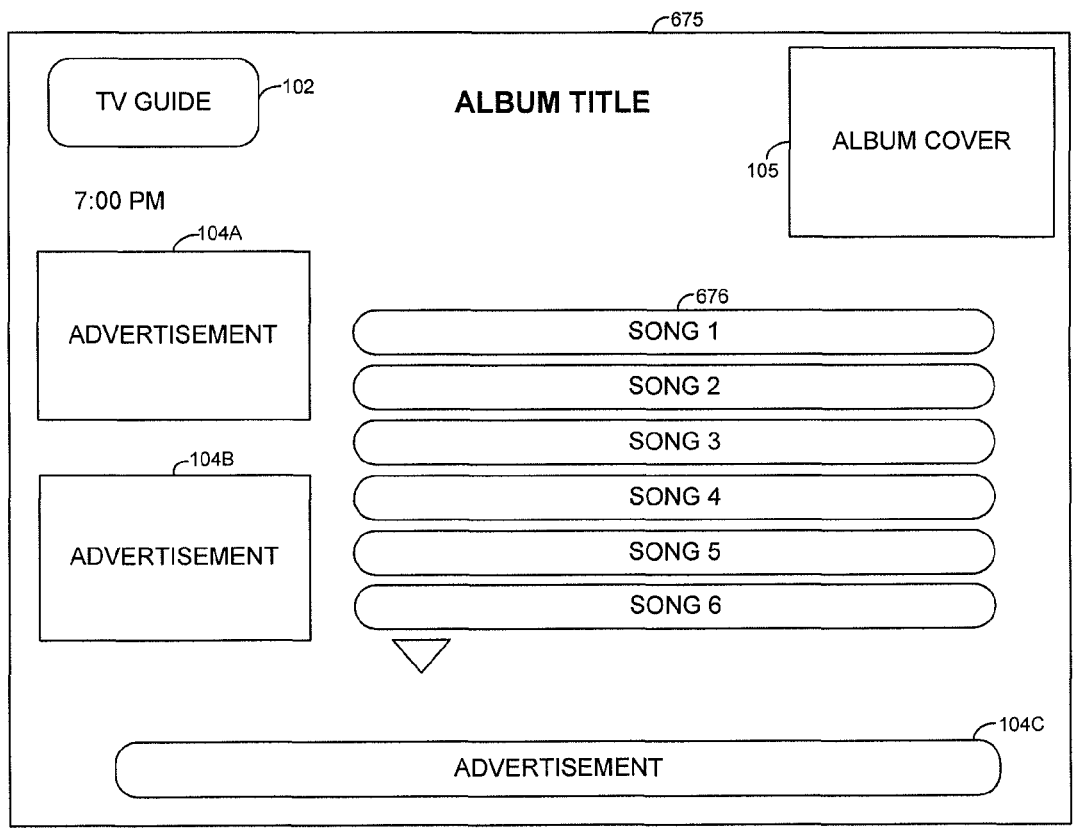
Figure 54E:
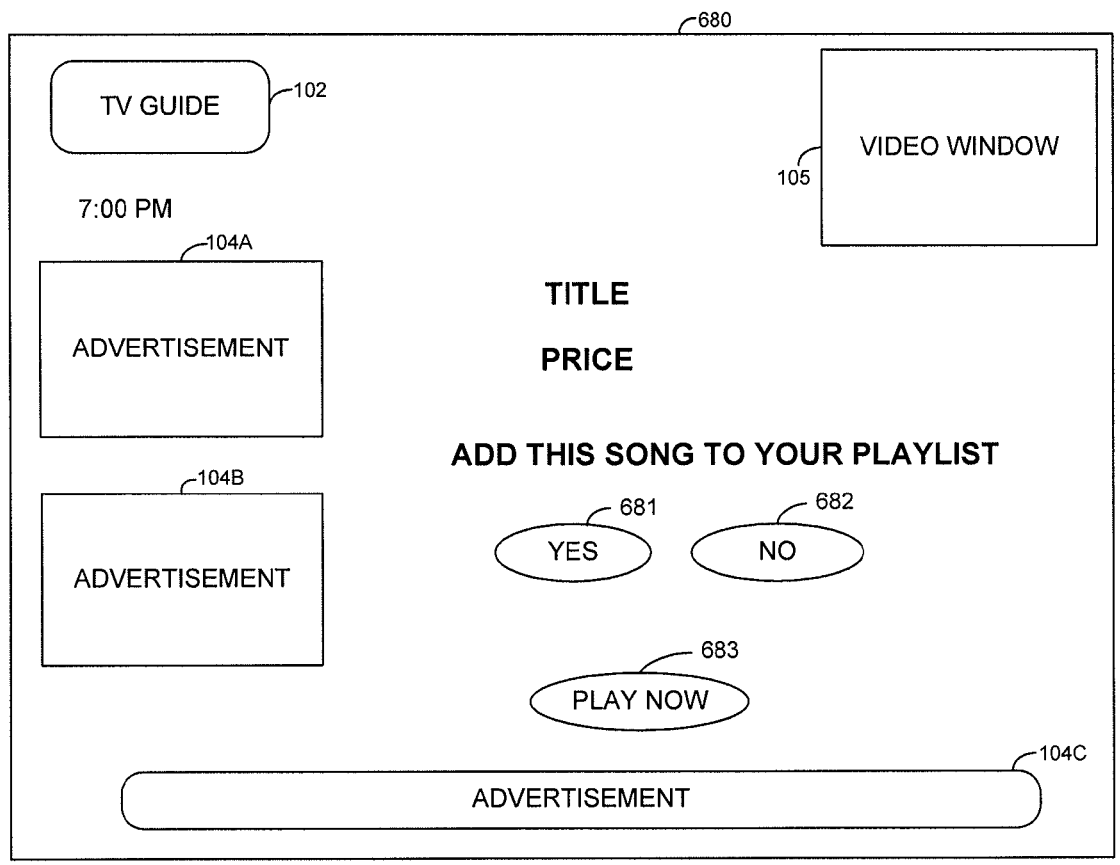

When the user selects music on-demand option 631C, the program guide may, for example, provide a screen such as screen 660 in FIG. 54A. Screen 660 provides list 661 of genres of music for which music song are available on-demand. Screen 660 also provides the user with the opportunity to add songs to a user selected play list that may be played on-demand for a fee. The user may view his play list may selecting "My Play List" in list 661. When the user selects a music genre in list 661, the program guide provides a screen such as screen 665 in FIG. 54B that contains list 666 of artists within the selected genre. When the user selects an artist in list 666, the program guide provides a screen such as screen 670 in FIG. 54C that contains list 671 of songs and albums for the selected artist. When the user selects an album in list 671, the program guide provides a screen such as screen 675 in FIG. 54D that displays the songs for the selected album in list 676. When the user selects a song in list 671 or 676, the program guide provides a screen such as screen 680 in FIG. 54E. Screen 680 displays the price and title of the song, and provides the user with the opportunity to add the selected song to the user's play list by selecting option 681 or not by selecting option 682. The user may play the song now by selecting option 683. The program guide may provide the user with an option on screen 630 to view his play list. When the user selects this option, the program guide displays the play list as well as the price to play the list, the time duration of the entire list, and an option to start playing the play list now.

Figure 55:
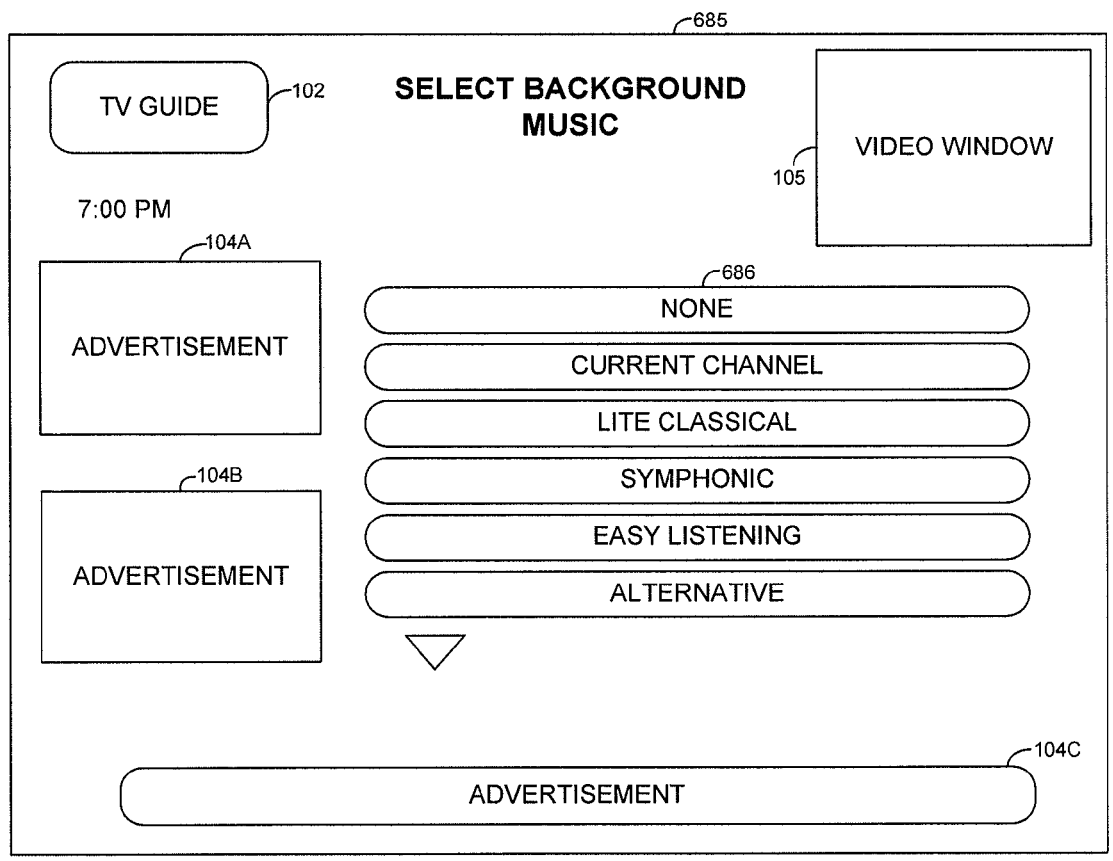
FIG. 55 is an illustrative interactive television display screen for selecting background music in accordance with the present invention.

When the user selects option 631D in screen 630, the program guide may provide a screen such as screen 685 in FIG. 55. Screen 685 provides the user with the opportunity to select background music for the program guide. Background music is a music category that plays whenever an interactive program guide screen is displayed, unless it is overridden by audio from a channel or other source. The user may select a background music category in list 686. The music may be obtained from a server that maintains prerecorded tracks at the television distribution facility or elsewhere, a radio station, or other real-time data source. Further features of an illustrative interactive television program guide system with audio are described in Allison U.S. patent application Ser. No. 09/436,976, filed Nov. 9, 1999, which is hereby incorporated by reference herein in its entirety.

Figure 56:
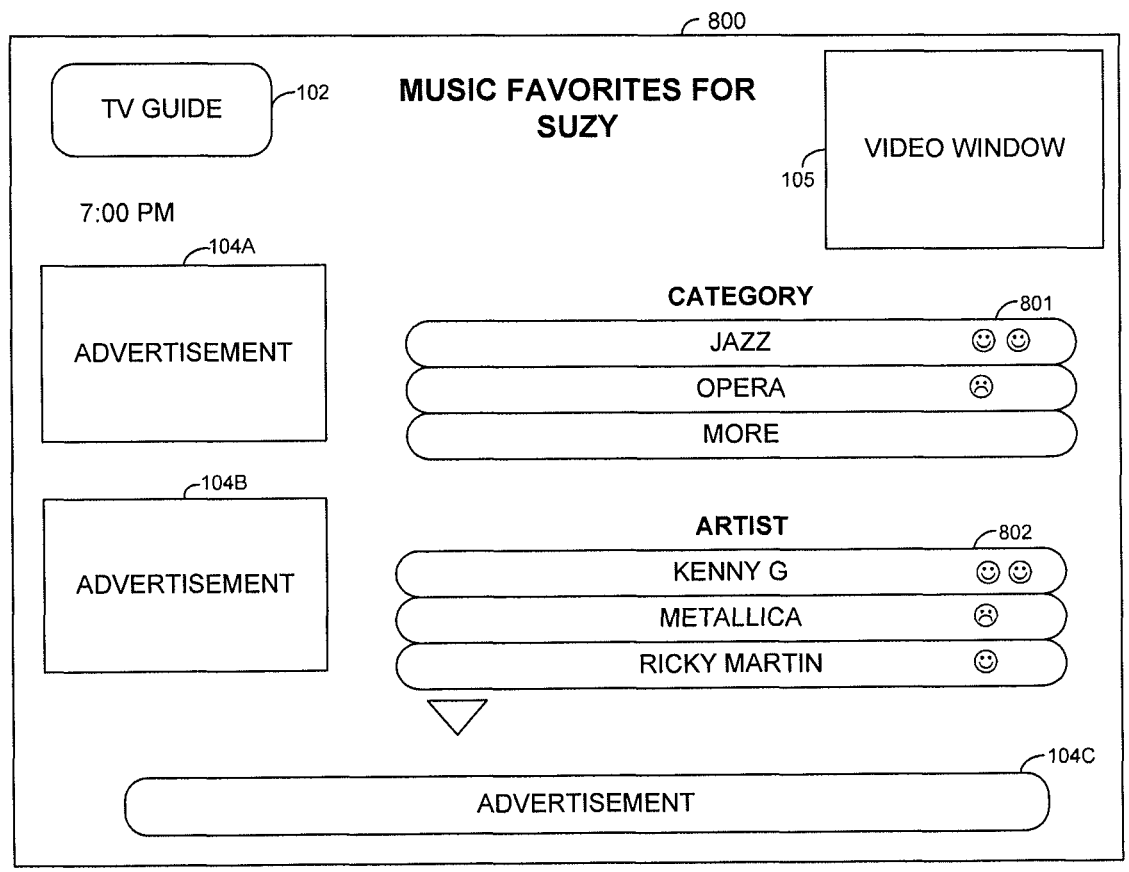
FIG. 56 is an illustrative interactive television display screen for viewing music favorites accordance with the present invention.

When the user selects option 631E in screen 630, the program guide may provide a screen such as screen 800 in FIG. 56. Screen 800 displays listings of the user's favorite songs, categories of songs (list 801), artists (list 802), albums, etc. The user may press the DOWN arrow key to view additional favorites on screen 800. The number of happy faces and unhappy faces indicate whether the user likes that song category, artist, etc., and to what degree. The user may add more categories of songs to his profile by selecting the more option in list 801. The program guide may provide the user with the opportunity to add a song, category, artist, album, etc. to his favorites by selecting an "add to favorites" option in an information screen (e.g., Song Information screen). The program guide may utilize user profile information by customizing features of the hub to match the user's favorites.

Figure 57:
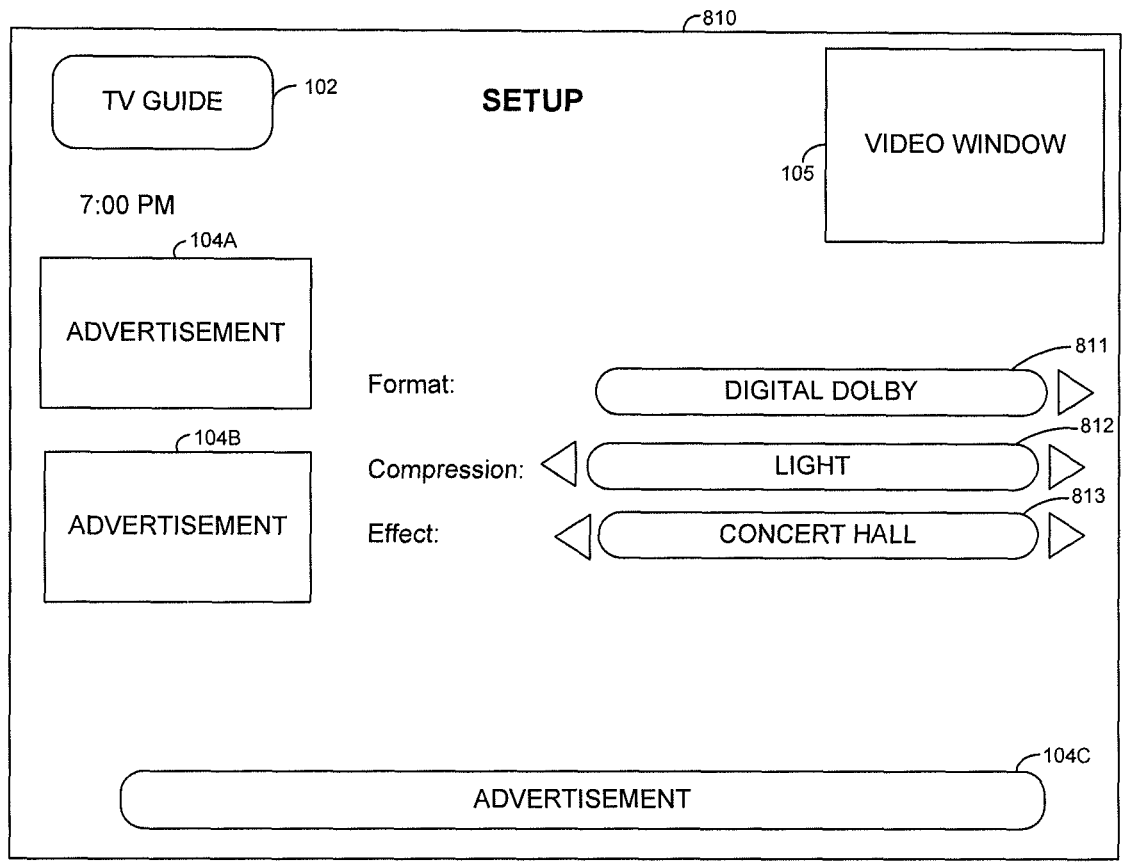
FIG. 57 is an illustrative interactive television setup display screen for selecting music audio settings in accordance with the present invention.

When the user selects option 631F in screen 630, the program guide may provide a screen such as screen 810 in FIG. 57. Screen 810 provides the user with the opportunity to manipulate various setup features of the guide that relate to audio settings for music programming. The user may select an audio format such as digital Dolby in region 811 by pressing RIGHT or LEFT arrows on the remote control when the format option is highlighted. The user may select an audio compression format such as light in region 812 by pressing RIGHT or LEFT arrows on the remote control when the compression option is highlighted. The user may select an audio effect such as concert hall in region 813 by pressing RIGHT or LEFT arrows on the remote control when the effect option is highlighted.

Figure 58:
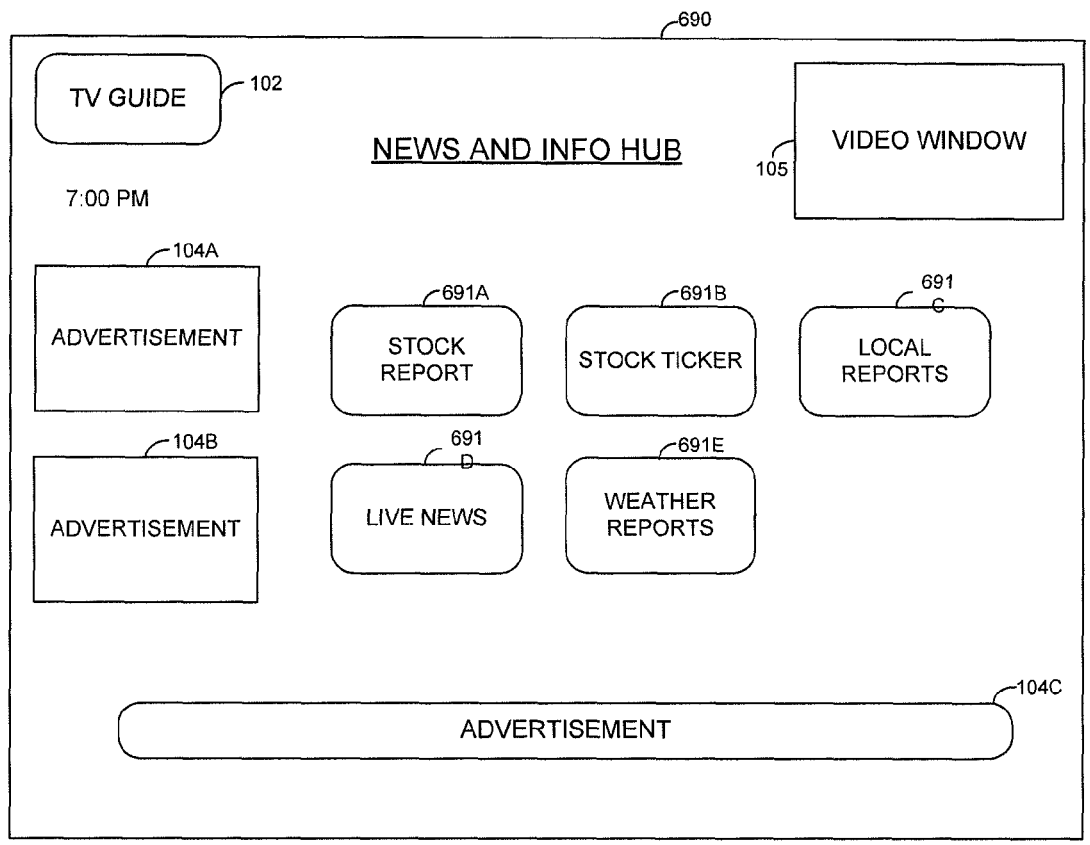
FIG. 58 is an illustrative interactive television display screen for a news and information niche hub in accordance with the present invention.

Another illustrative television program guide main menu screen of a niche hub in accordance with the present invention is shown in FIG. 58. Menu screen 690 in FIG. 58 is the main menu screen of a news and information hub. Screen 690 provides the user with the option of using a variety of program guide features related to news and information. The user may view a stock report by selecting option 691A as discussed with respect to FIG. 59. The user may view a stock ticker by selecting option 691B as discussed with respect to FIG. 60. The user may view local reports by selecting option 691C as discussed with respect to FIG. 61. The user may view live news by selecting option 691D as discussed with respect to FIG. 62. The user may view weather reports by selecting option 691E as discussed with respect to FIG. 63. The news and information hub may also include options similar to the options in the other hubs.

Figure 59:
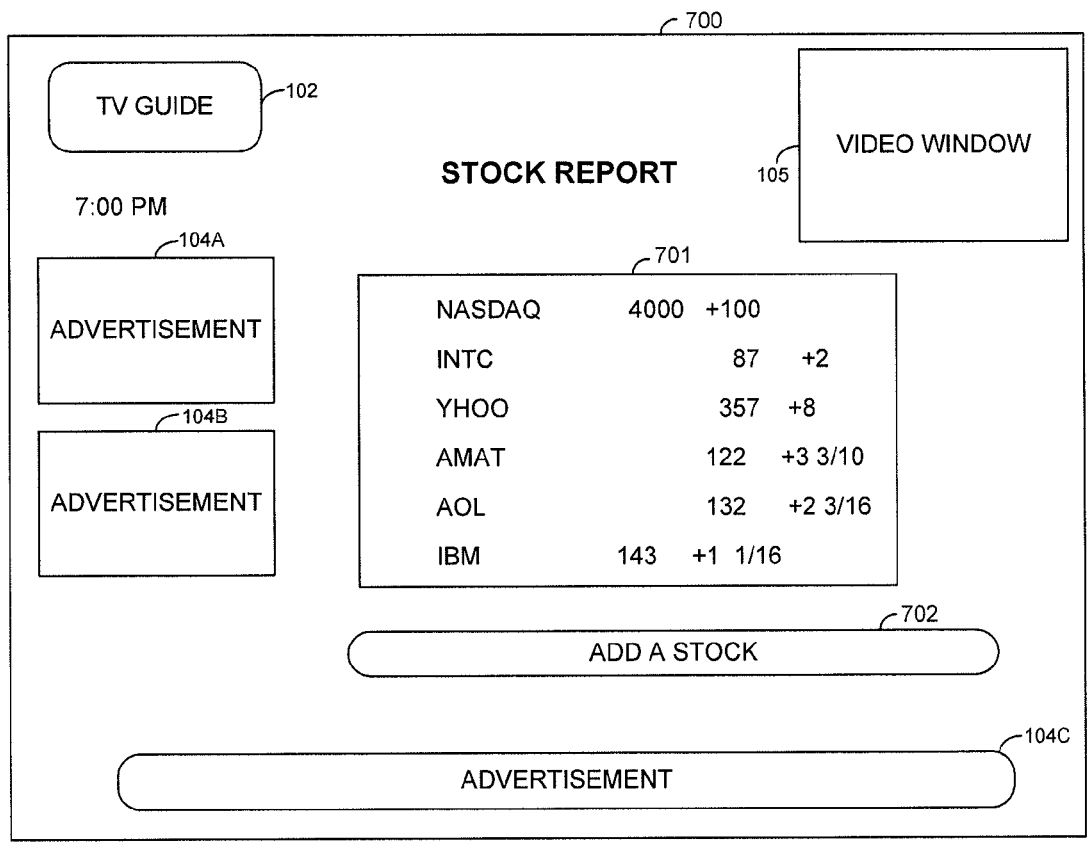
FIG. 59 is an illustrative interactive television display screen displaying a stock report in accordance with the present invention.

Referring to FIG. 59, screen 700 is an example of a stock report display screen that the program guide can provide when the user selects option 691A in screen 690. Screen 700 provides the user with a personalized stock report in list 701. List 701 provides the latest stock quote for a list of publicly traded companies, indexes, and funds as well as the change in the current price relative to the previous day's closing price. The user may add stocks to the list 701 by selecting option 702 in screen 700. The program guide may then provide the user with a list of stocks to choose from that may be added to list 701. The user may scroll down the list by entering letters from a keypad. If desired, the program guide may provide the user with the opportunity to enter stock symbols to add stocks to screen 700.

Figure 60:
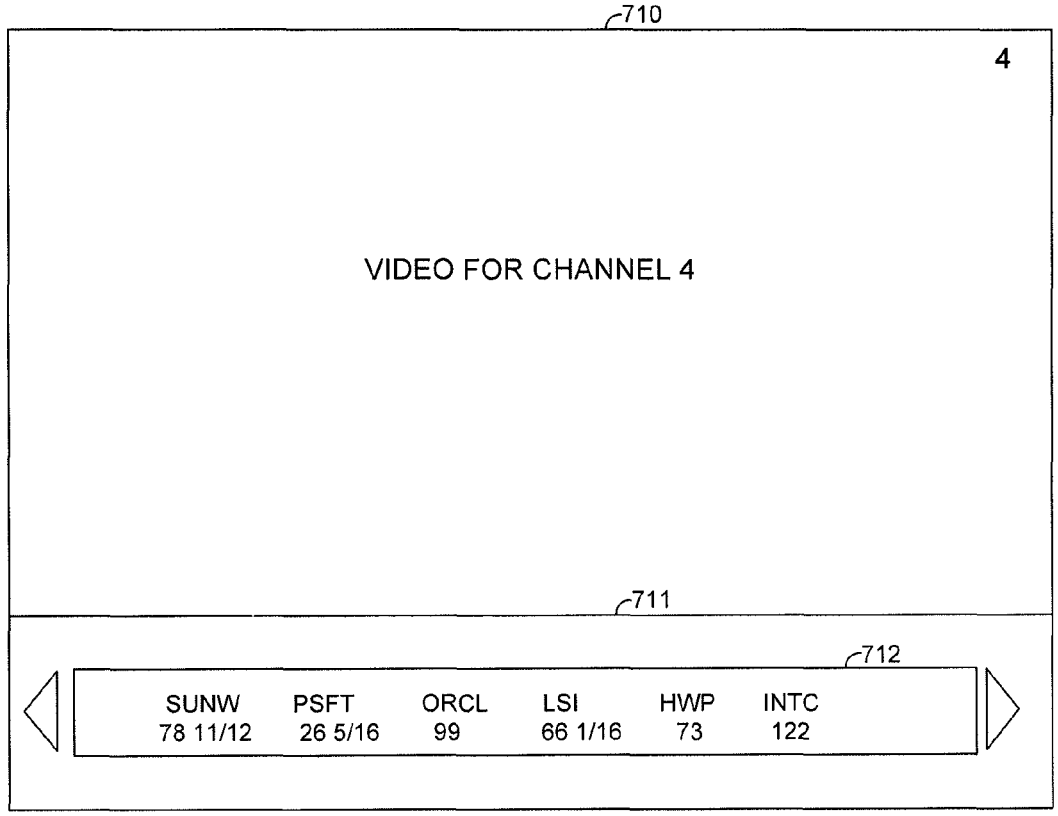
FIG. 60 is an illustrative sports ticker in accordance with the present invention.

The program guide may also provide a scrolling stock ticker as shown, for example, in FIG. 60 when the user selects option 691B in screen 690. The program guide may then display the video and audio for the current television channel concurrently with a stock ticker in overlay 711. Overlay 711 contains stock ticker 712 which continuously scrolls recent stock quotes for a variety of publicly traded companies, indexes, and funds. If desired, ticker 712 may scroll only a subset of stocks that are selected by the user (e.g., that are picked on screen 700). The program guide may obtain real-time stock information for scrolling ticker 712 and list 701 in screen 700 from real-time stock market data source 17 along a digital or analog channel in communications paths as shown, for example, in FIG. 1A.

Figure 61:
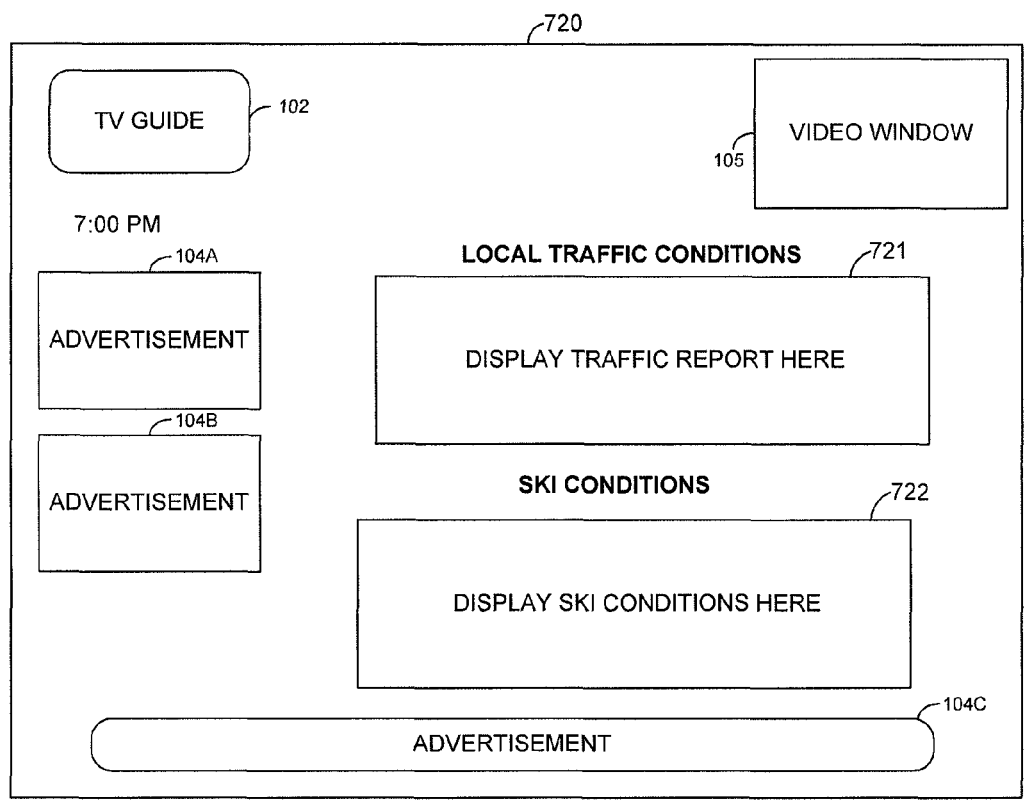
FIG. 61 is an illustrative interactive television display screen displaying local information in accordance with the present invention.

The program guide may also provide the user with an opportunity to view local information as part of the news and information hub when the user selects option 691C in screen 690 as shown, for example, in FIG. 61. Screen 720 in FIG. 61 displays local reports including local traffic conditions in region 721, and local ski reports in region 722. The program guide may provide local information in screen 720 in the form of text, graphics, or video-on-demand from, e.g., real-time news data source 19 along paths shown in FIG. 1A.

Local information may be obtained from a television distribution facility and local real-time data sources such as local news services, stations, or web pages (e.g., from a server 36) along communications paths shown, for example, in FIG. 1A (with respect to real-time data sources 11 or communications network 31), or FIG. 1B (with respect to communications network 36). Local information may also be obtained a central facility such as main facility 12, with addressing to specific localities, or obtained from the Internet. The television distribution facility provides local information related to the locality that the user resides in. If the television distribution facility is connected to user television equipment in only one given locality, it may provide local information to users only relevant to that specific locality. If a television distribution facility is connected to users in multiple localities, the television distribution facility may divide users in groups of localities and provide local information to the users based upon their location in a given locality.

Figure 62:
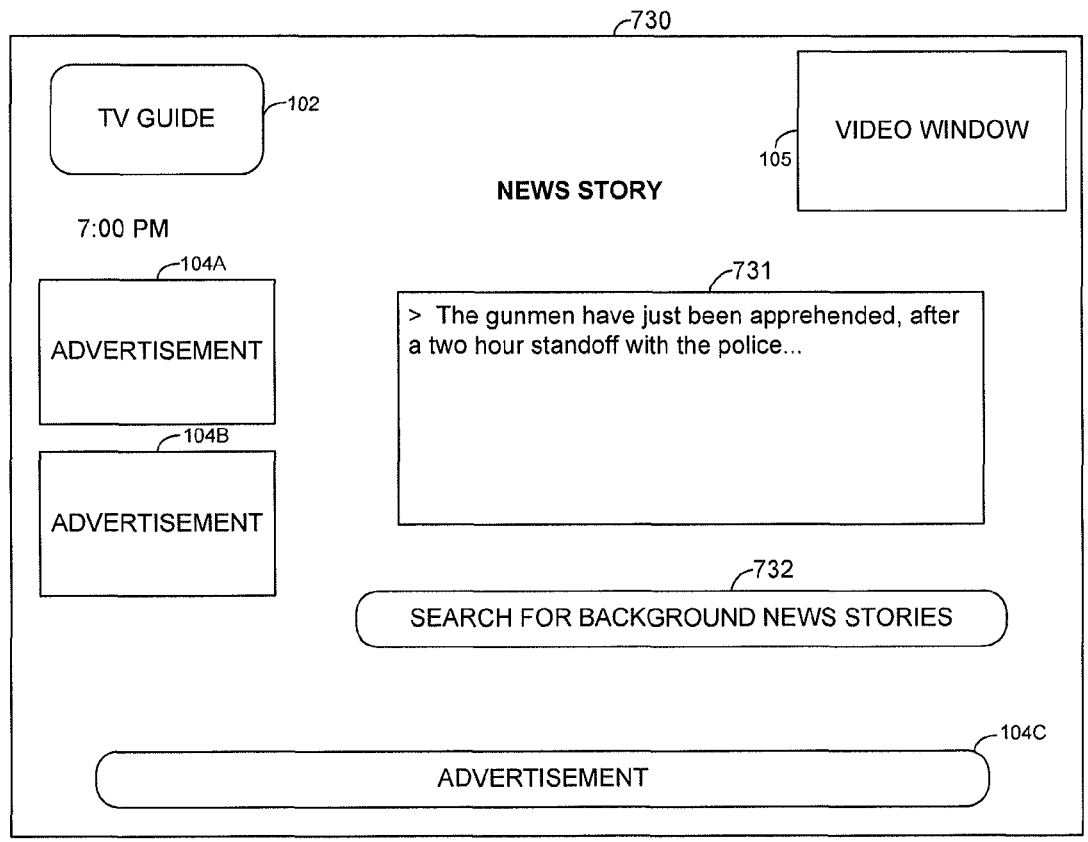
FIG. 62 is an illustrative interactive television display screen displaying live news updates in accordance with the present invention.

The program guide may also provide the user with an opportunity to read live news updates in the news and information hub by selecting option 691D in screen 690. Screen 730 in FIG. 62 is an example of a display screen that the program guide may display when the user selects option 691D. Screen 730 displays live news updates on breaking news events in region 731. Live news updates may be provided in the form of scrolling real-time textual messages to the user television equipment that are displayed in region 731 as shown in FIG. 62. The live news updates in screen 730 may also be in the form of audio or video news (e.g., video from the story may be displayed in window 105). The program guide may obtain live news updates, for example, from real-time news data source 19 along paths shown in FIG. 1A. The program guide may also provide the user with an opportunity to search for other live news updates or other news stories related to the news update in region 731 or background news stories by selecting option 732.

Figure 63:
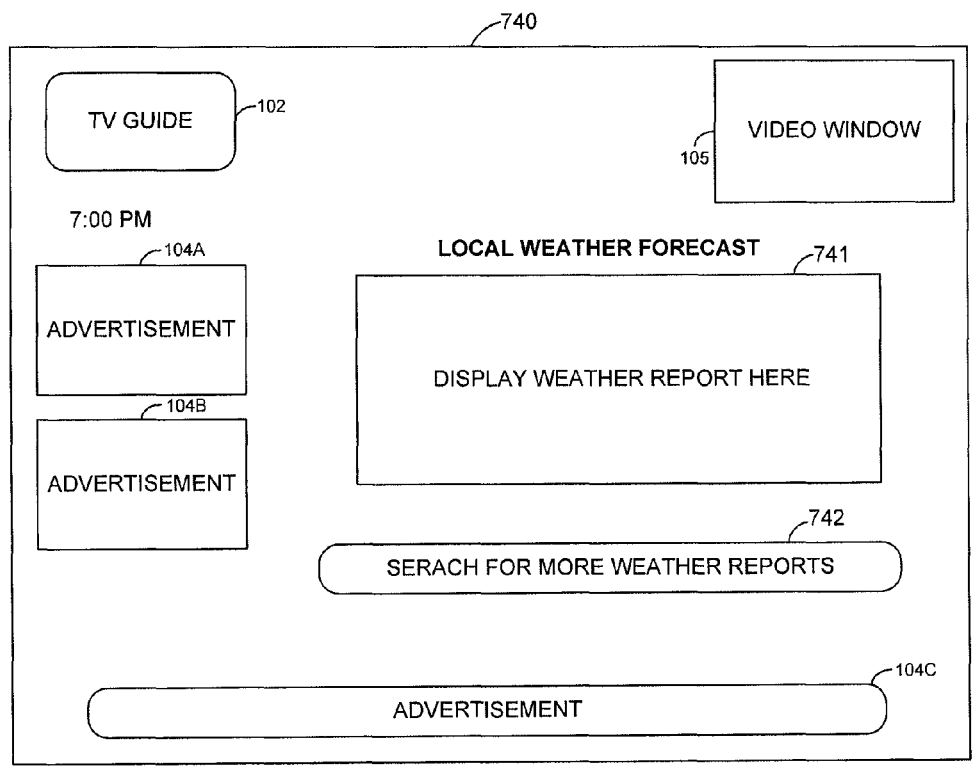
FIG. 63 is an illustrative interactive television display screen displaying weather reports in accordance with the present invention.

Screen 740 in FIG. 63 is an example of a display screen that may be provided by the program guide when the user selects option 691E in screen 690. Screen 740 provides a local weather forecast in region 741 for the user's locality. The television distribution facility may divide users into localities and provide weather reports specific to each locality if users connected to that television distribution facility are in different localities. The user may search for weather reports for other localities by selecting option 742. The program guide may then provide the user with a list of other localities. When the user selects a locality on the list, the program guide may then provide the user with the weather forecast or report for that locality on a display screen such as screen 740.

The program guide may obtain the contents of the weather reports for the news and information hub from real-time news data source 19 along a digital or analog channel in communications paths as shown, for example, in FIG. 1A. The program guide may also obtain news stories, weather reports, and stock quotes from a web server (e.g., server 36) connected to user television equipment via communications network 38 (FIG. 1B). Real-time news data source 19 may contain a searchable weather database of national and international weather reports that the user can access from the user television equipment along two-way communications paths as shown, for example, in FIG. 1A.

Figure 64:
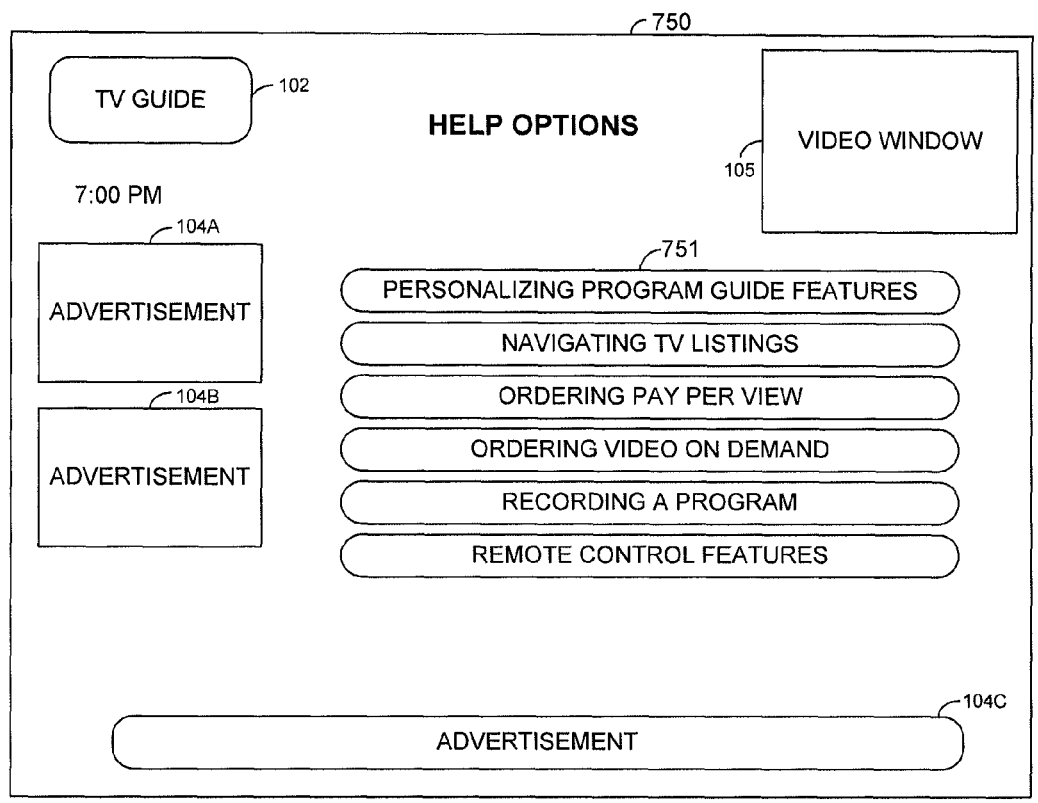
FIG. 64 is an illustrative interactive television display screen displaying help options in accordance with the present invention.

Screen 750 in FIG. 64 is an example of a help display screen that may be provided by the program guide when the user selects option 106T in screen 100. Screen 750 provides the user with listing 751 of help topics that may be selected by the user. The user may press UP and DOWN arrows on the remote control to select a help topic in list 751. When the user selects a help topic in list 751, the program guide displays detailed information on a display screen that relates to using the selected program guide feature. The detailed help information may be in the form of text, audio, or video. The program guide help information may be stored in memory 25 of set-top box 26, or at a remote server (e.g., at the television distribution facility) and transmitted to the set-top box upon request.

Another illustrative television program guide niche hub in accordance with the present invention is a local hub. A local hub may provide the user with the option of using a variety of program guide features related to local events, programming, and information. The program guide may, for example, obtain data for the local hub features from a television distribution facility. The television distribution facility (or server or computing equipment located elsewhere) filters local information to the user television equipment connected to that television distribution facility based upon where the users reside. The local information is received by the user television equipment and displayed in conjunction with the local hub.

The local hub may provide local information such as upcoming community events, local theater productions, classified ads, local television program listings, (which may be include local channels and local programming on any channels), local news, local debates, local government information, movies playing at local theaters, local personal ads, local restaurants, local attractions, local concert schedules, local high school sports, local interest groups (e.g., a local historical society), yellow pages with local listings, school lunches for local schools, and surveys relevant to local issues. Local features such as local news, local ski reports, sports, traffic reports, etc. may be present in both the news hub and the local hub. The local hub may obtain local information, for example, from local real-time data sources 11 (e.g., a local radio station, community service center, local government offices, etc.) along communications paths shown, for example, in FIG. 1A. If desired, the program guide local hub may obtain local information for local features from a server that stores information on local events and features. The server may be located at a television distribution facility, or may be a remote server connected to a television distribution facility through a communications network as shown, for example, in FIG. 1B, or a remote server connected through neighborhood nodes to the user television equipment as shown, for example, in FIG. 1C. If desired, the local information may be retrieved from at a web site maintained by a web server (e.g., server 36 connected to television distribution facilities via paths shown in FIG. 1B).

The local hub may also provide a user with an opportunity to participate in a lottery. The user may enter a lottery number pick using the remote control into the set-top box memory to participate in the lottery. The program guide may transmit the user's lottery pick to a lottery processing facility such as message processing facility 71 (FIG. 1D) along communications paths as shown, for example, in FIG. 1D. The lottery processing facility may determine the lottery winners and then send messages back to the winners to inform them of their prizes. The messages to the winners may be sent as, for example, e-mail messages, snail mail messages, or messages to the user television equipment along two-way communications paths as shown, e.g., in FIG. 1D. If desired, the lottery winners may be announced on a television channel received by the user television equipment. The communications paths (e.g., paths 24 in FIG. 1A) between the user television equipment and the television distribution facility must be two-way paths to support lottery features.

Another illustrative program guide niche hub is a soap opera fanatic hub. A soap opera hub may contain television program guide listings of soaps and summaries of recent episodes. The soap hub may include actor biographies, interviews, and behind the scenes segments (e.g., recorded video, images, or textual segments), as well as targeted advertisements, scheduled soap chats, news groups, and fan clubs that communicate through e-mail messages. The soap hub may also contain links to soap opera web sites, the ability to purchase soap opera related merchandise, video-on-demand of missed soap episodes, and soap trivia questions.

Another illustrative program guide niche hub is a science fiction hub. A science fiction hub may contain listings of science fiction television programs and movies, targeted ads, summaries of recent episodes of science fiction programs and sitcoms, Star Trek convention schedules, links to web sites, trivia, video-on-demand, as well as science fiction chat groups, news groups, and e-mail fan clubs. The science fiction hub may include actor biographies, interviews, and behind the scenes segments (e.g., recorded video, images, or textual segments). The science fiction hub may also have access to a searchable database of Star Trek episodes and other science fiction programs and related information and news.

Another illustrative program guide niche hub is a television lover's hub. A television lover's hub may include highly searchable television program guide listings. The highly searchable listings allow a user to search for television programs by entering search criteria such as the names of actors in the programs, words in description of the program, the subject of the program, the year the program was filmed, a specific episode in a sitcom or program series, etc. The program guide may transmit the search criteria to program database 14 or a database at the television distribution facility which searches for programs that match the user's selected criteria. When a match has been found, the program information may be transmitted back to the originating set-top box and displayed on the television set.

The television lover's hub may also include targeted ads, recommended programs with an emphasis on programs that are popular, server-based recording, video-on-demand, pay-per-view programs, packages of pay channels and programs, reviews, interviews, shopping for program-related merchandise, trivia, user favorites and personal preferences, suggested programs given the user's likes and dislikes, chat groups, news groups, and web site links related to popular shows.

Another illustrative television program guide niche hub is an adult hub. The adult hub may contain any of the options available for the Movies hub, with adult-oriented content, adult-oriented advertising, support for adult-oriented programming on-demand, on pay-per-view, and on cable channels, as well as the ability to control access of this hub to specific family members.

Another illustrative television program guide niche hub is a cultural hub. The cultural hub may contain any of the options available for the Movies hub, with cultural content; culture-related advertising; support for public television; nature shows, art shows, history shows, philosophy shows and listings therefor; support for distance learning; feedback to network executives; and highlighting shows with critical appeal in television listings.

Figure 65:
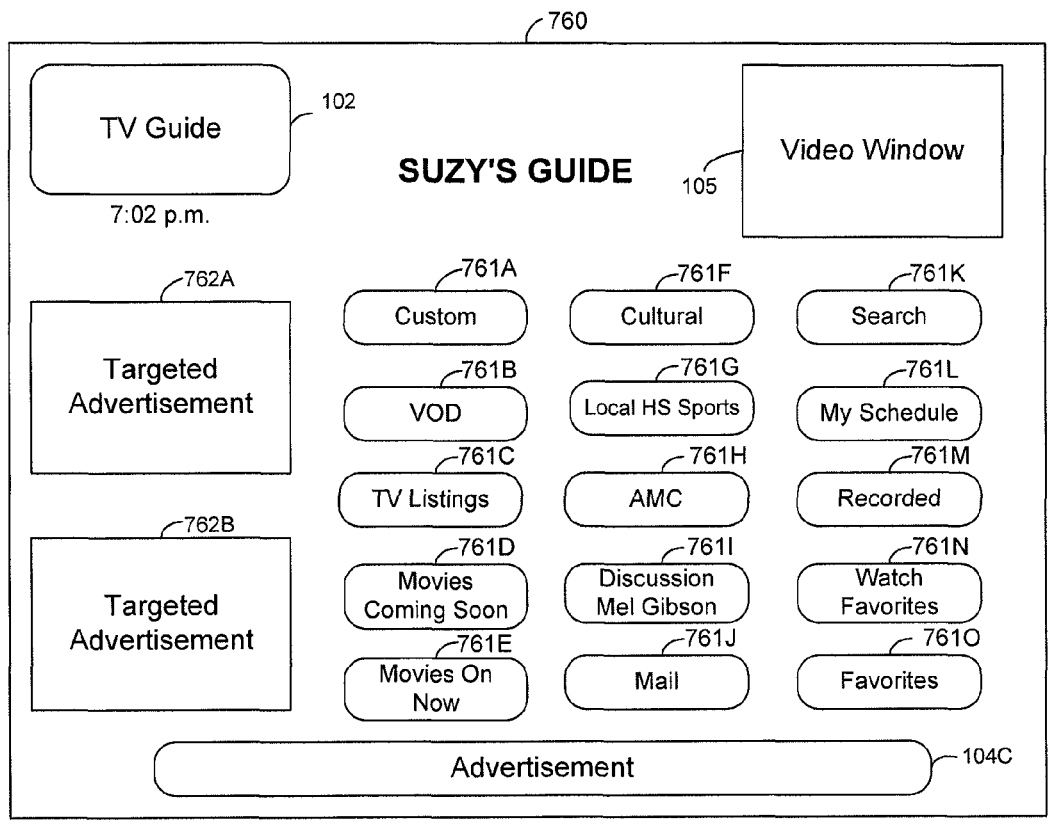
FIG. 65 is an illustrative interactive television display screen for a custom niche hub in accordance with the present invention.

In addition to predefined hubs, the guide may allow the household to define one or more custom hubs, for example by choosing "Add Guide" option 112N from Themes screen 110 of FIG. 3. Screen 760 shown in FIG. 65 is an example of a screen that may be displayed when the user creates a new guide (i.e., niche hub). The user may be given the opportunity to name the guide, and to create a PIN that must be entered to access the guide. The user may access the custom hub by selecting, for example, options 106E/112L (Suzy's custom hub) or 106F/112M (Tom's custom hub) in screens 100 or 110 of FIGS. 2 and 3, respectively. Screen 760 may have option 761A to edit the current options on the custom guide being defined.

Figure 66:
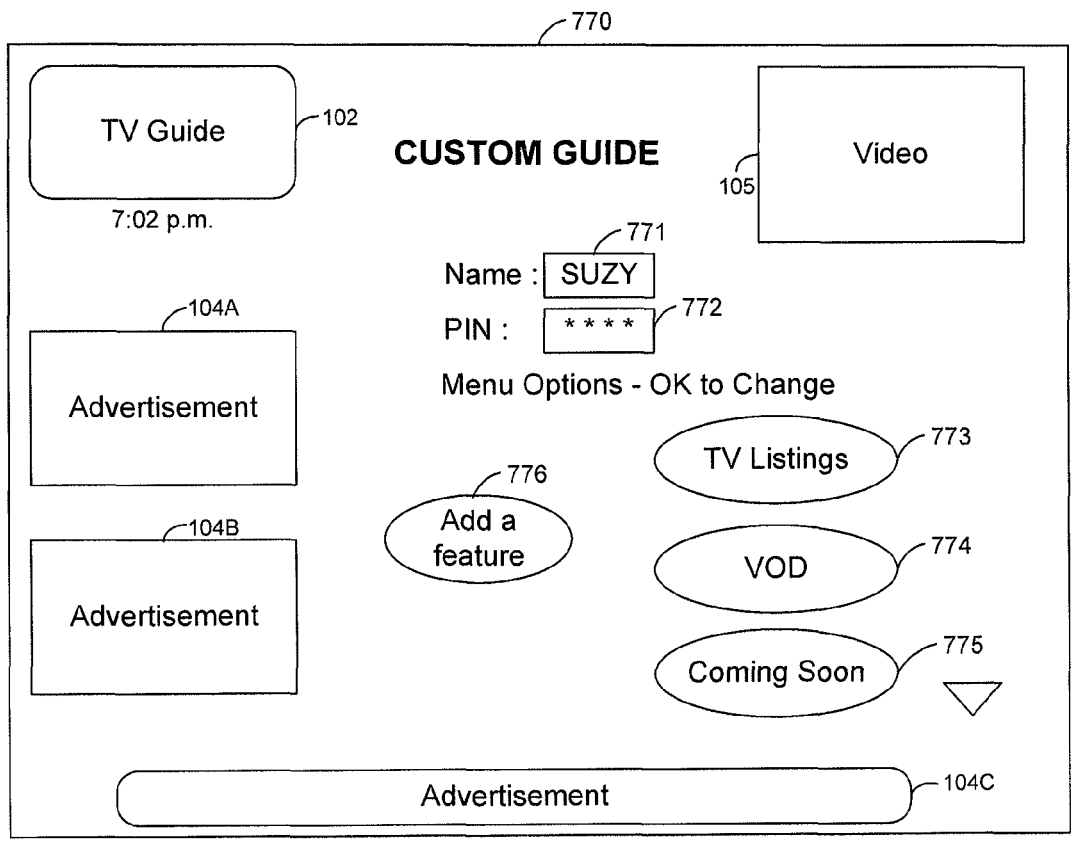
FIG. 66 is an illustrative interactive television display screen for adding features to or deleting features from a custom niche hub in accordance with the present invention.

Selecting custom option 761A may display an overlay, such as screen 770 of FIG. 66, allowing the user to further customize this hub, perhaps adding or deleting options, changing the hub name, or adding or changing the access PIN. Once in screen 770, the user may enter a name for the custom hub (e.g., Suzy) in region 771, and may enter a PIN number required to enter this custom niche hub in region 772. A user is required to enter the PIN number to access the custom hub from the main menu 100 (e.g., when the user selects Suzy option 106E).

Screen 770 displays options (such as options 773-775) that are available in screen 760. The user may press the DOWN arrow on the remote control to view more options that are available on screen 760. The user may select an option such as TV listings option 773, VOD option 774, or Coming Soon option 775 and press "OK" on the remote control to remove that option from screen 760. The user may add any option from the guide's Main Menu screen 100, or from any of the sub-screens within the guide, including any of the predefined niche hub guides by selecting option 776.

Figure 67:
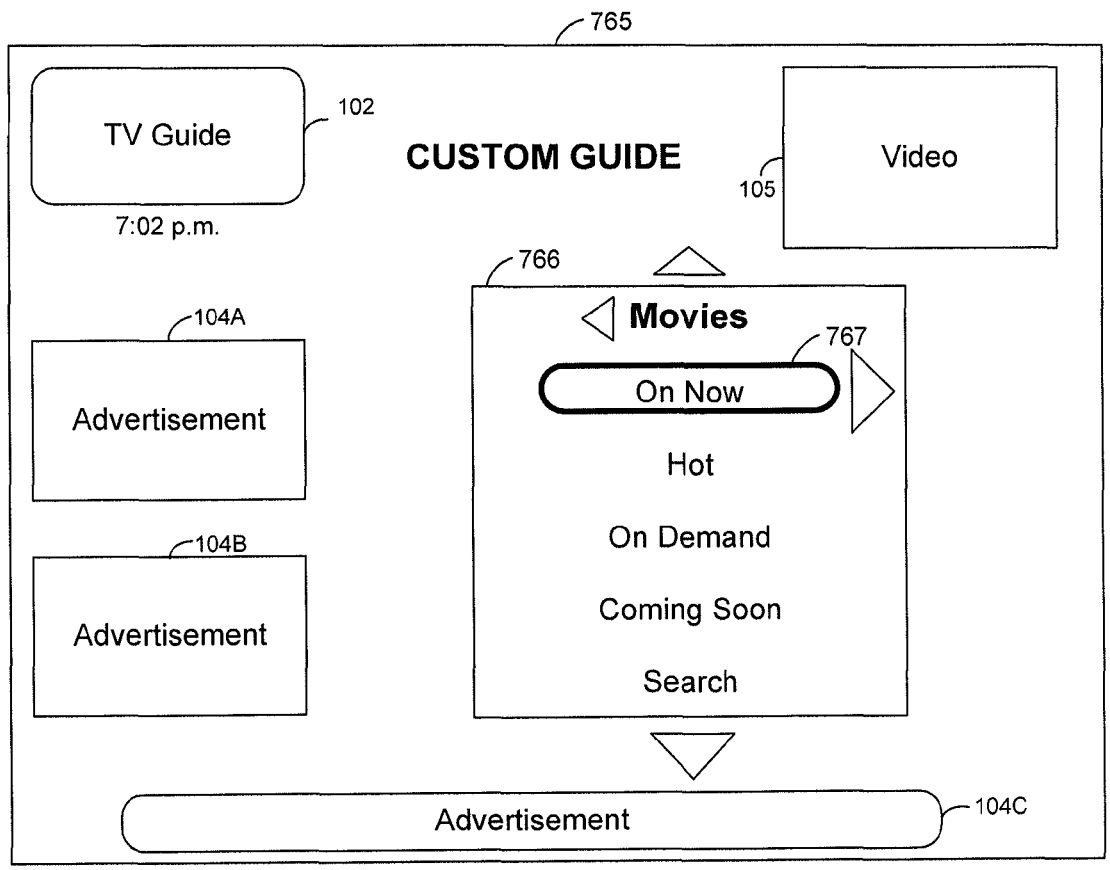
FIG. 67 is an illustrative interactive television display screen for adding features to a custom niche hub in accordance with the present invention.

When the user selects option 776 to add an option, the program guide displays screen 765 in FIG. 67. Screen 770 includes an exemplary list 766 of program guide options that the user can add to the custom hub of FIG. 65. With respect to options in list 766 such as option 767, the user presses the LEFT arrow key to select an option higher in the menu hierarchy, the RIGHT arrow to select an option lower in the menu hierarchy, and the UP or DOWN arrow key to select a different option at the same menu level. The user may press OK once the correct option has been selected in screen 765 to add that option to screen 760.

In the example shown in FIG. 67, the user had selected the On Now selection 767 from the Movies screen to be displayed on the custom guide screen 760. By pressing the LEFT arrow key, Movies option 106C from the Main Menu screen 100 (FIG. 2) is selected in list 766, because this option is higher in the menu hierarchy than Movies on Now option 132A (FIG. 5) and above the On Now option in list 766. By pressing the DOWN arrow key, the option will be changed to the Hot option 132B of the Movies screen 130 (FIG. 5), because this option is the second option in screen 130 and below the On Now option in list 766. And by pressing the RIGHT arrow key, the option may be changed to the first option on the Movies On Now screen 140 (FIG. 6), because this option is lower in the menu hierarchy than Movies On Now option 132A.

Screen 760 in FIG. 65 is an example of a custom guide defined by a user. Option 761B for video on demand and option 761C for Television Listings, were selected from the Main Menu screen. Movies Coming Soon option 761D and Movies On Now option 761E, were selected from the Movies hub. Note that these two option buttons were enlarged to make room for additional text, possibly reducing the total number of options that can be shown on the custom screen. In the second column is Cultural option 761F, a direct link to a predefined cultural hub; Local HS Sports option 761G, a link to a feature on another hub; AMC option 761H, a link to a channel selected from within a feature of another hub; and Discussion Mel Gibson option 761I, a link to a specific discussion group found within another hub. Screen 760 also includes Search option 761K from screen 130, and My Schedule 761L and Recorded 761M options chosen from the Main Menu 100. Note that when My Schedule 761L or Recorded option 761M is chosen from within the personalized niche hub, the program guide may list only programs selected by the user while this personalized hub is active.

Screen 760 also has Mail option 761J which may be present on all custom hubs. Each custom hub may provide access to a different mail account, and selecting option 761J may allow the user to change the options and read/send mail for that account. Favorites option 761O may also be present within each custom hub, and may provide the user with the option to define favorite program attributes that are active while the hub is active. Screen 760 also has targeted advertising 762A and 762B that may be targeted to the user's favorite programming.

The custom hub may also have an option to Watch Favorites 761N. Selecting this option would function similar to the Watch Movies option described above, changing the mode of television watching so that easy access is provided to programs matching the Favorite criteria of the custom hub. The guide may also allow the user to define a PIN required to enter this mode, to prevent children, for example, from entering this mode without adult supervision. When the user indicates a desire to a enter a custom hub, the program guide may require the user to enter the PIN number. The guide may also provide for a PIN that is required to exit from this mode, allowing a highly controlled television-watching mode to be created for any child in the household.

The foregoing is merely illustrative of the principles of this invention and various modifications can be made by those skilled in the art without departing from the scope and spirit of the invention.

What is claimed is:

1. A method for personalizing an interactive video guide display, the method comprising:
   receiving a user selection of a personal profile, wherein the personal profile includes a first feature;
   displaying a personalized video guide display associated with the personal profile, wherein the first feature is displayed in a first area of the video guide display, the first area occupying less than an entirety of the video guide display;
   receiving a user selection of one or more features to be added to the personalized interactive video guide display;
   updating the personal profile to include the one or more user selected features;
   determining whether the one or more user selected features are related to the first feature; and
   in response to determining that the one or more user selected features are related to the first feature, displaying the first feature and the one or more user selected features in the first area of the personalized interactive video guide display.

2. The method of claim 1, wherein receiving a user selection of one or more features further comprises receiving one or more rating restrictions.

3. The method of claim 1, wherein receiving a user selection of one or more features further comprises receiving one or more favorite programs.

4. The method of claim 1, wherein receiving a user selection of one or more features further comprises receiving one or more favorite channels.

5. The method of claim 1, wherein receiving a user selection of one or more features further comprises receiving one or more favorite actors.

6. The method of claim 1, wherein receiving a user selection of one or more features further comprises receiving one or more favorite directors.

7. The method of claim 1, wherein receiving a user selection of one or more features further comprises receiving one or more favorite programming genres.

8. The method of claim 1, wherein displaying the one or more user selected features further comprises displaying a listing of one or more programs.

9. The method of claim 1, wherein displaying the one or more user selected features further comprises displaying a list of one or more websites.

10. The method of claim 1, wherein displaying the one or more user selected features further comprises displaying a list of one or more merchandise.

11. The method of claim 1, further comprising using the user selection of one or more features to set targeted advertising.

12. The method of claim 1, further comprising using the user selection of one or more features to set automatic reminders.

13. The method of claim 1, further comprising using the user selection of one or more features to set automatic recording of programs.

14. The method of claim 1, further comprising allowing a user to send messages to other users in a club that is related to the one or more user selected features.

15. The method of claim 1, further comprising allowing a user to receive messages from other users in a club that is related to the one or more user selected features.

16. A system for personalizing an interactive video guide display, the system comprising user video equipment configured to:
   receive a user selection of a personal profile, wherein the personal profile includes a first feature;
   display a personalized video guide display associated with the personal profile, wherein the first feature is displayed in a first area of the video guide display, the first area occupying less than an entirety of the video guide display;
   receive a user selection of one or more features to be added to the personalized interactive video guide display;
   update the personal profile to include the one or more user selected features;
   determine whether the one or more user selected features are related to the first feature; and
   in response to determining that the one or more user selected features are related to the first feature, display the first feature and the one or more selected user features in the first area of the personalized interactive video guide display.

17. The system of claim 16, wherein the user video equipment is further configured to receive one or more rating restrictions.

18. The system of claim 16, wherein the user video equipment is further configured to receive one or more favorite programs.

19. The system of claim 16, wherein the user video equipment is further configured to receive one or more favorite channels.

20. The system of claim 16, wherein the user video equipment is further configured to receive one or more favorite actors.

21. The system of claim 16, wherein the user video equipment is further configured to receive one or more favorite directors.

22. The system of claim 16, wherein the user video equipment is further configured to receive one or more favorite programming genres.

23. The system of claim 16, wherein the user video equipment is further configured to display a listing of one or more programs.

24. The system of claim 16, wherein the user video equipment is further configured to display a list of one or more websites.

25. The system of claim 16, wherein the user video equipment is further configured to display a list of one or more merchandise.

26. The system of claim 16, wherein the user video equipment is further configured to use the user selection of one or more features to set targeted advertising.

27. The system of claim 16, wherein the user video equipment is further configured to use the user selection of one or more features to set automatic reminders.

28. The system of claim 16, wherein the user video equipment is further configured to use the user selection of one or more features to set automatic recording of programs.

29. The system of claim 16, wherein the user video equipment is further configured to allow a user to send messages to other users in a club that is related to the one or more user selected features.

30. The system of claim 16, wherein the user video equipment is further configured to allow a user to receive messages from other users in a club that is related to the one or more user selected features.

31. A system for personalizing an interactive video guide display, the system comprising:
    means for receiving a user selection of a personal profile, wherein the personal profile includes a first feature;
    means for displaying a personalized video guide display associated with the personal profile, wherein the first feature is displayed in a first area of the video guide display, the first area occupying less than an entirety of the video guide display;
    means for receiving a user selection of one or more features to be added to the personalized interactive video guide display;
    means for updating the personal profile to include the one or more user selected features;
    means for determining whether the one or more user selected features are related to the first feature; and
    means for displaying the first feature and the one or more selected user features in the first area of the personalized interactive video guide display.

32. The system of claim 31, further comprising means for receiving one or more rating restrictions.

33. The system of claim 31, further comprising means for receiving one or more favorite programs.

34. The system of claim 31, further comprising means for receiving one or more favorite channels.

35. The system of claim 31, further comprising means for receiving one or more favorite actors.

36. The system of claim 31, further comprising means for receiving one or more favorite directors.

37. The system of claim 31, further comprising means for receiving one or more favorite programming genres.

38. The system of claim 31, further comprising means for displaying a listing of one or more programs.

39. The system of claim 31, further comprising means for displaying a list of one or more websites.

40. The system of claim 31, wherein the user video equipment is further configured to display a list of one or more merchandise.

41. The system of claim 31, further comprising means for using the user selection of one or more features to set targeted advertising.

42. The system of claim 31, further comprising means for using the user selection of one or more features to set automatic reminders.

43. The system of claim 31, further comprising means for using the user selection of one or more features to set automatic recording of programs.

44. The system of claim 31, further comprising means for allowing a user to send messages to other users in a club that is related to the one or more user selected features.

45. The system of claim 31, further comprising means for allowing a user to receive messages from other users in a club that is related to the one or more user selected features.

46. The method of claim 1, further comprising
    in response to determining that the one or more user selected features are not related to the first feature, displaying the one or more user selected features in a second area of the personalized interactive video guide display.

47. The method of claim 1, wherein
    each feature is associated with at least one of a user interest and a programming category, and
    determining whether the one or more user selected features are related to the first feature includes comparing at least one of a user interest and a programming category associated with the one or more user selected features and at least one of a user interest and a programming category associated with the first feature.

48. The method of claim 1, wherein determining whether the one or more user selected features are related to the first feature is based on user input.

* * * * *